(12) United States Patent
Tang et al.

(10) Patent No.: US 11,895,567 B2
(45) Date of Patent: Feb. 6, 2024

(54) LENDING OF LOCAL PROCESSING CAPABILITY BETWEEN CONNECTED TERMINALS

(71) Applicant: Huawei Technologies Co., Ltd., Shenzhen (CN)

(72) Inventors: ZhongLiang Tang, Shanghai (CN); Yi Liu, Shenzhen (CN); Bihai Wang, Shenzhen (CN); Xiaohui Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 458 days.

(21) Appl. No.: 17/053,320

(22) PCT Filed: May 9, 2018

(86) PCT No.: PCT/CN2018/086225
§ 371 (c)(1),
(2) Date: Nov. 5, 2020

(87) PCT Pub. No.: WO2019/213882
PCT Pub. Date: Nov. 14, 2019

(65) Prior Publication Data
US 2021/0076185 A1 Mar. 11, 2021

(51) Int. Cl.
*H04W 4/80* (2018.01)
*H04W 4/18* (2009.01)
(Continued)

(52) U.S. Cl.
CPC ............ *H04W 4/80* (2018.02); *G06V 40/168* (2022.01); *H04W 4/18* (2013.01); *H04W 48/16* (2013.01); *H04W 88/06* (2013.01)

(58) Field of Classification Search
CPC ......... H04W 4/80; H04W 4/18; H04W 48/16; H04W 88/06; G06V 40/168
See application file for complete search history.

(56) References Cited

U.S. PATENT DOCUMENTS 8,195,744 B2  6/2012 Julia et al.
2012/0331059 A1  12/2012 Luna
(Continued)

FOREIGN PATENT DOCUMENTS

CN 104360847 A 2/2015
CN 104486665 A 4/2015
(Continued)

*Primary Examiner* — Kristie D Shingles
(74) *Attorney, Agent, or Firm* — SLATER MATSIL, LLP

(57) ABSTRACT

A device and method for lending a local processing capability between connected terminals, the method including displaying, by a first electronic device, a first screen, where the first screen is a camera screen of the first electronic device, detecting a first operation of a user on the first screen, obtaining a first image file through photographing in response to the first operation, wherein the image file is a picture or a video, automatically sending the first image file to a second electronic device, automatically receiving processing data sent by the second electronic device, where the processing data is obtained by the second electronic device by processing the first image file, and where the processing data is associated with a second image file, detecting a second operation of the user on the first screen, and displaying the second image file in response to the second operation.

21 Claims, 51 Drawing Sheets

(51) Int. Cl.
*H04W 48/16* (2009.01)
*H04W 88/06* (2009.01)
*G06V 40/16* (2022.01)

(56) References Cited

U.S. PATENT DOCUMENTS

| | | |
|---|---|---|
| 2013/0222627 A1 | 8/2013 | Earnshaw et al. |
| 2014/0080428 A1* | 3/2014 | Rhoads ................. G06F 3/0482 |
| | | 455/88 |
| 2016/0249394 A1 | 8/2016 | Debates et al. |
| 2017/0142327 A1* | 5/2017 | Bayani ............... H04N 5/23218 |
| 2017/0215028 A1* | 7/2017 | Rhoads ................... H04W 4/18 |
| 2017/0329502 A1 | 11/2017 | Wu |
| 2018/0077443 A1 | 3/2018 | Lau et al. |
| 2018/0341835 A1* | 11/2018 | Siminoff .............. G06V 10/803 |

FOREIGN PATENT DOCUMENTS

| | | |
|---|---|---|
| CN | 104809000 A | 7/2015 |
| CN | 104837043 A | 8/2015 |
| EP | 2635018 A1 | 9/2013 |

\* cited by examiner

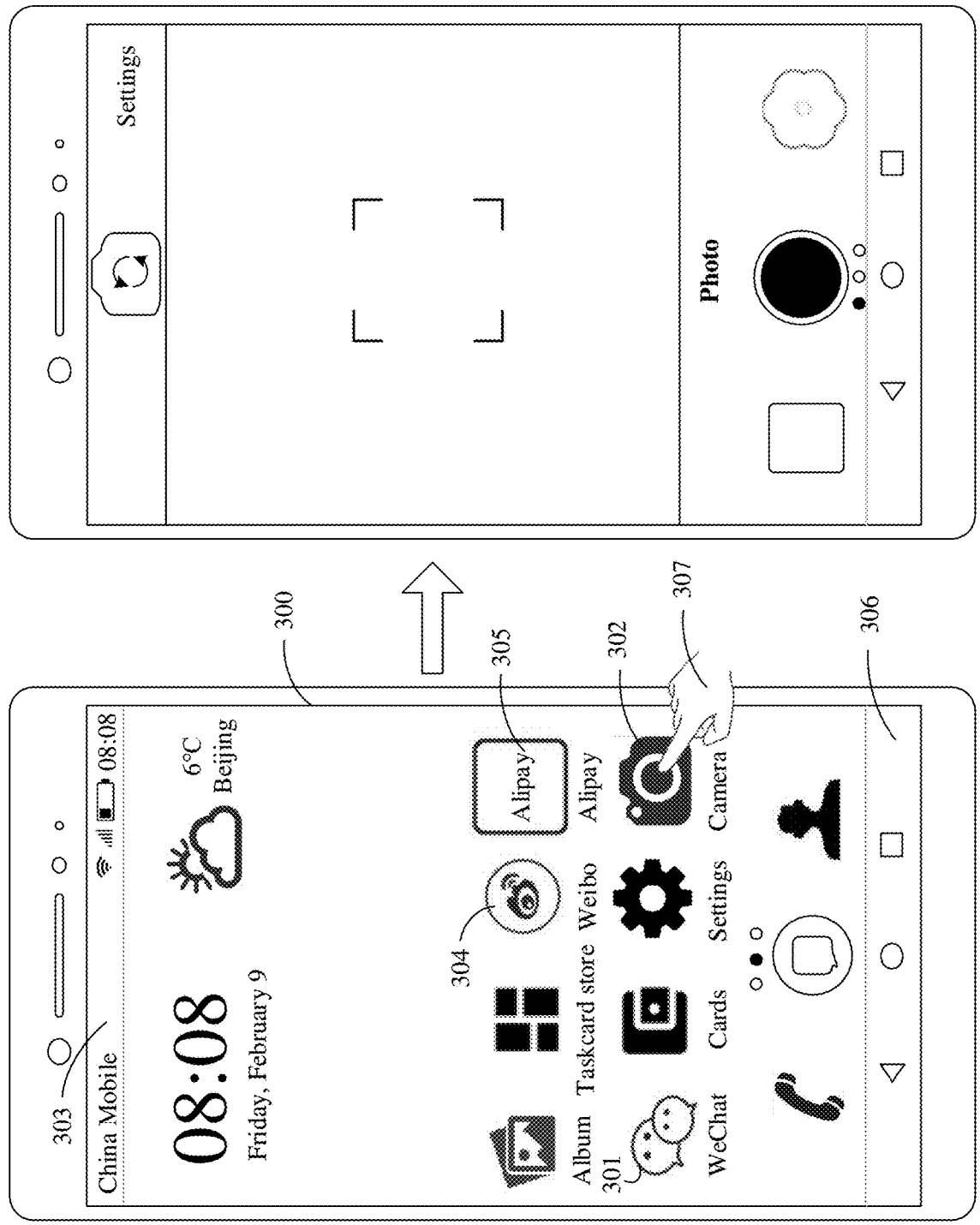

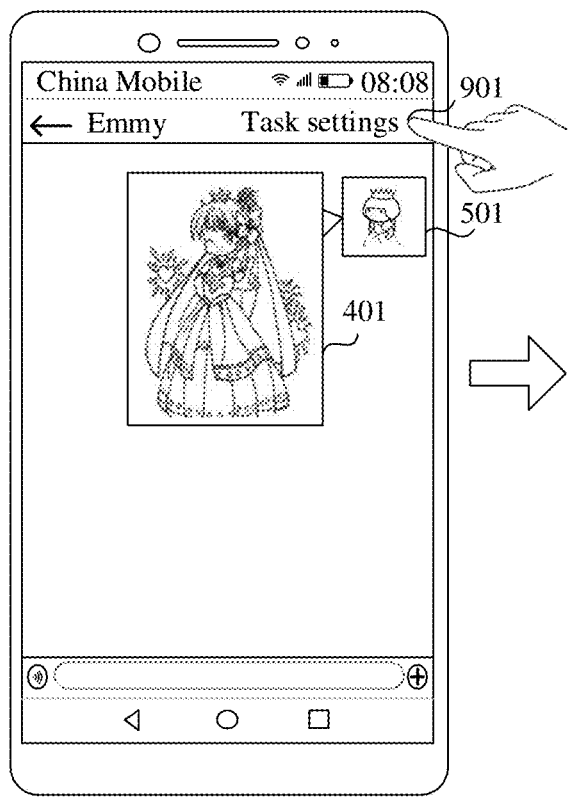
FIG. 9a
TO
FIG. 9d
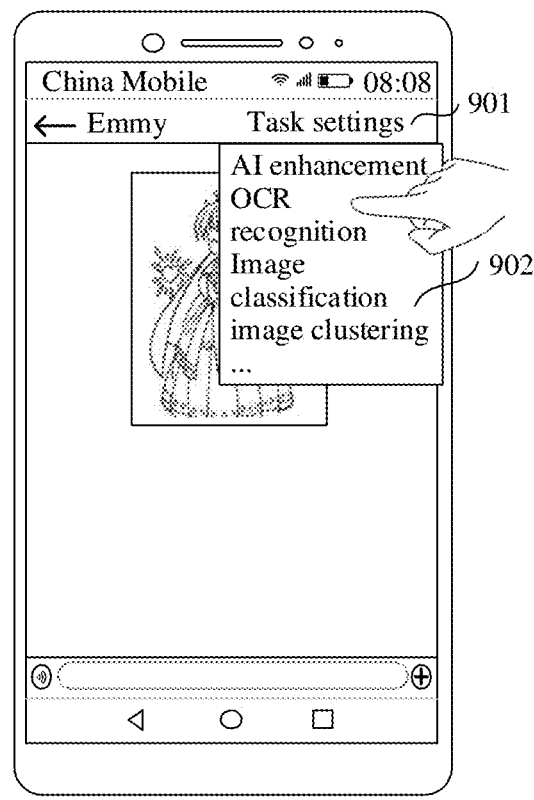
FIG. 9b
TO
FIG. 9c

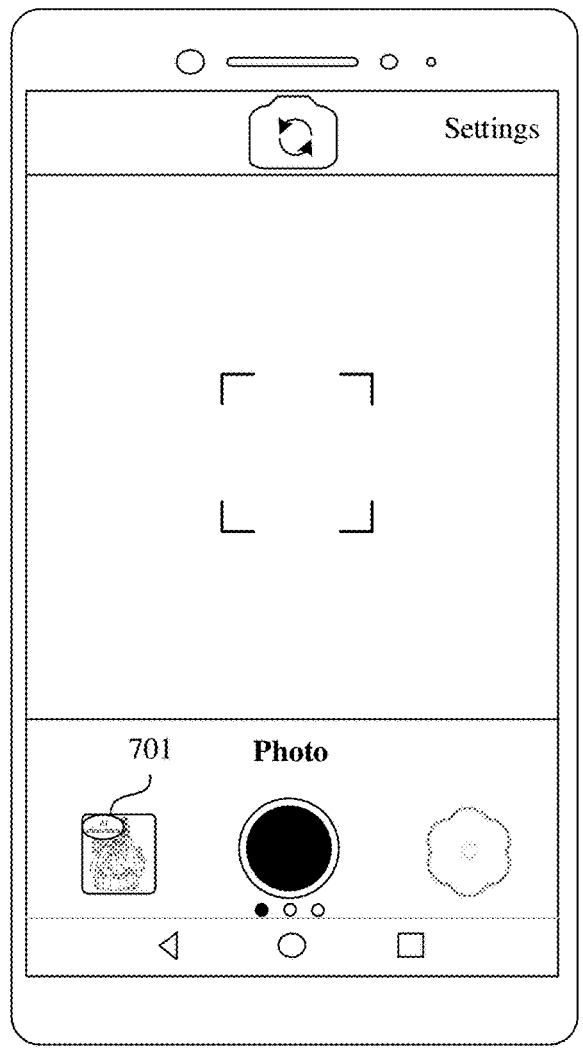
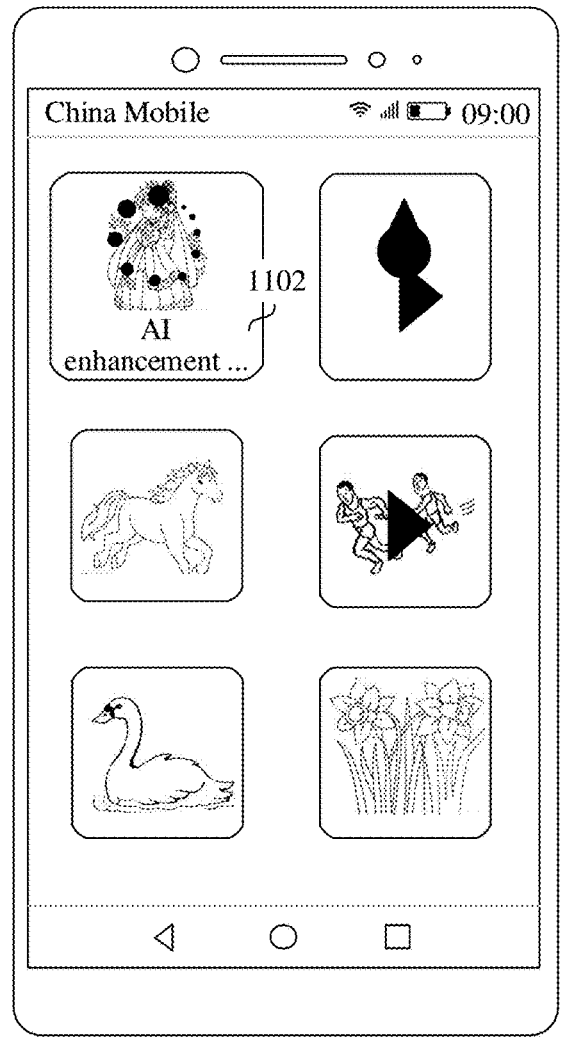
FIG. 11-1a  FIG. 11-1b

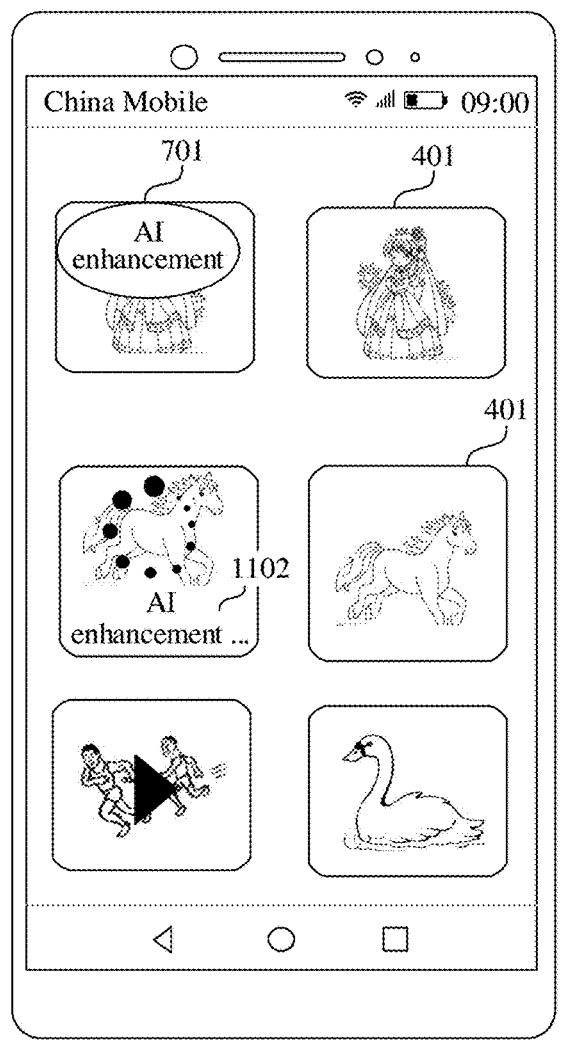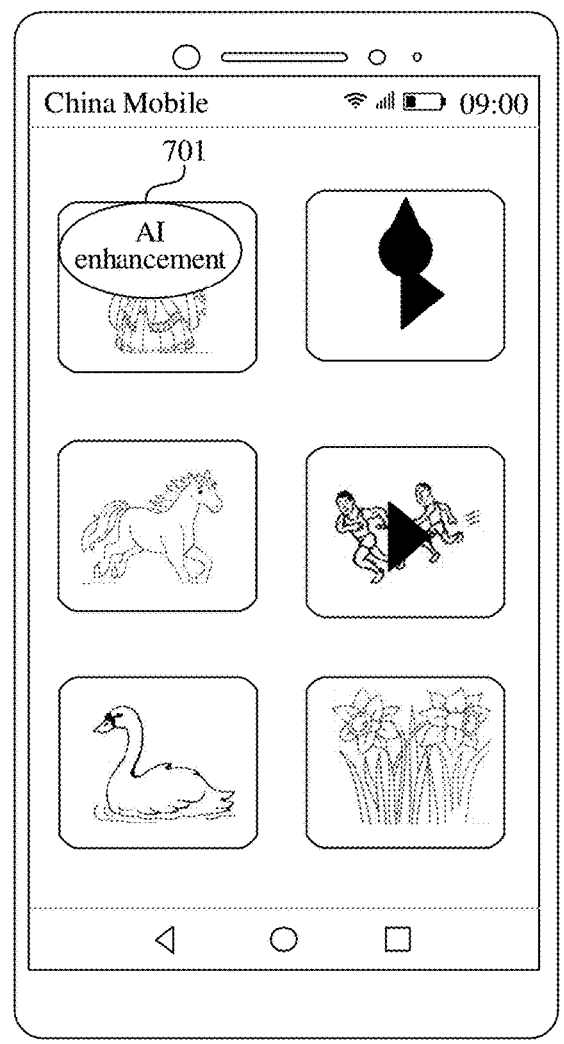
FIG. 11-1d    FIG. 11-1c

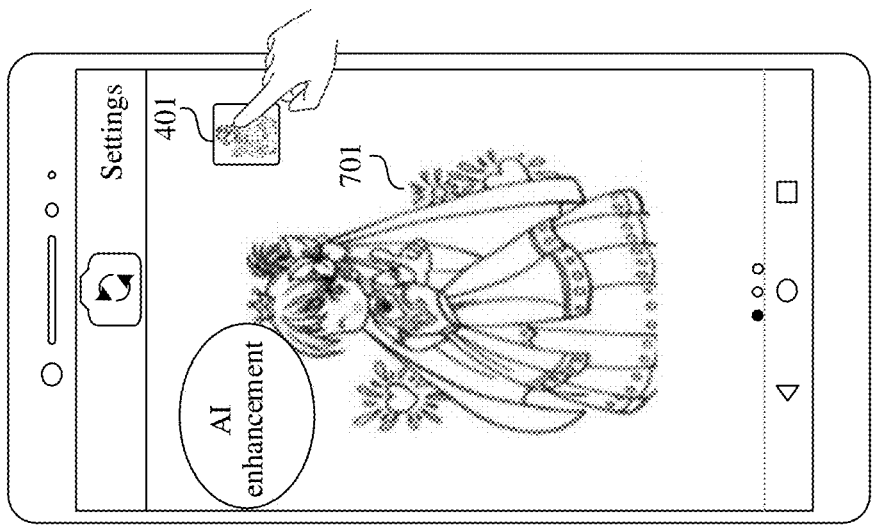
FIG. 11-2c
TO
FIG. 11-2d
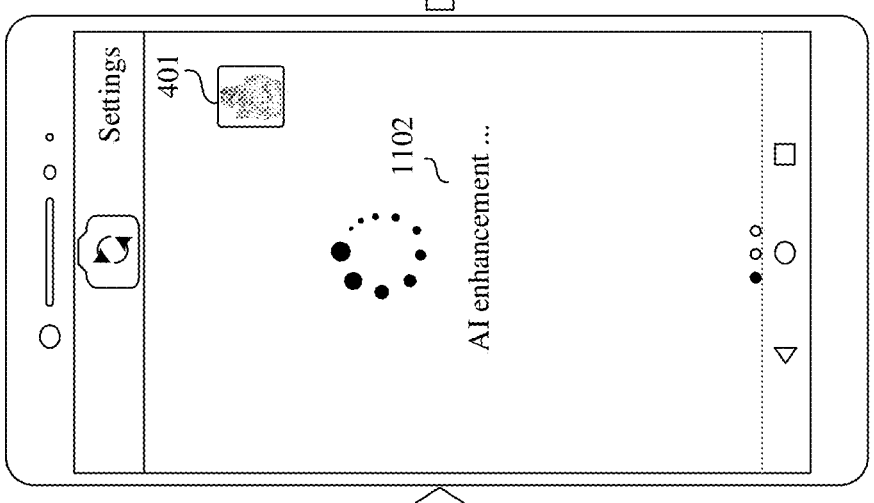
FIG. 11-2b
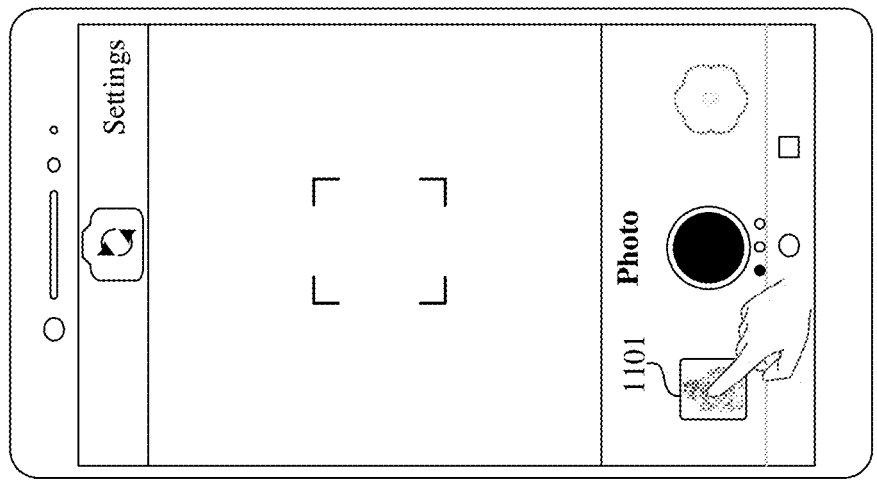
FIG. 11-2a
TO
FIG. 11-2f
TO
FIG. 11-2e

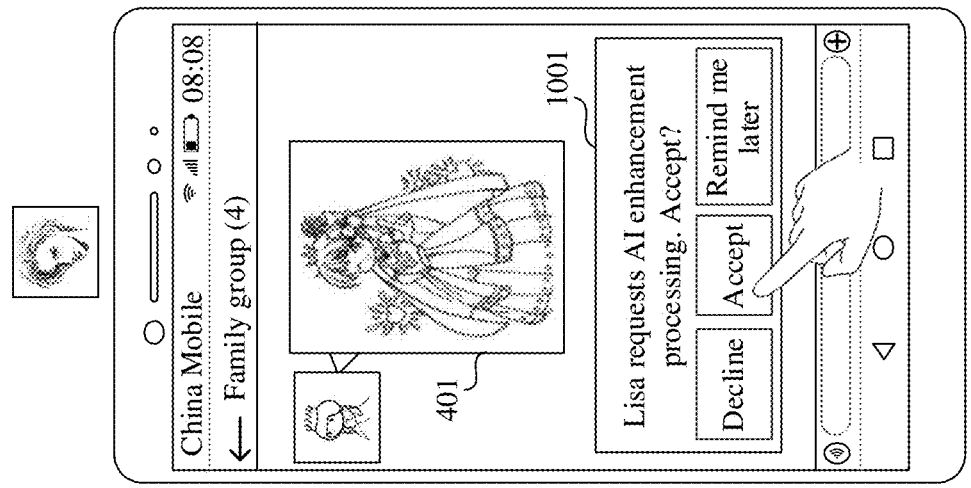
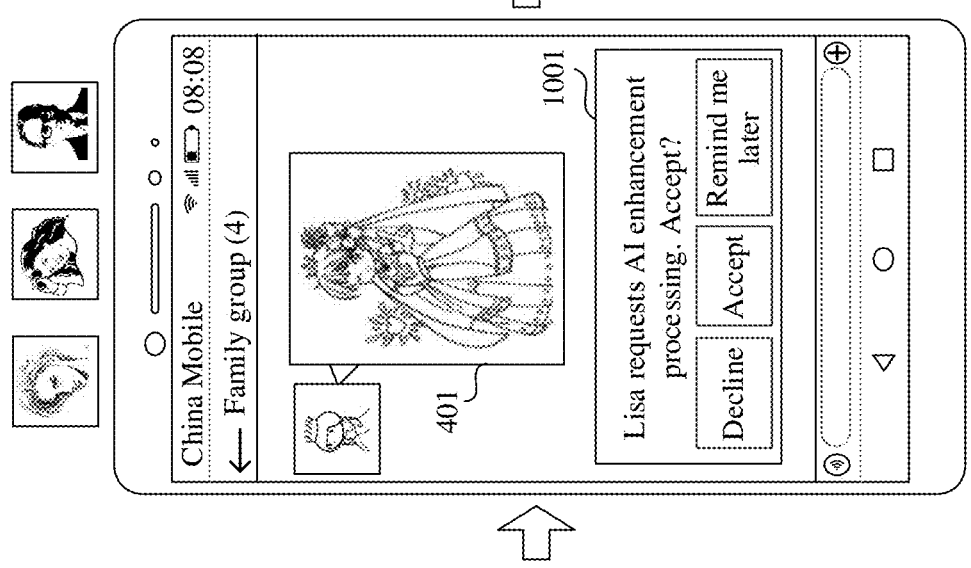
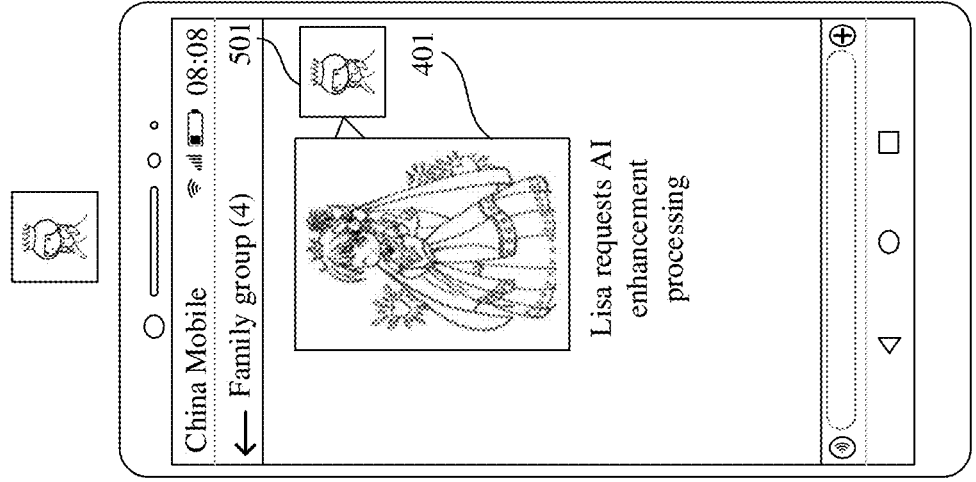
FIG. 12a
FIG. 12b
FIG. 12c TO FIG. 12d
TO FIG. 12e

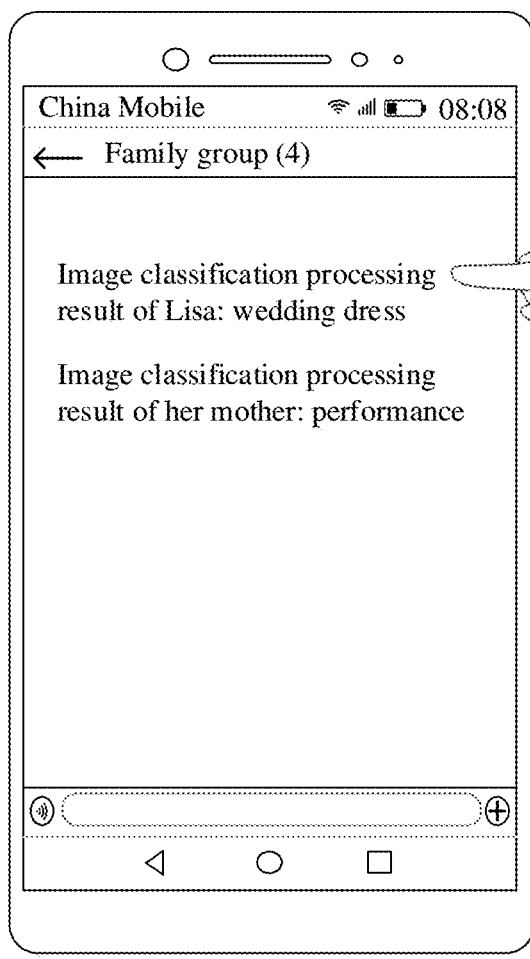
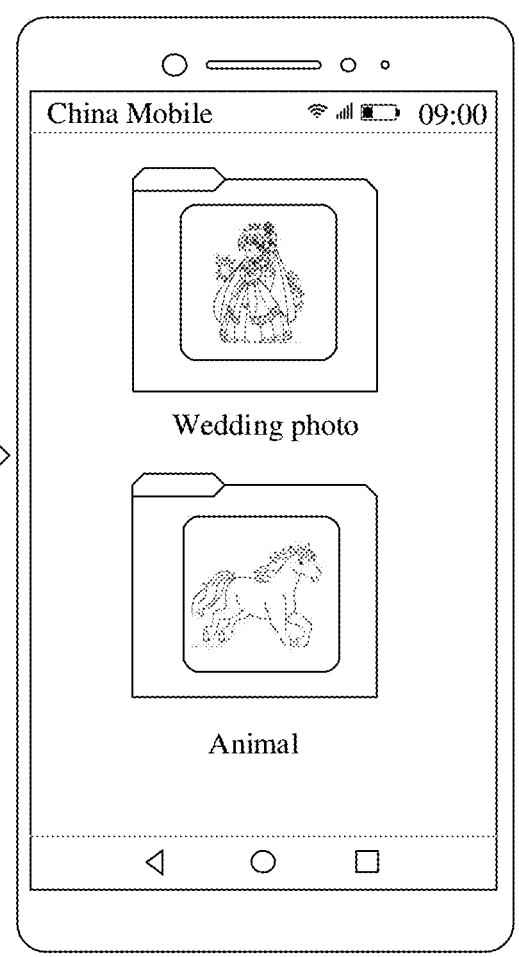
FIG. 16a
FIG. 16b

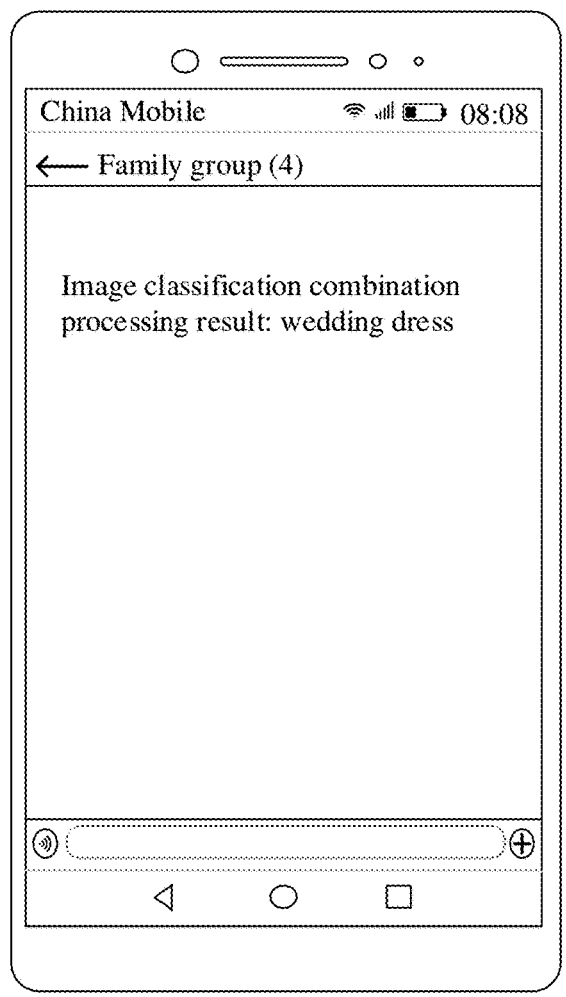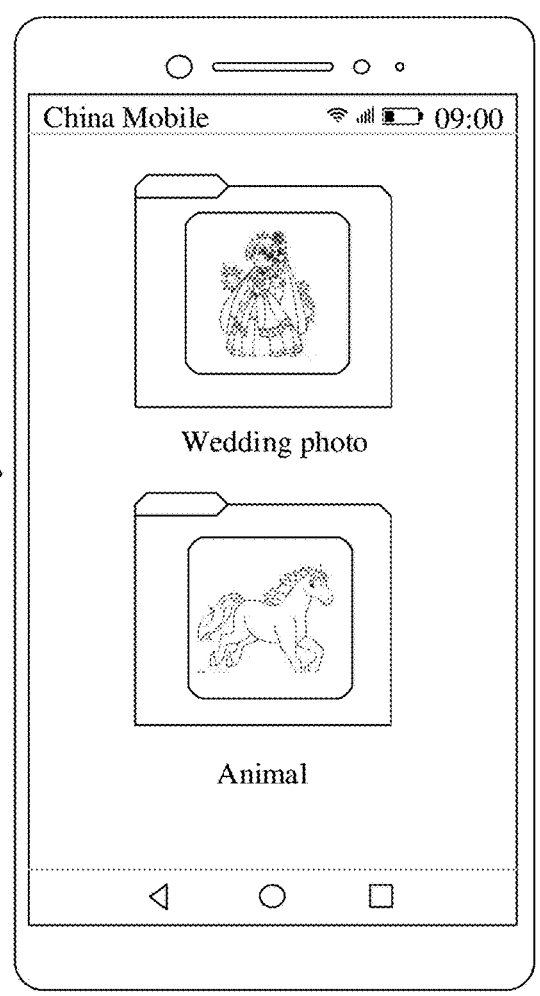
FIG. 17a
FIG. 17b

TO

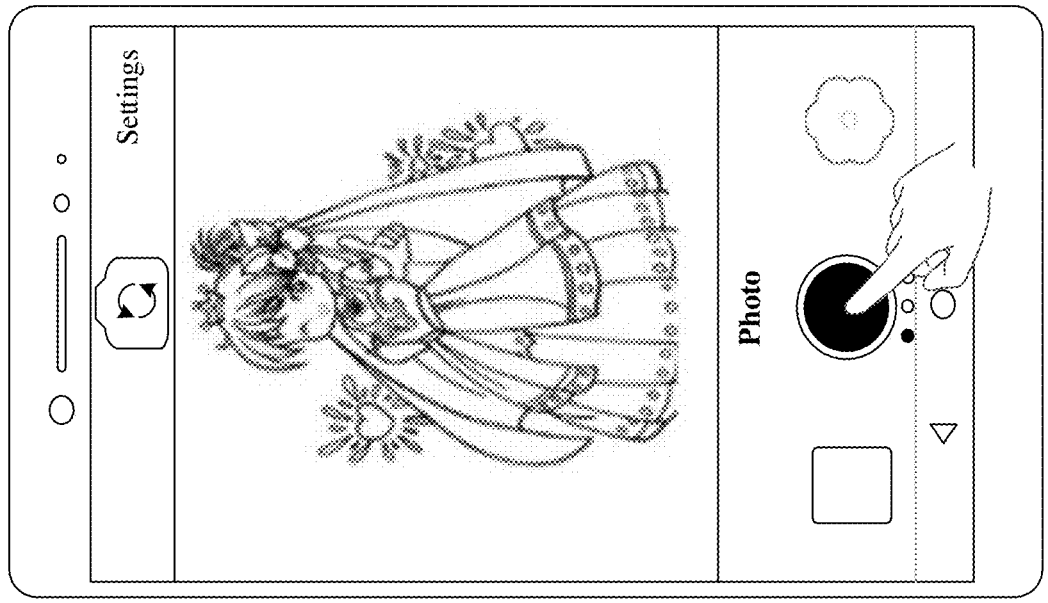
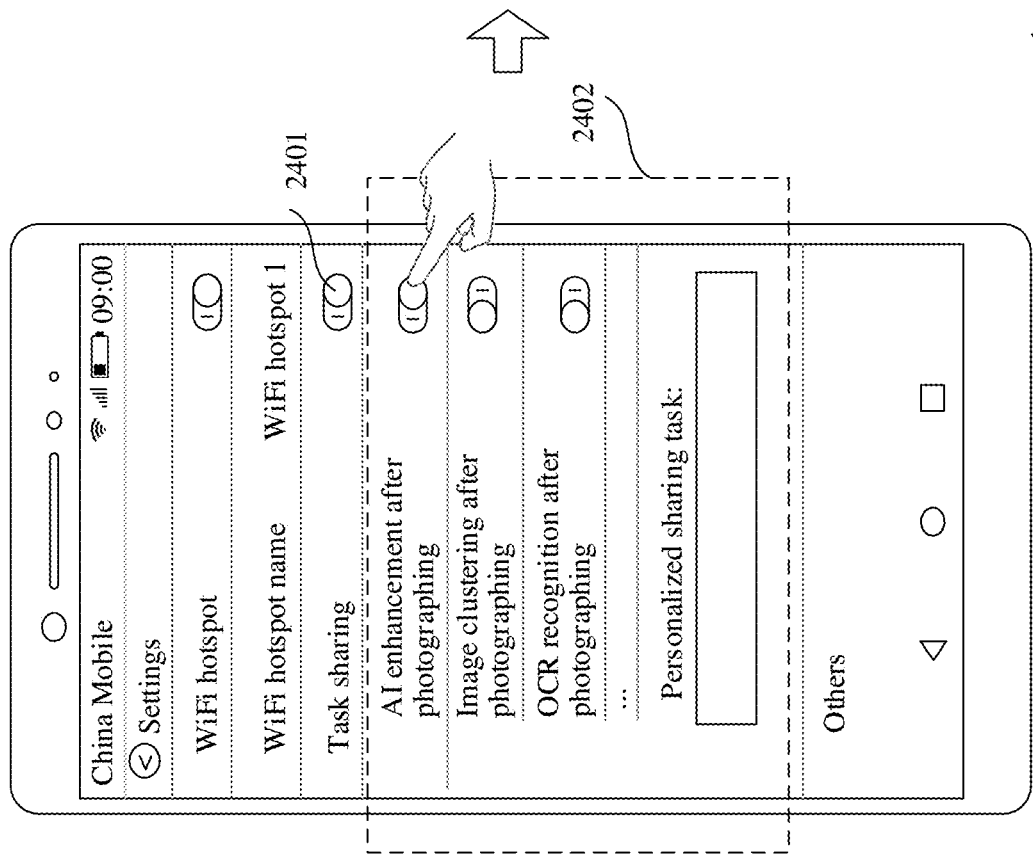
FIG. 24a

CONT. FROM FIG. 25b

CONT. FROM FIG. 25b

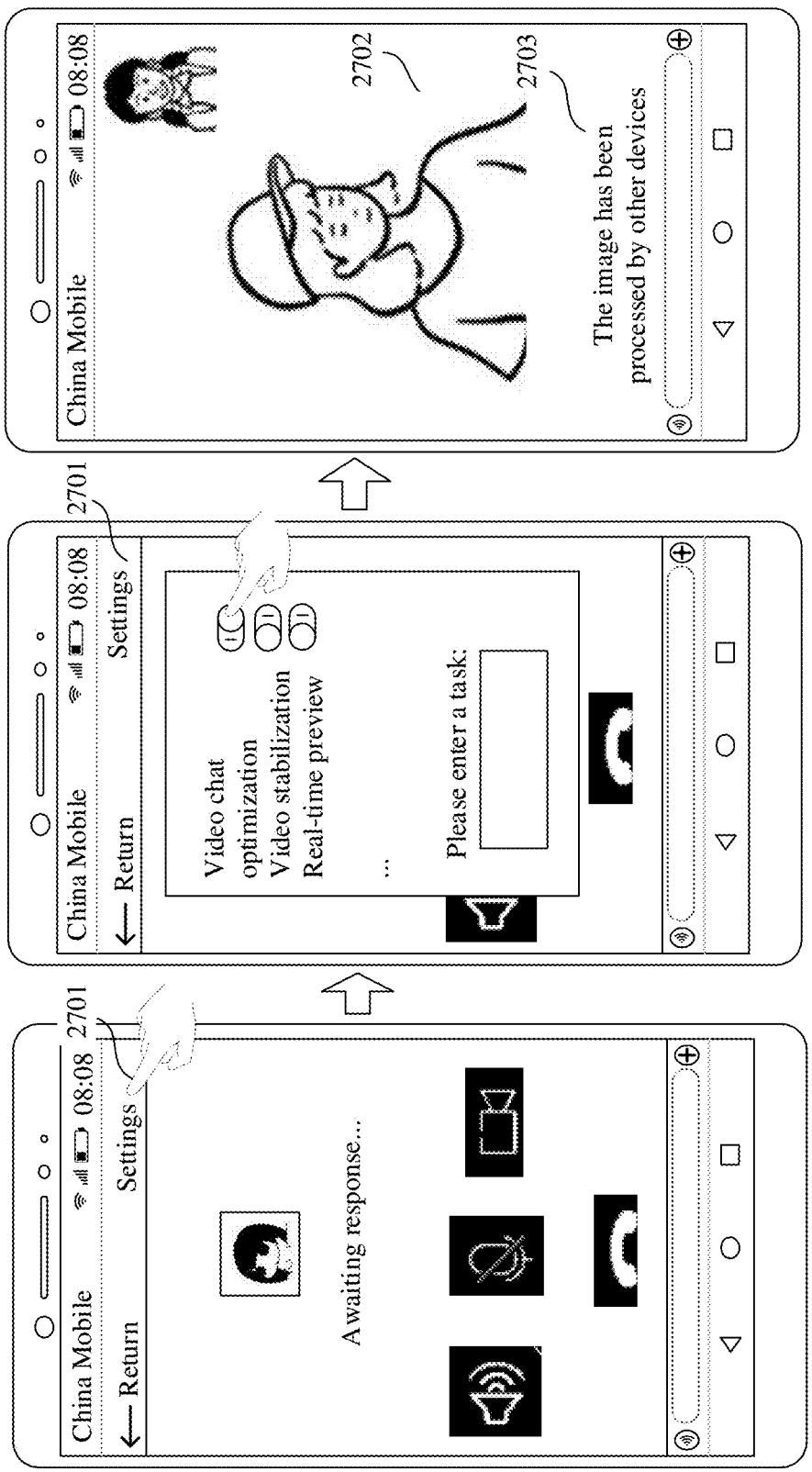

LENDING OF LOCAL PROCESSING CAPABILITY BETWEEN CONNECTED TERMINALS

CROSS REFERENCE TO RELATED APPLICATIONS

This application is a national stage of International Application No. PCT/CN2018/086225, filed on May 9, 2018, which is incorporated herein by reference in its entirety.

TECHNICAL FIELD

This application relates to the field of terminal technologies, and in particular, to an image processing method and an electronic device.

BACKGROUND

With development of mobile communication and terminal devices, a user poses an increasingly high requirement on processing a large quantity of daily tasks by using a terminal device. For example, these tasks may include images, image recognition, image classification, text translation, video optimization, and speech recognition. However, most terminal devices used in the market have weak local processing capabilities, and can only process a limited quantity of simple tasks. Consequently, a user requirement cannot be met, and user experience is relatively poor.

SUMMARY OF THE INVENTION

Embodiments of this application provide an image processing method and an electronic device, so that a user using a low-end device can enjoy a processing capability of a high-end device. This improves user experience for the low-end device.

To achieve the foregoing objective, the following technical solutions are used in the embodiments of this application.

According to a first aspect, an embodiment of this application provides an image processing method. The method may be applied to a first electronic device, and includes: displaying, by the first electronic device, a first screen, where the first screen is a camera screen of the first electronic device; detecting, by the first electronic device, a first operation of a user on the first screen; obtaining, by the first electronic device, a first image file through photographing in response to the first operation, where the image file includes a picture or a video; detecting, by the first electronic device, a second operation of the user on the first screen; and displaying, by the first electronic device, a second image file in response to the second operation, where the second image file is associated with a result obtained after a second electronic device processes the first image file.

According to this solution, the first electronic device having a relatively weak local processing capability may process the first image file by borrowing a capability of the second electronic device, so that the first electronic device locally displays a processing result. This can improve user experience for the first electronic device having a relatively weak local processing capability.

In a possible implementation, after the obtaining, by the first electronic device, a first image file through photographing, the method further includes: automatically sending, by the first electronic device, the first image file to the second electronic device; and automatically receiving processing data sent by the second electronic device, where the processing data is obtained by the second electronic device by processing the first image file, and the processing data is associated with the second image file.

In other words, after the first electronic device obtains the first image file through photographing, without a dedicated instruction operation of the user, the first electronic device may automatically send the first image file and automatically receive the processing data from the second electronic device.

In another possible implementation, before the obtaining, by the first electronic device, a first image file through photographing, the method further includes: receiving, by the first electronic device, a processing type that is set by the user; and sending the processing type to the second electronic device.

In this solution, the user may preset the processing type, and send the processing type to the second electronic device by using the first electronic device. The second electronic device may learn of the processing type, and then process the first image file based on the processing type.

In another possible implementation, the processing data includes the second image file.

In another possible implementation, the processing data includes a result obtained by performing facial recognition based on the first image file.

In another possible implementation, the processing data includes a label, the label corresponds to one folder, and the second image file is in the folder.

In another possible implementation, the processing type includes one or more of image beautification, image classification, image facial recognition, image clustering, image facial expression recognition, image age analysis, image optical character recognition OCR, or image semantic segmentation.

In another possible implementation, before the obtaining, by the first electronic device, a first image file through photographing, the method further includes: establishing, by the first electronic device, a short-distance connection to the second electronic device.

In other words, a plurality of electronic devices connected to each other in a short distance may lend respective processing capabilities.

In another possible implementation, there are a plurality of second electronic devices, and the processing data is data obtained by combining a plurality of pieces of processing data of the plurality of second electronic devices.

In this solution, when there are a plurality of electronic devices that process the first image file, processing results obtained by different electronic devices may be combined into one complete processing result.

In another possible implementation, there are a plurality of processing types, and processing data obtained by each second electronic device corresponds to at least one of the plurality of processing types.

In this solution, when there are a plurality of electronic devices that process the first image file, different electronic devices may cooperate with each other to complete an entire processing process.

According to a second aspect, an embodiment of this application provides another image processing method, including: obtaining, by a first electronic device, a first image file through photographing when detecting a first operation of a user, where the image file includes a picture or a video; sending, by the first electronic device, a processing type and the first image file to a second electronic device when detecting a fourth operation performed by the user for the first image file; automatically receiving, by the first electronic device, processing data sent by the second electronic device, where the processing data is associated with a second image file; and displaying, by the first electronic device, the second image file based on the processing data.

In this solution, the user may set the processing type after obtaining a picture through photographing, and send the processing type to the second electronic device by using the first electronic device, so that the second electronic device processes the first image file based on the processing type. Therefore, the first electronic device having a relatively weak local processing capability may process the first image file by borrowing a capability of the second electronic device, so that the first electronic device locally displays a processing result. This can improve user experience for the first electronic device having a relatively weak local processing capability.

According to a third aspect, an embodiment of this application provides another image processing method, including: establishing, by a first electronic device, a short-distance connection to a second electronic device; receiving, by the first electronic device, a processing type that is set by a user; sending, by the first electronic device, the processing type to the second electronic device; displaying, by the first electronic device, a first screen, where the first screen is a camera screen of the first electronic device; detecting, by the first electronic device, a first operation of the user on the first screen; obtaining, by the first electronic device, a first image file through photographing in response to the first operation, where the image file includes a picture or a video; automatically sending, by the first electronic device, the first image file to the second electronic device; automatically receiving, by the first electronic device, processing data sent by the second electronic device, where the processing data is obtained by the second electronic device by processing the first image file, and the processing data includes a second image file; detecting, by the first electronic device, a second operation of the user on the first screen; and displaying, by the first electronic device, the second image file in response to the second operation.

According to a fourth aspect, an embodiment of this application provides an image processing method. The method is applied to a second electronic device, and includes: establishing, by the second electronic device, a short-distance connection to a first electronic device; receiving, by the second electronic device, a first image file sent by the first electronic device, where the image file includes a picture or a video; displaying, by the second electronic device, a prompt screen, where the prompt screen is used to prompt a user that the first electronic device requests image processing; and when detecting that the user accepts a third operation requested by the first electronic device, processing, by the second electronic device, the first image file in response to the third operation, to obtain processing data, and sending the processing data to the first electronic device, where the processing data is associated with a second image file.

In this solution, the second electronic device having a relatively strong local processing capability may lend a capability for processing the first image file to the first electronic device, so that the first electronic device can locally display a processing result of the second electronic device. This can improve user experience for the first electronic device having a relatively weak local processing capability.

In a possible implementation, before the receiving, by the second electronic device, a first image file sent by the first electronic device, the method further includes: obtaining, by the second electronic device, a processing type.

In this solution, the second electronic device may obtain the processing type in advance before receiving the first image file, so that the second electronic device can process the first image file based on the processing type after receiving the first image file.

In another possible implementation, the third operation is an operation that a user sets the processing type for the first image file.

In this solution, after the first image file is received, the user may set the processing type, so that the second electronic device processes the first image file based on the processing type.

In another possible implementation, the processing data includes the second image file.

In another possible implementation, the processing data includes a result obtained by performing facial recognition based on the first image file.

In another possible implementation, the processing data includes a label, the label corresponds to one folder, and the second image file is in the folder.

In another possible implementation, the method further includes: displaying, by the second electronic device, the second image file based on the processing data.

In other words, the second electronic device may send the processing data to the first electronic device to display the second image file, or the second electronic device may locally display the second image file based on the processing data.

In another possible implementation, the processing type includes one or more of image beautification, image classification, image facial recognition, image clustering, image facial expression recognition, image age analysis, image optical character recognition OCR, or image semantic segmentation.

In another possible implementation, after the second electronic device obtains the processing data, the method further includes: negotiating, by the second electronic device, with another electronic device about the processing data for the first image file.

In this solution, when there are a plurality of second electronic devices that process the first image file, processing results obtained by different second electronic devices may be combined into one complete processing result.

According to a fifth aspect, an embodiment of this application provides another image processing method, including: establishing, by a second electronic device, a short-distance connection to a first electronic device; receiving, by the second electronic device, a first image file sent by the first electronic device; displaying, by the second electronic device, prompt information, where the prompt information is used to prompt a user that the first electronic device requests image processing; processing the first image file to obtain processing data; and sending the processing data to the first electronic device, where the processing data is associated with a second image file.

In this solution, after establishing the short-distance connection to the first electronic device, without an operation of the user, the second electronic device may automatically process an image processing request of the first electronic device and return processing data.

According to a sixth aspect, an embodiment of this application provides another image processing method, including: establishing, by a second electronic device, a short-distance connection to a first electronic device; obtaining, by the second electronic device, a processing type sent by the first electronic device; receiving, by the second electronic device, a first image file sent by the first electronic device; displaying, by the second electronic device, prompt information, where the prompt information is used to prompt a user that the first electronic device requests image processing; when detecting that the user accepts a third operation requested by the first electronic device, processing, by the second electronic device, the first image file in response to the third operation, to obtain processing data, where the processing data includes a second image file; negotiating with another electronic device about the processing data for the first image file; and sending the processing data to the first electronic device.

According to a seventh aspect, an embodiment of this application provides a first electronic device, including: a display unit, configured to display a first screen, where the first screen is a camera screen of the first electronic device; a detection unit, configured to detect a first operation of a user on the first screen; and a photographing unit, configured to obtain a first image file through photographing in response to the first operation, where the image file includes a picture or a video. The detection unit is further configured to detect a second operation of the user on the first screen. The display unit is further configured to display a second image file in response to the second operation, where the second image file is associated with a result obtained after a second electronic device processes the first image file.

In a possible implementation, the first electronic device further includes: a sending unit, configured to automatically send the first image file to the second electronic device after the photographing unit obtains the first image file through photographing; and a receiving unit, configured to automatically receive processing data sent by the second electronic device, where the processing data is obtained by the second electronic device by processing the first image file, and the processing data is associated with the second image file.

In another possible implementation, the receiving unit is further configured to: before the photographing unit obtains the first image file through photographing, receive a processing type that is set by the user. The sending unit is further configured to send the processing type to the second electronic device.

In another possible implementation, the processing data includes the second image file.

In another possible implementation, the processing data includes a result obtained by performing facial recognition based on the first image file.

In another possible implementation, the processing type includes one or more of image beautification, image classification, image facial recognition, image clustering, image facial expression recognition, image age analysis, image optical character recognition OCR, or image semantic segmentation.

In another possible implementation, the first electronic device further includes a connection unit, configured to: before the photographing unit obtains the first image file through photographing, establish a short-distance connection to the second electronic device.

In another possible implementation, there are a plurality of second electronic devices, and the processing data is data obtained by combining a plurality of pieces of processing data of the plurality of second electronic devices.

In another possible implementation, there are a plurality of processing types, and processing data obtained by each second electronic device corresponds to at least one of the plurality of processing types.

According to an eighth aspect, an embodiment of this application provides another first electronic device, including: a photographing unit, configured to obtain a first image file through photographing, where the image file includes a picture or a video; a sending unit, configured to send a processing type and the first image file to a second electronic device when a fourth operation performed by a user for the first image file is detected; a receiving unit, configured to automatically receive processing data sent by the second electronic device, where the processing data is associated with a second image file; and a display unit, configured to display the second image file based on the processing data.

According to a ninth aspect, an embodiment of this application provides another first electronic device, including: a connection unit, configured to establish a short-distance connection to a second electronic device; a receiving unit, configured to receive a processing type that is set by a user; a sending unit, configured to send the processing type to the second electronic device; a display unit, configured to display a first screen, where the first screen is a camera screen of the first electronic device; a detection unit, configured to detect a first operation of the user on the first screen; and a photographing unit, configured to obtain a first image file through photographing in response to the first operation, where the image file includes a picture or a video. The sending unit is further configured to automatically send the first image file to the second electronic device. The receiving unit is further configured to automatically receive processing data sent by the second electronic device, where the processing data is obtained by the second electronic device by processing the first image file, and the processing data includes a second image file. The detection unit is further configured to detect a second operation of the user on the first screen. The display unit is further configured to display the second image file in response to the second operation.

According to a tenth aspect, an embodiment of this application provides a second electronic device, including: a connection unit, configured to establish a short-distance connection to a first electronic device; a receiving unit, configured to receive a first image file sent by the first electronic device, where the image file includes a picture or a video; a display unit, configured to display prompt information, where the prompt information is used to prompt a user that the first electronic device requests image processing; a processing unit, configured to: when it is detected that the user accepts a third operation requested by the first electronic device, process the first image file in response to the third operation, to obtain processing data; and a sending unit, configured to send the processing data to the first electronic device, where the processing data is associated with a second image file.

In a possible implementation, the second electronic device further includes an obtaining unit, configured to obtain a processing type before the receiving unit receives the first image file sent by the first electronic device.

In another possible implementation, the third operation is an operation that a user sets the processing type for the first image file.

In another possible implementation, the processing data includes the second image file.

In another possible implementation, the processing data includes a result obtained by performing facial recognition based on the first image file.

In another possible implementation, the processing data includes a label, the label corresponds to one folder, and the second image file is in the folder.

In another possible implementation, the processing type includes one or more of image beautification, image classification, image facial recognition, image clustering, image facial expression recognition, image age analysis, image optical character recognition OCR, or image semantic segmentation.

In another possible implementation, the display unit is further configured to display the second image file based on the processing data.

In another possible implementation, the processing unit is further configured to: after obtaining the processing data, negotiate with another electronic device about the processing data for the first image file.

According to an eleventh aspect, an embodiment of this application provides another second electronic device, including: a connection unit, configured to establish a short-distance connection to a first electronic device; a receiving unit, configured to receive a first image file sent by the first electronic device; a display unit, configured to display prompt information, where the prompt information is used to prompt a user that the first electronic device requests image processing; a processing unit, configured to process the first image file to obtain processing data; and a sending unit, configured to send the processing data to the first electronic device, where the processing data is associated with a second image file.

According to a twelfth aspect, an embodiment of this application provides another second electronic device, including: a connection unit, configured to establish a short-distance connection to a first electronic device; an obtaining unit, configured to obtain a processing type sent by the first electronic device; a receiving unit, configured to receive a first image file sent by the first electronic device; a display unit, configured to display prompt information, where the prompt information is used to prompt a user that the first electronic device requests image processing; a processing unit, configured to: when the second electronic device detects that the user accepts a third operation requested by the first electronic device, process the first image file in response to the third operation, to obtain processing data, where the processing data includes a second image file; and negotiate with another electronic device about the processing data for the first image file; and a sending unit, configured to send the processing data to the first electronic device.

According to a thirteenth aspect, an embodiment of this application provides an electronic device, including one or more processors and one or more memories. The one or more memories are coupled to the one or more processors. The one or more memories are configured to store computer program code, where the computer program code includes a computer instruction. When the one or more processors execute the computer instruction, the electronic device is enabled to perform the image processing method according to any one of the possible implementations of any one of the foregoing aspects.

According to a fourteenth aspect, an embodiment of this application provides a computer storage medium, including a computer instruction. When the computer instruction is run on an electronic device, the electronic device is enabled to perform the image processing method according to any one of the possible implementations of any one of the foregoing aspects.

According to a fifteenth aspect, an embodiment of this application provides a computer program product. When the computer program product is run on a computer, the computer is enabled to perform the image processing method according to any one of the possible implementations of any one of the foregoing aspects.

BRIEF DESCRIPTION OF THE DRAWINGS

FIG. 3a and FIG. 3b are schematic diagrams of a group of screens according to an embodiment of this application;

FIG. 9a, FIG. 9b, FIG. 9c, and FIG. 9d are schematic diagrams of another group of screens according to an embodiment of this application;

FIG. 11-1a, FIG. 11-1b, FIG. 11-1c, and FIG. 11-1d are schematic diagrams of another group of screens according to an embodiment of this application;

FIG. 11-2a, FIG. 11-2b, FIG. 11-2c, FIG. 11-2d, FIG. 11-2e, and FIG. 11-2f are schematic diagrams of another group of screens according to an embodiment of this application;

FIG. 12a, FIG. 12b, FIG. 12c, FIG. 12d, and FIG. 12e are schematic diagrams of another group of screens according to an embodiment of this application;

FIG. 16a and FIG. 16b are schematic diagrams of another group of screens according to an embodiment of this application;

FIG. 17a and FIG. 17b are schematic diagrams of another group of screens according to an embodiment of this application;

FIG. 19-1 is a flowchart of a combination process according to an embodiment of this application;

FIG. 19-2 is a flowchart of another combination process according to an embodiment of this application;

FIG. 19-3 is a flowchart of another combination process according to an embodiment of this application;

FIG. 19-4 is a flowchart of another combination process according to an embodiment of this application;

FIG. 24a, FIG. 24b, FIG. 24c, and FIG. 24d are schematic diagrams of another group of screens according to an embodiment of this application;

FIG. 27a, FIG. 27b, and FIG. 27c are schematic diagrams of another group of screens according to an embodiment of this application;

DETAILED DESCRIPTION OF ILLUSTRATIVE EMBODIMENTS

For ease of understanding, some concepts related to the embodiments of this application are described as an example for reference, which is shown as follows:

Wireless fidelity (wireless fidelity, WiFi) direct: Wireless fidelity direct is also referred to as WiFi P2P, and is a point-to-point connection technology in which electronic devices within a specific range are directly connected to each other over WiFi to share and exchange content with each other.

Image understanding: Image understanding is semantic understanding of an image, and the image may include a static image, a dynamic image video, a two-dimensional image, a stereoscopic image, or the like.

Natural language: Natural language is language that naturally evolves with culture, for example, English and Chinese.

Natural language understanding: A computer is used to simulate a human language communication process, so that the computer can understand and use natural language of human society, thereby implementing man-computer natural language communication to replace some human brainwork including information querying, question answering, literature excerpting, information compiling, and all natural language information processing.

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of this application, unless otherwise stated, "a plurality of" means two or more than two.

Figure 1:
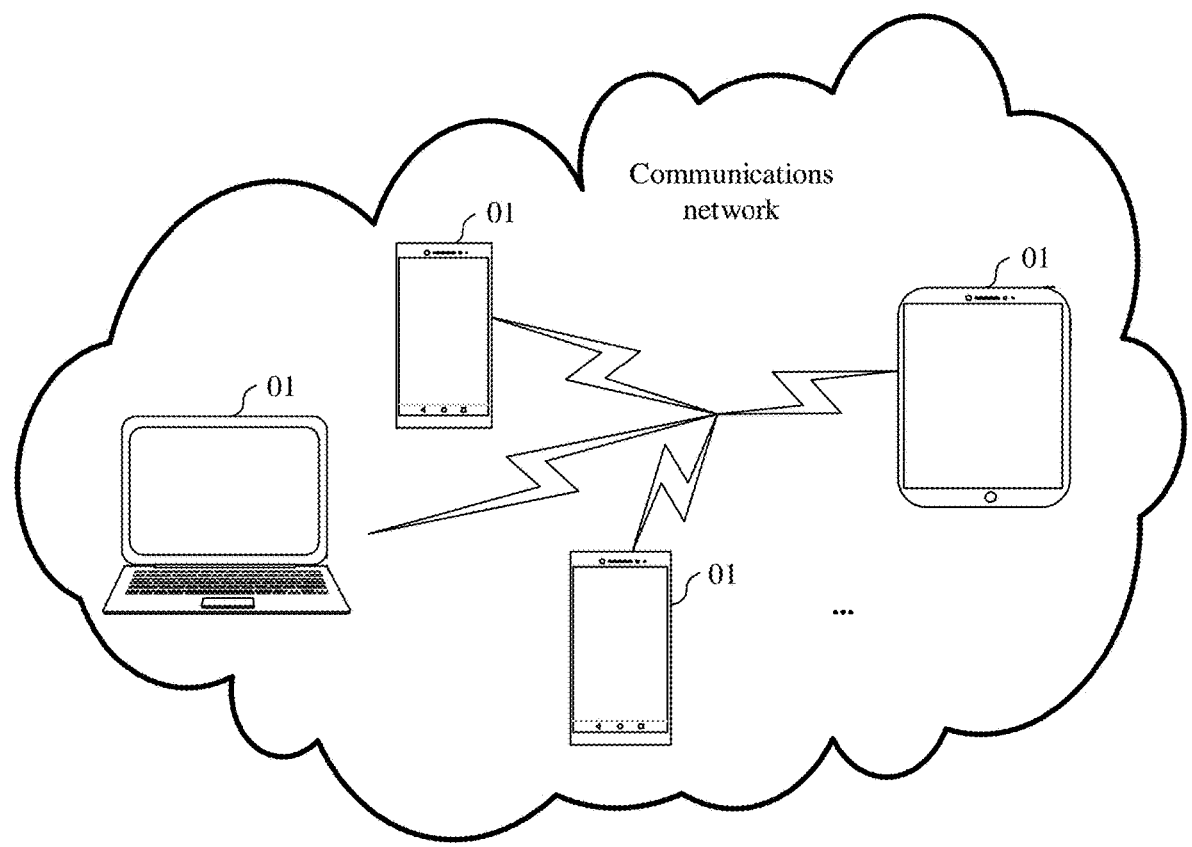
FIG. 1 is a schematic diagram of an interconnection scenario according to an embodiment of this application.

A task sharing method provided in the embodiments of this application may be applied to a scenario in which a plurality of electronic devices 01 shown in FIG. 1 are connected based on a communications network. The communications network may be a local area network, or may be a wide area network transferred through a relay (relay) device. When the communications network is a local area network, for example, the communications network may be a short-distance communications network such as a WiFi hotspot network, a WiFi direct network, a Bluetooth network, a ZigBee network, or a near field communication (near field communication, NFC) network. When the communications network is a wide area network, for example, the communications network may be a third-generation mobile communications technology (3rd-generation wireless telephone technology, 3G) network, a fourth-generation mobile communications technology (the 4th generation mobile communication technology, 4G) network, a fifth-generation mobile communications technology (5th-generation mobile communication technology, 5G) network, a future evolved public land mobile network (public land mobile network, PLMN), or the internet. In the scenario shown in FIG. 1, different electronic devices may exchange data with each other over the communications network, for example, a picture, a text, a video, or a result obtained after the electronic devices process an object such as a picture, a text, or a video.

In some embodiments of this application, the electronic device 01 shown in FIG. 1 may be a portable electronic device having another function such as a personal digital assistant function and/or a music player function, for example, a mobile phone, a tablet computer, or a wearable device (for example, a smartwatch) having a wireless communication function. An example embodiment of the portable electronic device includes but is not limited to a portable electronic device using iOS®, a portable electronic device using Android®, a portable electronic device using Microsoft®, or a portable electronic device using another operating system. The foregoing portable electronic device may alternatively be another portable electronic device, for example, a laptop (laptop) computer having a touch-sensitive surface (for example, a touch panel). It should be further understood that, in some other embodiments of this application, the electronic device 01 may alternatively not be a portable electronic device but a desktop computer having a touch-sensitive surface (for example, a touch panel).

Figure 2:
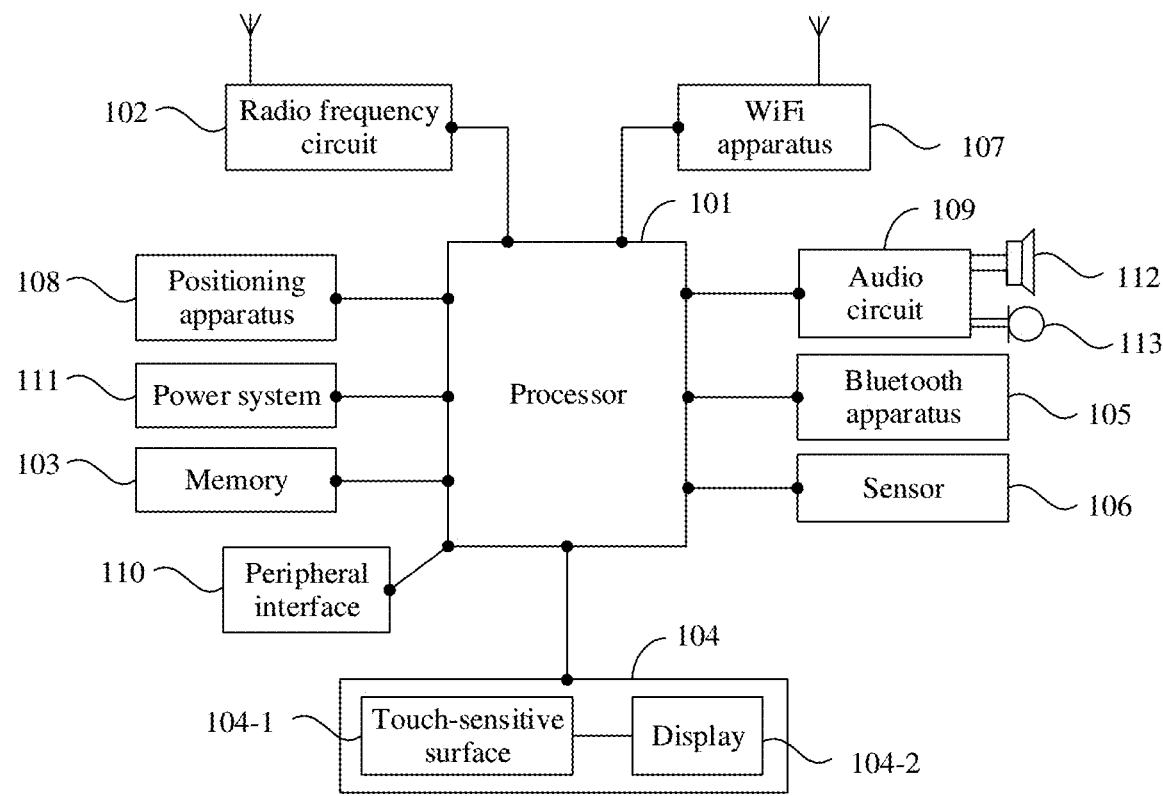
FIG. 2 is a schematic structural diagram of a mobile phone according to an embodiment of this application.

For example, as shown in FIG. 2, the electronic device 01 in the embodiments of this application may be a mobile phone 100. The following specifically describes the embodiments by using the mobile phone 100 as an example. It should be understood that the mobile phone 100 shown in FIG. 2 is merely an example of the electronic device 01, and the mobile phone 100 may include more or fewer components than those shown in the figure, or may combine two or more components, or may have different component arrangements. Various components shown in the figure may be implemented on hardware including one or more signal processors and/or application-specific integrated circuits, software, or a combination of hardware and software.

As shown in FIG. 2, the mobile phone 100 may specifically include components such as one or more processors 101, a radio frequency (radio frequency, RF) circuit 102, a memory 103, a touchscreen 104, a Bluetooth apparatus 105, one or more sensors 106, a WiFi apparatus 107, a positioning apparatus 108, an audio circuit 109, a peripheral interface 110, and a power system 111. These components may communicate with each other by using one or more communications buses or signal lines (not shown in FIG. 2). A person skilled in the art may understand that the hardware structure shown in FIG. 2 does not constitute a limitation on the mobile phone 100, and the mobile phone 100 may include more or fewer components than those shown in the figure, or may combine some components, or may have different component arrangements.

The following specifically describes the components of the mobile phone 100 with reference to FIG. 2.

The processor 101 is a control center of the mobile phone 100. The processor 101 is connected to all parts of the mobile phone 100 by using various interfaces and lines, and performs various functions of the mobile phone 100 and processes data by running or executing an application stored in the memory 103 and invoking data and an instruction that are stored in the memory 103. In some embodiments, the processor 101 may include one or more processing units. The processor 101 may further integrate an application processor and a modem processor. The application processor mainly processes an operating system, a user interface, an application, and the like. The modem processor mainly processes wireless communication. It can be understood that the modem processor may alternatively not be integrated into the processor 101. For example, the processor 101 may be a Kirin 960 chip manufactured by Huawei. In some embodiments of this application, the processor 101 may further include a fingerprint verification chip, configured to verify a collected fingerprint.

In some other embodiments of this application, the processor 101 may further include an AI chip. Learning and processing capabilities of the AI chip include an image understanding capability, a natural language understanding capability, a speech recognition capability, and the like. The AI chip may enable the mobile phone 100 to have better performance, a longer battery life, and better security and privacy. For example, if the mobile phone 100 processes data over cloud, the mobile phone 100 needs to upload the data for processing and then a result is returned, and consequently efficiency is very low under a prior-art condition. If the mobile phone 100 has a relatively strong AI learning capability, the mobile phone 100 does not need to upload data to cloud, but directly locally processes the data. Therefore, data security and privacy can be improved while processing efficiency is improved.

The radio frequency circuit 102 may be configured to receive and send a radio signal in an information receiving and sending process or in a call process. Specifically, after receiving downlink data from a base station, the radio frequency circuit 102 may send the downlink data to the processor 101 for processing. In addition, the radio frequency circuit 102 sends uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 103 is configured to store the application and the data. The processor 101 performs various functions of the mobile phone 100 and processes data by running the application and the data that are stored in the memory 103. The memory 103 mainly includes a program storage area and a data storage area. The program storage area may store an operating system, and an application required by at least one function (for example, a sound playback function or an image play function). The data storage area may store data (for example, audio data or a phone book) created when the mobile phone 100 is used. In addition, the memory 103 may include a high-speed random access memory, or may include a nonvolatile memory, such as a magnetic disk storage device, a flash memory, or another nonvolatile solid-state storage device. The memory 103 may store various operating systems, for example, an IOS® operating system developed by Apple and an Android® operating system developed by Google. For example, the memory 103 stores an application related to the embodiments of this application, for example, taskcard store, Twitter, Phone, Weibo, or WeChat. The memory 103 further stores information that may be related to registration and login in the embodiments of this application, for example, user name information.

The touchscreen 104 may include a touch-sensitive surface 104-1 and a display 104-2. The touch-sensitive surface 104-1 (for example, a touch panel) may collect a touch event performed by a user of the mobile phone 100 on or near the touch-sensitive surface 104-1 (for example, an operation performed by the user on the touch-sensitive surface 104-1 or near the touch-sensitive surface 104-1 by using any proper object such as a finger or a stylus), and send collected touch information to another component such as the processor 101. The touch event performed by the user near the touch-sensitive surface 104-1 may be referred to as floating touch. The floating touch may mean that the user does not need to directly come into contact with a touchpad to select, move, or drag a target (for example, an application (application, APP) icon), and the user only needs to be located near the mobile phone 100 to perform a desired function. In a floating touch application scenario, terms such as "touch" and "contact" do not implicitly mean to directly come into contact with the touchscreen 104, but to be near or close to the touchscreen 104. The touch-sensitive surface 104-1 that can perform floating touch may be implemented in a capacitive manner, an infrared sensing manner, an ultrasonic wave manner, or the like. The touch-sensitive surface 104-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and then sends the touch point coordinates to the processor 101. The touch controller may further receive an instruction sent by the processor 101, and execute the instruction. In addition, the touch-sensitive surface 104-1 may be implemented in a plurality of types, such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be configured in a form of a liquid crystal display, an organic light emitting diode, or the like. The touch-sensitive surface 104-1 may cover the display 104-2. After detecting a touch event on or near the touch-sensitive surface 104-1, the touch-sensitive surface 104-1 transmits the touch event to the processor 101 to determine a type of the touch event. Then, the processor 101 may provide a corresponding visual output on the display 104-2 based on the type of the touch event. In FIG. 2, the touch-sensitive surface 104-1 and the display screen 104-2 are used as two independent parts to implement input and output functions of the mobile phone 100. However, in some embodiments, the touch-sensitive surface 104-1 and the display screen 104-2 may be integrated to implement the input and output functions of the mobile phone 100. It can be understood that the touchscreen 104 is formed by stacking a plurality of layers of materials. In the embodiments of this application, only the touch-sensitive surface (layer) and the display screen (layer) are displayed, and another layer is not described in detail in the embodiments of this application. In addition, in some other embodiments of this application, the touch-sensitive surface 104-1 may cover the display 104-2, and a size of the touch-sensitive surface 104-1 is greater than a size of the display screen 104-2. Therefore, the display screen 104-2 is entirely covered below by the touch-sensitive surface 104-1. Alternatively, the touch-sensitive surface 104-1 may be disposed on the front of the mobile phone 100 in a full panel form. In other words, any touch performed by the user on the front of the mobile phone 100 can be sensed by the mobile phone. In this way, full touch experience on the front of the mobile phone can be implemented. In some other embodiments, the touch-sensitive surface 104-1 is disposed on the front of the mobile phone 100 in a full panel form, and the display screen 104-2 may also be disposed on the front of the mobile phone 100 in a full panel form. In this way, a bezel-less structure on the front of the mobile phone can be implemented. In some other embodiments of this application, the touchscreen 104 may further include a series of pressure sensor arrays, so that the mobile phone can sense pressure exerted on the touchscreen 104 by a touch event.

The mobile phone 100 may further include the Bluetooth apparatus 105, configured to implement data exchange between the mobile phone 100 and another short-distance electronic device (for example, a mobile phone or a smartwatch). In the embodiments of this application, the Bluetooth apparatus may be an integrated circuit, a Bluetooth chip, or the like.

The mobile phone 100 may further include the at least one sensor 106, for example, an optical sensor, a motion sensor, and another sensor. Specifically, the optical sensor may include an ambient light sensor and a proximity sensor. The ambient light sensor may adjust luminance of the display of the touchscreen 104 based on ambient light luminance. The proximity sensor may power off the display when the mobile phone 100 approaches an ear. As one of motion sensors, an accelerometer sensor may detect a magnitude of acceleration in each direction (usually, in three axes), may detect a magnitude and a direction of gravity when the accelerometer sensor is stationary, and may be used in an application for identifying a posture of the mobile phone (for example, screen switching between a landscape mode and a portrait mode, a related game, and magnetometer posture calibration), a vibration identification-related function (for example, a pedometer or a knock), and the like.

In some embodiments of this application, the sensor 106 may further include a fingerprint sensor. For example, the fingerprint sensor may be disposed on the back of the mobile phone 100 (for example, below a rear-facing camera), or the fingerprint sensor is disposed on the front of the mobile phone 100 (for example, below the touchscreen 104). In addition, the fingerprint sensor may be disposed on the touchscreen 104 to implement a fingerprint recognition function. In other words, the fingerprint sensor may be integrated with the touchscreen 104 to implement the fingerprint recognition function of the mobile phone 100. In this case, the fingerprint sensor may be disposed on the touchscreen 104 as a part of the touchscreen 104, or may be disposed on the touchscreen 104 in another manner. In addition, the fingerprint sensor may be further implemented as a full-panel fingerprint sensor. In this case, the touchscreen 104 may be considered as a panel on which a fingerprint may be collected at any position. The fingerprint sensor may send a collected fingerprint to the processor 101, so that the processor 101 processes the fingerprint (for example, verifies the fingerprint). The fingerprint sensor in the embodiments of this application may use any type of sensing technology, including but not limited to an optical sensing technology, a capacitive sensing technology, a piezoelectric sensing technology, an ultrasonic sensing technology, and the like.

In addition, another sensor such as a gyroscope, a barometer, a hygrometer, a thermometer, or an infrared sensor may be further disposed on the mobile phone 100. Details are not described herein.

The WiFi apparatus 107 is configured to provide network access complying with a WiFi-related standard protocol for the mobile phone 100. The mobile phone 100 may access a WiFi access point by using the WiFi apparatus 107, to help the user receive and send an email, browse a web page, access streaming media, and the like. The WiFi apparatus 107 provides wireless broadband internet access for the user. In some other embodiments, the WiFi apparatus 107 may also be used as a WiFi wireless access point, and may provide WiFi network access for another electronic device.

The positioning apparatus 108 is configured to provide a geographical location for the mobile phone 100. It can be understood that the positioning apparatus 108 may be specifically a receiver of a positioning system such as a global positioning system (global positioning system, GPS) or a BeiDou navigation satellite system. After receiving a geographical location sent by the foregoing positioning system, the positioning apparatus 108 sends the information to the processor 101 for processing, or sends the information to the memory 103 for storage. In some other embodiments, the positioning apparatus 108 may be a receiver of an assisted global positioning system (assisted global positioning system, AGPS). The AGPS runs in a manner in which GPS positioning is performed with mobile assistance. By using a signal of the base station together with a GPS satellite signal, the AGPS can enable a positioning speed of the mobile phone 100 to be faster. In the AGPS system, the positioning apparatus 108 may obtain positioning assistance through communication with an assisted positioning server (for example, a positioning server of the mobile phone 100). The AGPS system serving as an assisted server assists the positioning apparatus 108 in completing ranging and positioning services. In this case, the assisted positioning server communicates with the positioning apparatus 108 (that is, the receiver of the GPS) of the mobile phone 100 by using a wireless communications network. In some other embodiments, the positioning apparatus 108 may alternatively be a positioning technology that is based on a WiFi access point. Because each WiFi access point has a globally unique MAC address, the mobile phone 100 may scan and collect broadcast signals from surrounding WiFi access points when WiFi is enabled, and therefore can obtain MAC addresses that are broadcast by the WiFi access points. The mobile phone 100 sends, to a location server by using a wireless communications network, data (for example, the MAC addresses) that can identify the WiFi access points. The location server obtains a geographical location of each WiFi access point through retrieval, obtains a geographical location of the mobile phone 100 through calculation with reference to strength of the WiFi broadcast signals, and sends the geographical location to the positioning apparatus 108 of the mobile phone 100.

The audio circuit 109, a speaker 112, and a microphone 113 may provide an audio interface between the user and the mobile phone 100. The audio circuit 109 may convert received audio data into an electrical signal and transmit the electrical signal to the speaker 112, and the speaker 112 converts the electrical signal into a sound signal for output. In addition, the microphone 113 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the mobile phone 100 is connected to the mouse by using a universal serial bus interface, and is connected to a subscriber identity module (subscriber identity module, SIM) card provided by a telecommunications operator, by using a metal contact on a card slot of the subscriber identity module card. The peripheral interface 110 may be configured to couple the external input/output peripheral device to the processor 101 and the memory 103.

It can be understood that the mobile phone 100 may further include the power system 111 (for example, a battery and a power management chip) that supplies power to the components. The battery may be logically connected to the processor 101 by using the power management chip, to implement functions such as charging and discharging management and power consumption management by using the power system 111.

Although not shown in FIG. 2, the mobile phone 100 may further include a camera, for example, a front-facing camera or a rear-facing camera. The front-facing camera may be configured to capture facial feature information. The processor 101 may perform facial recognition on the facial feature information, to perform subsequent processing. The mobile phone 100 may further include a flash, a micro projection apparatus, a near field communication (near field communication, NFC) apparatus, and the like. Details are not described herein.

FIG. 3*a* shows a user interface 300 displayed on the touchscreen in the mobile phone 100. The user interface 300 may include a status bar 303, a navigation bar 306 that can be hidden, and a time and weather widget. The user interface 300 further includes a plurality of application icons, for example, an icon 304 of Weibo, an icon 305 of Alipay, an icon 302 of Camera, and an icon 301 of WeChat. The status bar 303 may include a name of an operator (for example, China Mobile), a time, a WiFi icon, signal strength, and an amount of current residual power. The navigation bar 306 may include a back (back) button icon, a home screen button icon, a forward button icon, and the like. In addition, it can be understood that, in some other embodiments, the status bar 303 may further include a Bluetooth icon, a mobile network (for example, 4G), an alarm icon, an icon of a connected device, and the like. It can be further understood that, in some other embodiments, the user interface 300 shown in FIG. 3*a* may further include a dock bar, and the dock bar may include an icon of a frequently used APP, and the like. After the mobile phone detects a touch event performed by using a finger of the user (or a stylus or the like) on an icon of a specific APP, in response to the touch event, the mobile phone may open a user interface of the APP corresponding to the APP icon. For example, after the mobile phone detects an event that the user touches the icon 302 of Camera by using a finger, in response to the event that the user touches the icon 302 of Camera by using the finger 307, the mobile phone opens a camera service screen shown in FIG. 3*b*.

In some other embodiments, the mobile phone 100 may further include a home screen button. The home screen button may be a physical button, or may be a virtual button. The home screen button is configured to enable a GUI displayed on the touchscreen to return to a specific page of a home screen based on an operation of the user, so that the user can conveniently view the home screen and operate a control (for example, an icon) on the home screen at any time. The foregoing operation may be specifically that the user taps the home screen button, or the user double taps the home screen button, or the user taps and holds the home screen button. In some other embodiments of this application, the home screen button may further integrate a fingerprint sensor. Therefore, when the user taps the home screen button, the electronic device may accordingly collect a fingerprint to confirm an identity of the user.

All the following embodiments may be implemented in the electronic device 01 (for example, the mobile phone 100 or a tablet computer) having the foregoing hardware structure. In the following embodiments, an example in which the electronic device 01 is the mobile phone 100 is used to describe the task sharing method provided in the embodiments of this application.

According to the task sharing method provided in the embodiments of this application, results obtained after different electronic devices process a same task and capabilities (referred to as task processing capabilities below) of local ends of a plurality of connected electronic devices for processing the task may be shared between the plurality of electronic devices. A task processing capability of an electronic device means various processing functions of the electronic device, for example, a processing capability, a storage capability, or a communication capability of an AI chip. The electronic device may have different task processing capabilities for processing different tasks. For example, the AI chip of the electronic device may have processing capabilities including an image understanding capability, a natural language understanding capability, and a speech recognition capability. Based on the image understanding capability of the AI chip, the electronic device may execute tasks including an image beautification task, an image classification task, an image facial recognition task, an image clustering task, an image facial expression recognition task, an image age analysis task, an image optical character recognition (optical character recognition, OCR) task, an image semantic segmentation task, and the like. Based on the natural language understanding capability of the AI chip, the electronic device may execute tasks including a text translation task, a text intent recognition task, an entity extraction task, and the like.

In a plurality of connected electronic devices, when a low-end device having no task processing capability or having a relatively poor task processing capability shares a task processing result of a high-end device, it can be understood that the low-end device borrows the task processing capability of the high-end device. For example, a high-end device may be Huawei Mate 10 Pro, and a low-end device may be Huawei Enjoy 5. For a situation of comparing a hardware configuration and a photographing processing function of Huawei Mate 10 Pro with those of Huawei Enjoy 5, refer to Table 1. The hardware configuration of Huawei Mate 10 Pro is higher than that of Huawei Enjoy 5, and the photographing processing capability of Huawei Mate 10 Pro is also stronger than that of Huawei Enjoy 5. Therefore, Huawei Enjoy 5 can use a task processing capability of Huawei Mate 10 Pro.

Application scenario 1: A to-be-executed task is a non-real-time and non-consecutive task. The non-real-time and non-consecutive task is a task that processing does not need to be continuously performed for a plurality of times and processing results are obtained in real time, for example, a task of processing an obtained picture or an obtained text, or a task of processing a shot video. The electronic device may execute different tasks for different to-be-processed objects.

An example in which a to-be-processed object in a to-be-executed task is a picture is used below to describe the task sharing method provided in the embodiments of this application. The picture may be a picture obtained by an electronic device 1 through photographing, or may be a picture stored in the electronic device 1, or may be a picture received by the electronic device 1 from another device. Tasks corresponding to the picture may include image beautification, image classification, image facial recognition, image clustering, image facial expression recognition, image age analysis, image OCR recognition, image semantic segmentation, and the like.

Figure 4C:
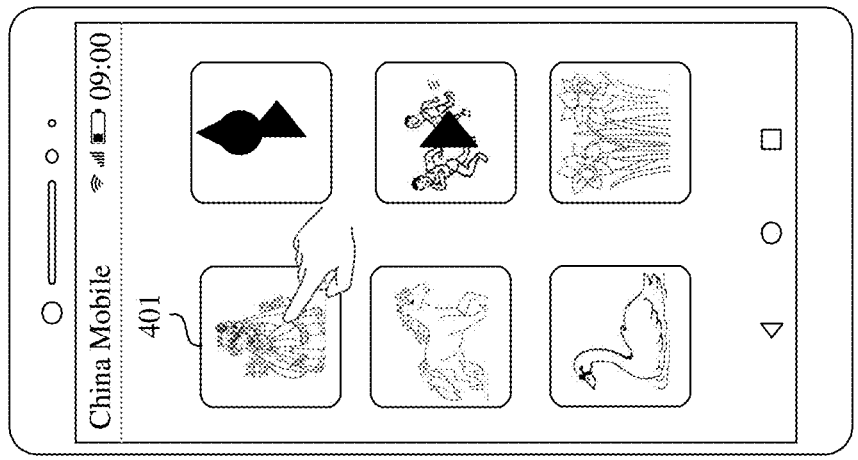
FIG. 4a, FIG. 4b, FIG. 4c, FIG. 4d, and FIG. 4e are schematic diagrams of another group of screens according to an embodiment of this application.
Figure 4B:
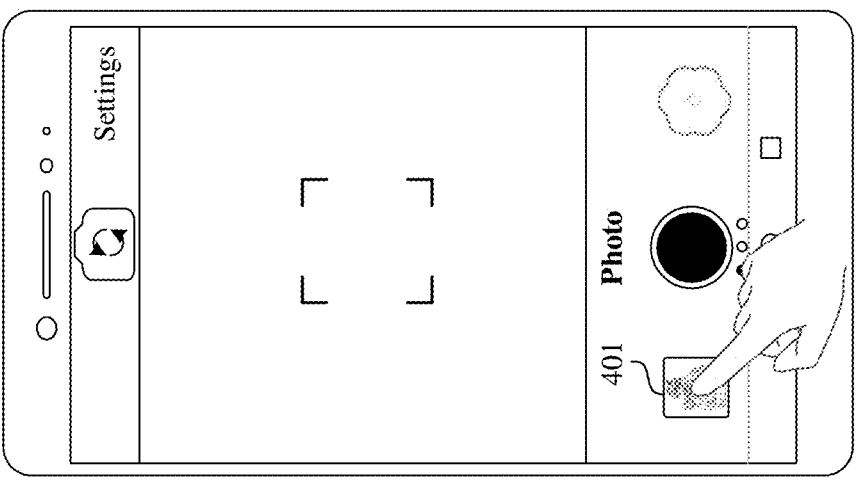
Figure 4A:
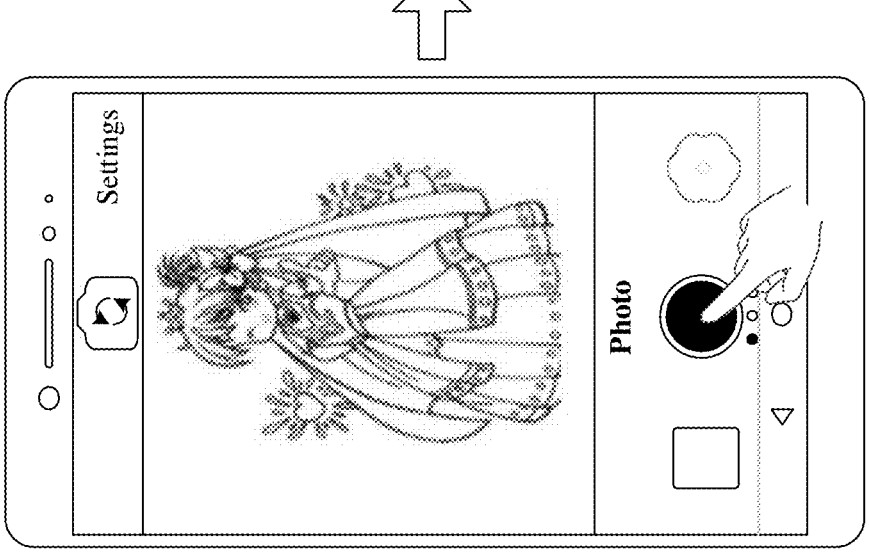

For example, in response to an operation that a user 1 taps the icon 302 of Camera shown in FIG. 3a, the electronic device 1 displays a photographing screen shown in FIG. 4a. Referring to FIG. 4b, the electronic device 1 obtains a first picture 401 through photographing (for example, through

TABLE 1

| Model | Huawei Mate 10 Pro | Huawei Enjoy 5 |
| --- | --- | --- |
| Processor | CPU model: Kirin 970 CPU; Quantity of cores: 8; Co-processor i7CPU; Dominant frequency: 4xCortex-A73, 2.36 GHz, 4xCortex-A53, 1.8 GHz; GPU: Mali-G72 MP12; NPU: neural processing unit | 64-bit kernel, MT6735 |
| Memory | Operation memory (RAM): 6 GB; Device memory (ROM): 64 GB/128 GB | RAM: 2 GB ROM: 16 GB |
| Battery | Support a maximum of 4000 mAh charging current of 5 A; 3G call: up to 25 hours; 4G web browsing: up to 22 hours; Video playback: up to 22 hours; Audio playback: up to 80 hours; Standby time: up to 22 days | Capacity: 4000 mAh |
| Photographing hardware | Rear-facing camera: 12 MP (color) +20 MP (black and white), f/1.6, Leica lens, and OIS optical image stabilizer; Front-facing camera: 8 MP, f/2.0; Sensor type: BSI CMOS flash: dual-LED flash | Rear-facing camera: 13 MP; Front-facing camera: 5 MP |
| Photographing processing function | Video shooting: The rear-facing camera supports a maximum of 4K (3840 × 2160) 30 fps, and the front-facing camera supports a maximum of FHD (1920 × 1080) 30 fps. The rear-facing camera supports 720 p@240 fps slow lens. Zoom mode: 2x dual-camera zoom; Photographing mode: AI scene recognition, 3D dynamic panorama, wide aperture, 2x dual-camera zoom, monochrome camera, slow motion, light painting (including tail light trails, light graffiti, silky water, and star track), super night mode, pro mode, portrait mode, perfect selfie, beauty video, panorama, HDR, ultra snapshot, capture smiles, audio control, timer photo, touch to capture, watermark, document correction, and time-lapse; Autofocus: PDAF laser depth CAF hybrid autofocus (rear-facing camera); Photo resolution: up to 5120 × 3840 pixels | — |

Figure 4D:
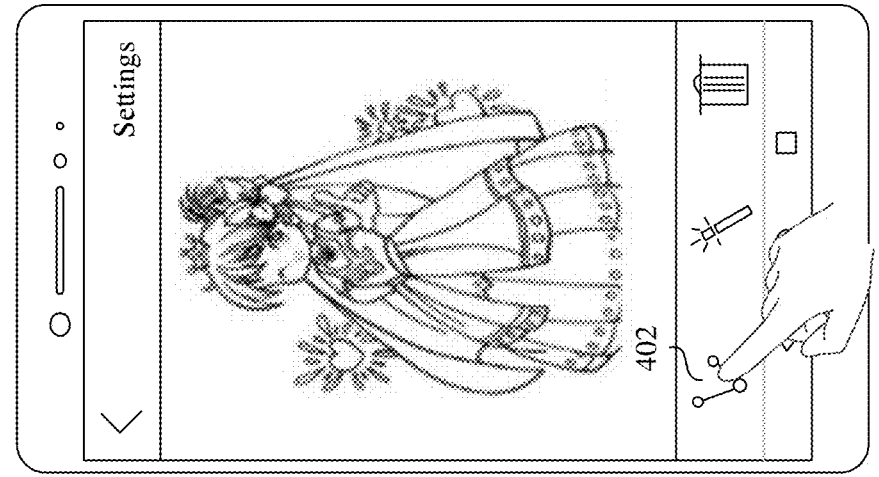
Figure 4E:
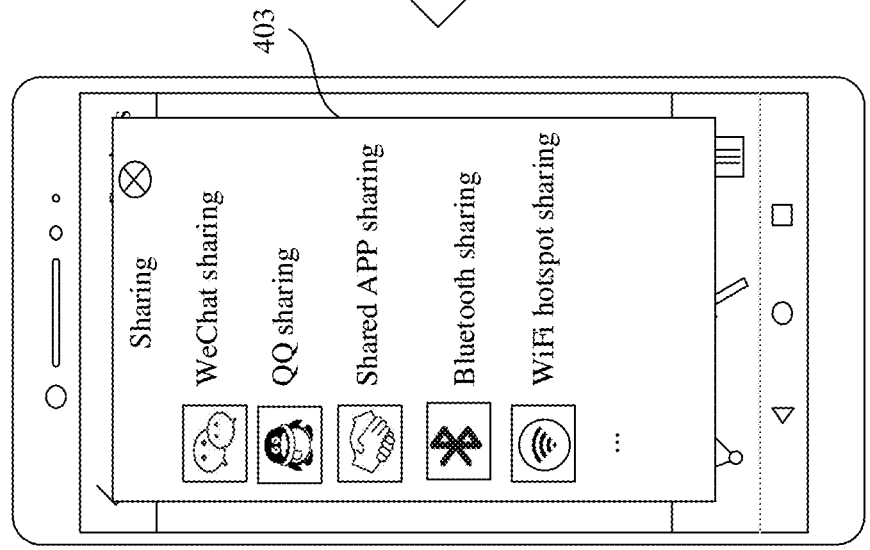

With reference to the accompanying drawings and application scenarios, a task that can be executed by the AI chip is mainly used as an example below to describe in detail the task sharing method provided in the embodiments of this application.

self-portrait photographing). When the electronic device 1 detects an operation (for example, a tap operation) performed by the user 1 on the first picture 401 on a photographing screen in FIG. 4b, or as shown in FIG. 4c, when the electronic device 1 detects an operation performed by the user on the first picture 401 in an album, in response to the operation, the electronic device 1 displays a sharing option 402 shown in FIG. 4d. Referring to FIG. 4e, when the user 1 selects the sharing option 402, the electronic device 1 displays a sharing list 403, and the sharing list 403 includes a manner of sharing the first picture 401.

The sharing manner may include an APP sharing manner such as WeChat sharing, QQ sharing, facebook sharing, or Shared APP sharing, and a network sharing manner such as Bluetooth sharing, WiFi hotspot sharing, WiFi direct sharing, or NFC sharing.

First, the APP sharing manner is described.

In some embodiments of this application, when the user 1 selects one APP sharing manner (for example, WeChat sending or Shared APP sending) from the sharing list 403, the user 1 may select to send the first picture 401 to one or more friends, and the user 1 may further notify other electronic devices of the one or more friends of a processing task for the first picture 401 by using an APP.

Figures 5A, 5B:
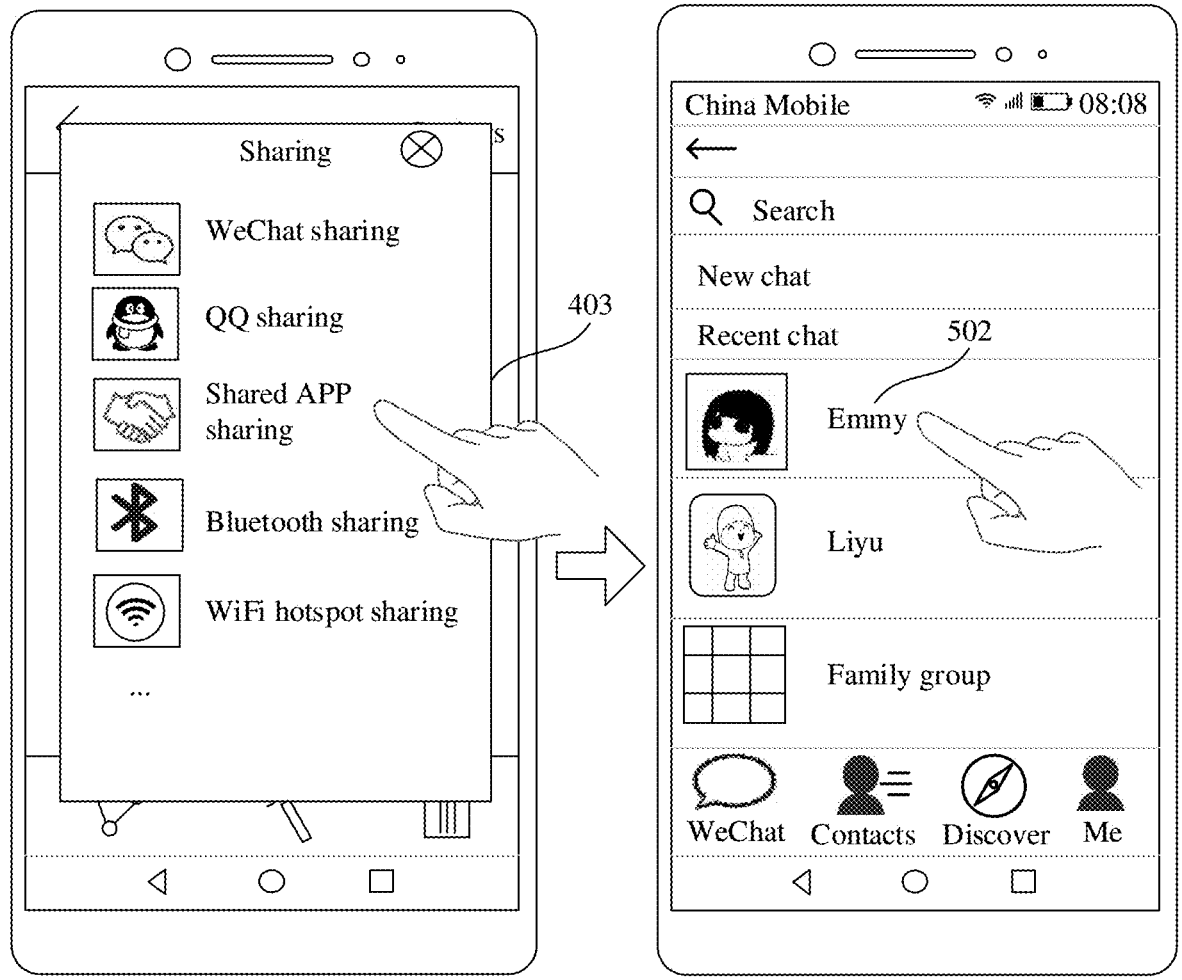
FIG. 5a, FIG. 5b, and FIG. 5c are schematic diagrams of another group of screens according to an embodiment of this application.
Figure 5C:
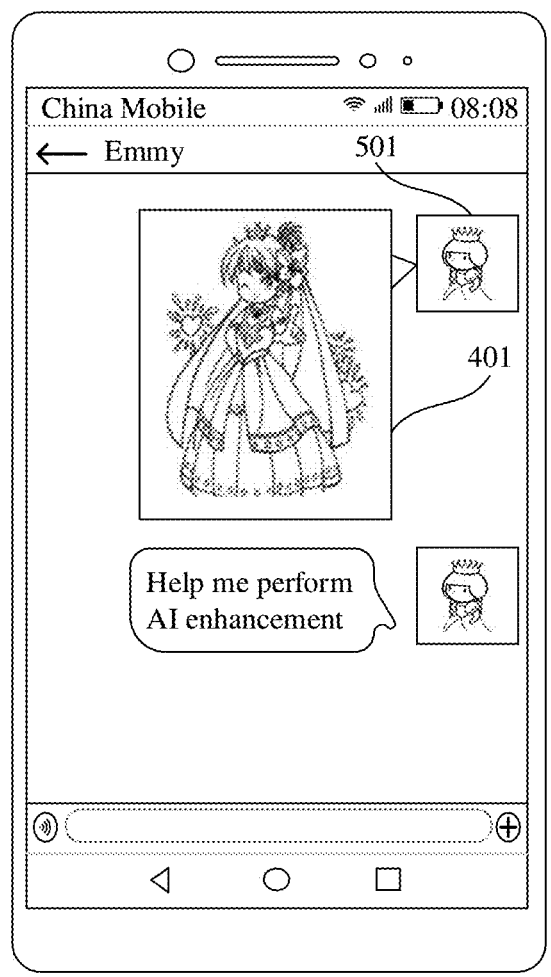

For example, referring to FIG. 5a to FIG. 5c, when the user 1, namely, Lisa 501, selects Shared APP sharing from the sharing list 403, the user 1 may select a friend Emmy 502 and send the first picture 401 to Emmy 502, and the user 1 may further notify the friend of the to-be-processed task by using a voice or a text. For example, referring to FIG. 5c, the user 1 may send a WeChat message to request the friend to perform AI enhancement on the first picture 401. In other words, the to-be-processed task for the first picture 401 is "AI enhancement". Alternatively, the user 1 may call the friend to request the friend to perform AI enhancement on the first picture 401. Alternatively, if the friend is around, the user 1 may orally request the friend to perform AI enhancement on the first picture 401.

The AI enhancement may be image beautification. For example, the AI enhancement may be identifying different entities in an image and performing enhancement processing on the different entities, for example, making sky more blue, making grass more green, and performing facial beautification. For example, during facial beautification, the AI enhancement may include filter processing and skin smoothing processing. The AI enhancement may be performing facial three-dimensional enhancement, performing bodybuilding, face slimming, and the like through optical distortion correction, making brightness of the face more natural through light compensation, and the like.

It should be noted that, on an APP message display screen provided in the embodiments of this application, a message on the right side is sent by a user by using a current electronic device, and a message on the left side is sent by a friend by using another electronic device. For example, in FIG. 5c, a message on the right is sent by the current user Lisa to the friend Emmy.

After receiving the first picture, the friend Emmy may perform AI enhancement on the first picture by using an electronic device 2. After the electronic device 2 performs AI enhancement on the first picture, Emmy returns a second picture obtained after processing to the user 1 Lisa.

Figure 6C:
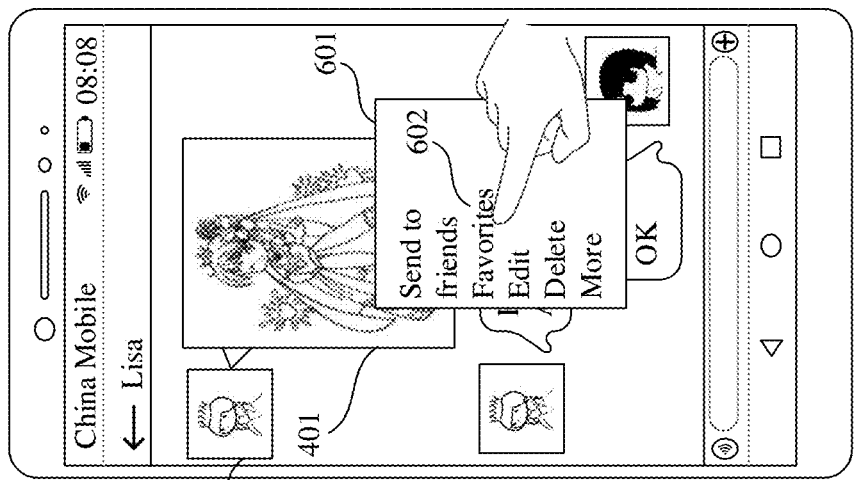
FIG. 6a, FIG. 6b, FIG. 6c, FIG. 6d, and FIG. 6e are schematic diagrams of another group of screens according to an embodiment of this application.
Figure 6B:
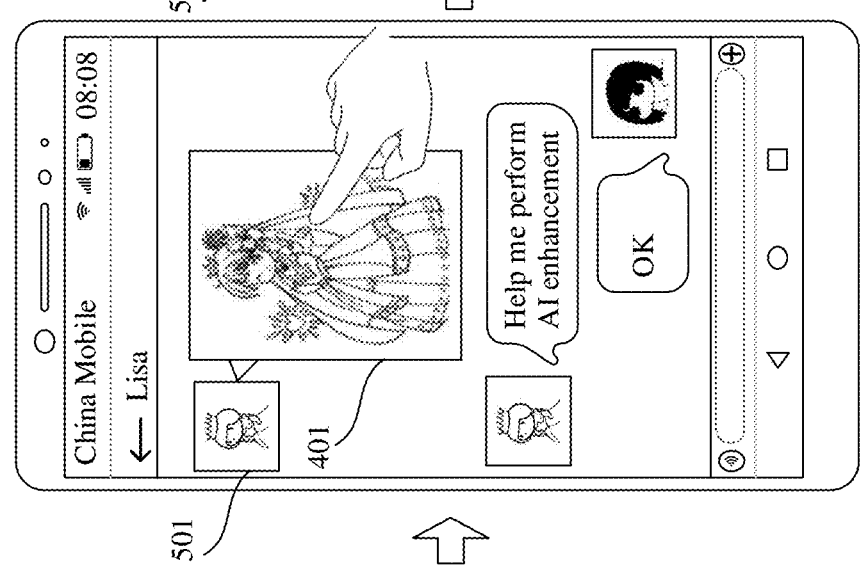
Figure 6A:
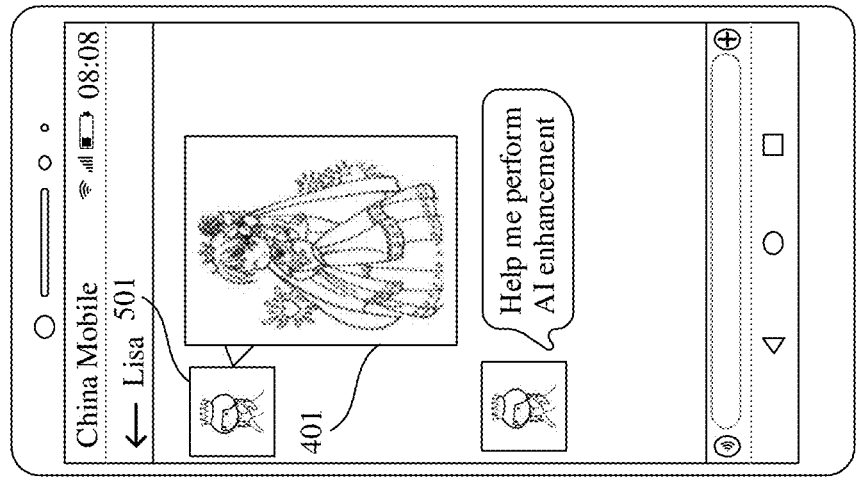
Figure 6D:
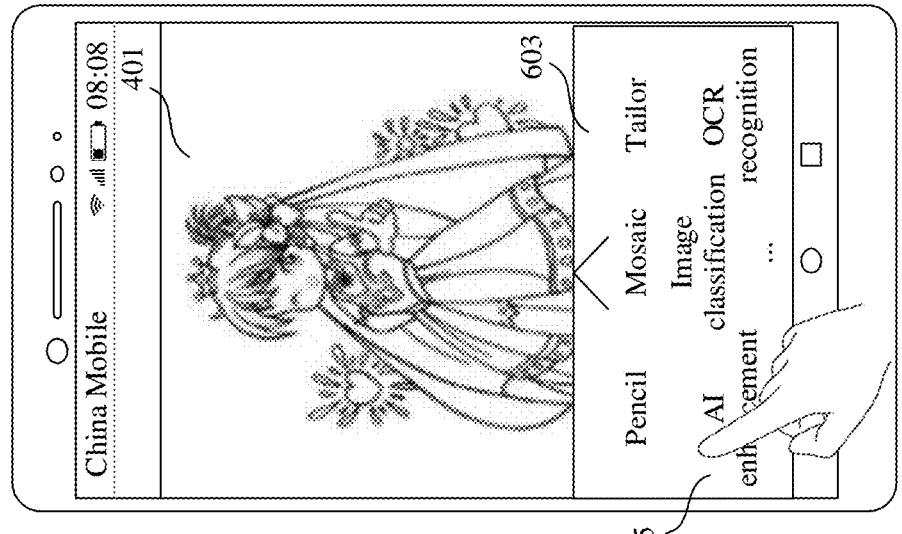
Figure 6E:
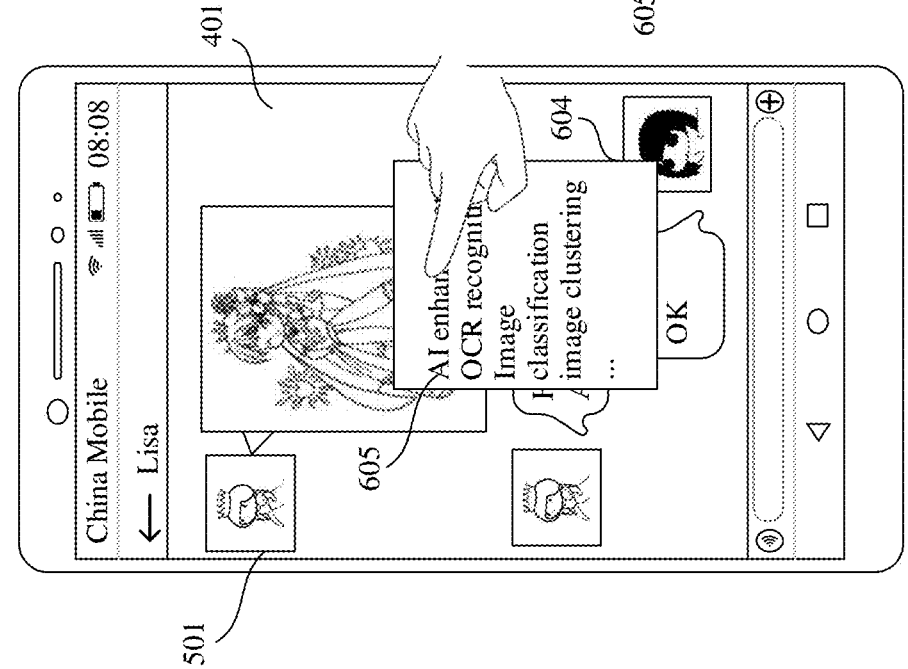

For example, referring to FIG. 6a to FIG. 6c, when the electronic device 2 used by Emmy detects a first preset gesture (for example, a touch and hold gesture) of Emmy (a user 2) for the first picture 401, the electronic device 2 displays a prompt box 601. Referring to FIG. 6d, when the user 2 selects an editing option 602 in the prompt box 601, the electronic device 2 displays a task list 603. The task list 603 includes picture processing operations, for example, options such as AI enhancement 605, picture classification, picture clustering, and image facial recognition. For another example, referring to FIG. 6b and FIG. 6e, when the electronic device 2 detects a preset gesture (for example, a touch and hold gesture) of the user 2 for the first picture 401, the electronic device 2 displays a task list 604. The task list 604 may include options such as AI enhancement 605, OCR recognition, image classification, and image clustering.

Figure 7A:
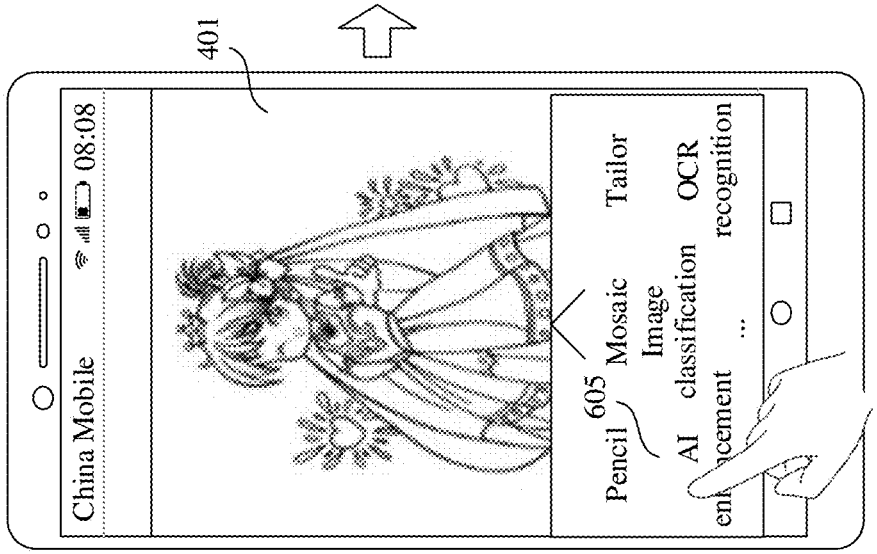
FIG. 7a, FIG. 7b, FIG. 7c, FIG. 7d, and FIG. 7e are schematic diagrams of another group of screens according to an embodiment of this application.
Figures 7B, 7C:
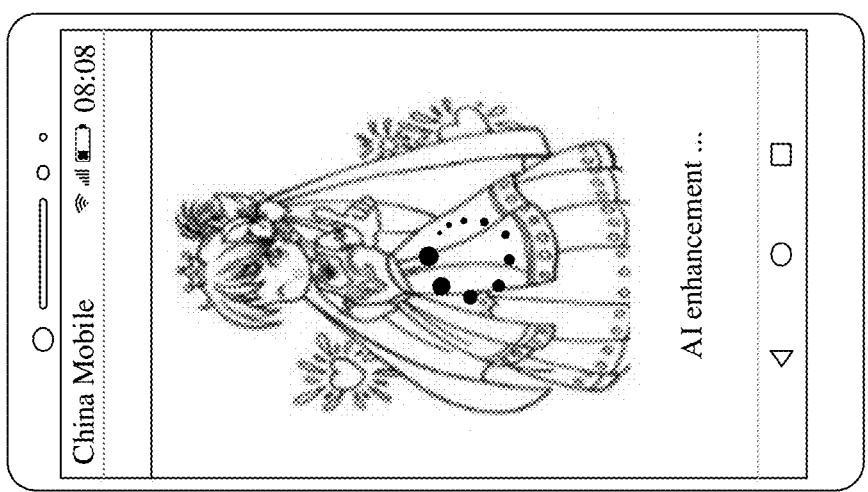
Figures 7D, 7E:
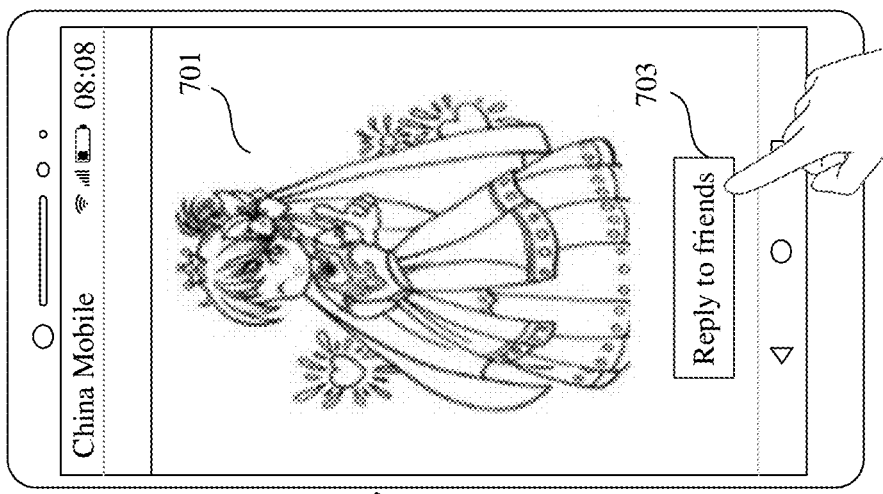
Figures 7C, 7D:
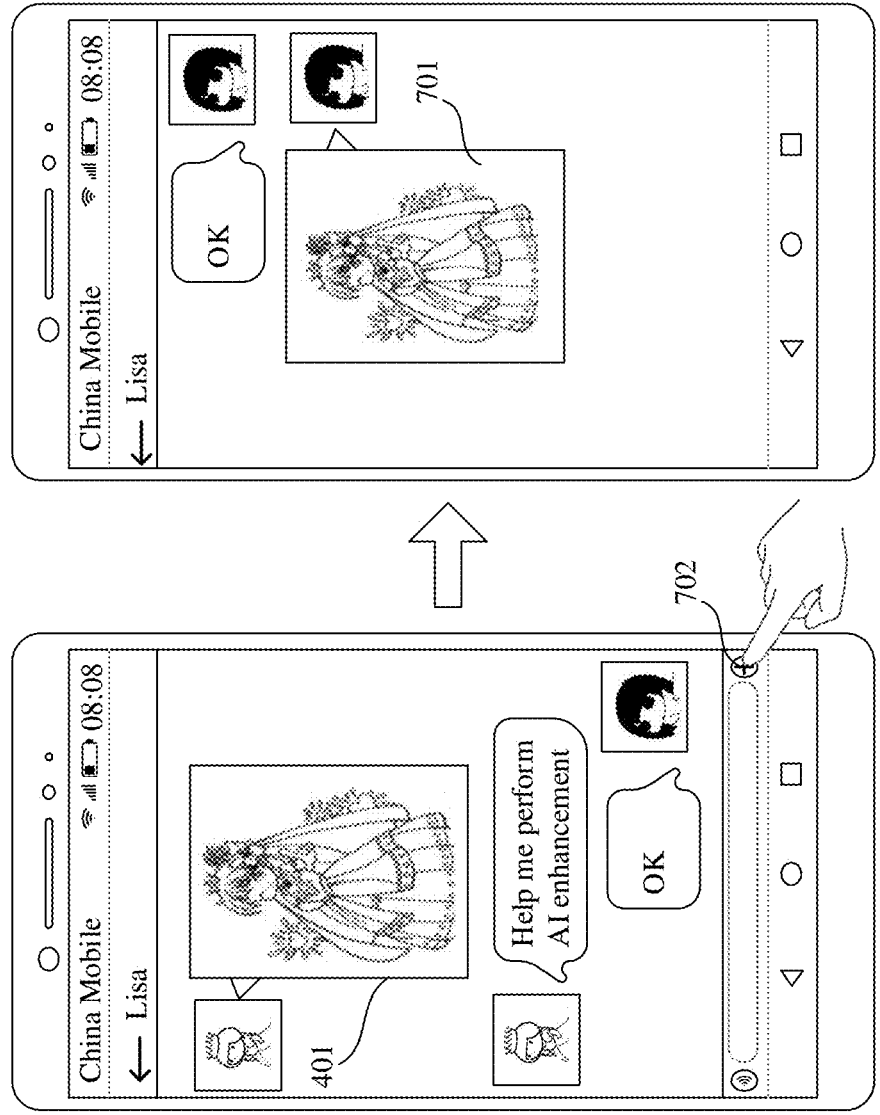

Referring to FIG. 7a and FIG. 7b, when the user 2 selects the option of AI enhancement 605, the electronic device 2 performs AI enhancement on the first picture 401, to obtain the second picture 701 after processing, and the electronic device 2 may store the second picture 701 after completing AI enhancement. Referring to FIG. 7b and FIG. 7d, after completing AI enhancement, the electronic device 2 may automatically reply return the second picture 701 to the electronic device 1 used by the user 1 Lisa. Referring to FIG. 7c and FIG. 7d, after completing AI enhancement, the electronic device 2 may return to an APP chat screen, so that the user 2 sends the second picture to the user 1 Lisa by tapping an add option 702 to select the second picture from an album, or the like. Alternatively, referring to FIG. 7e and FIG. 7d, after completing AI enhancement, the electronic device 2 may display a "Reply to friend" button 703. When the user 2 taps the "Reply to friend" button 703, the electronic device 2 sends the second picture 701 to the electronic device 1 used by the user 1 Lisa.

Figure 8A:
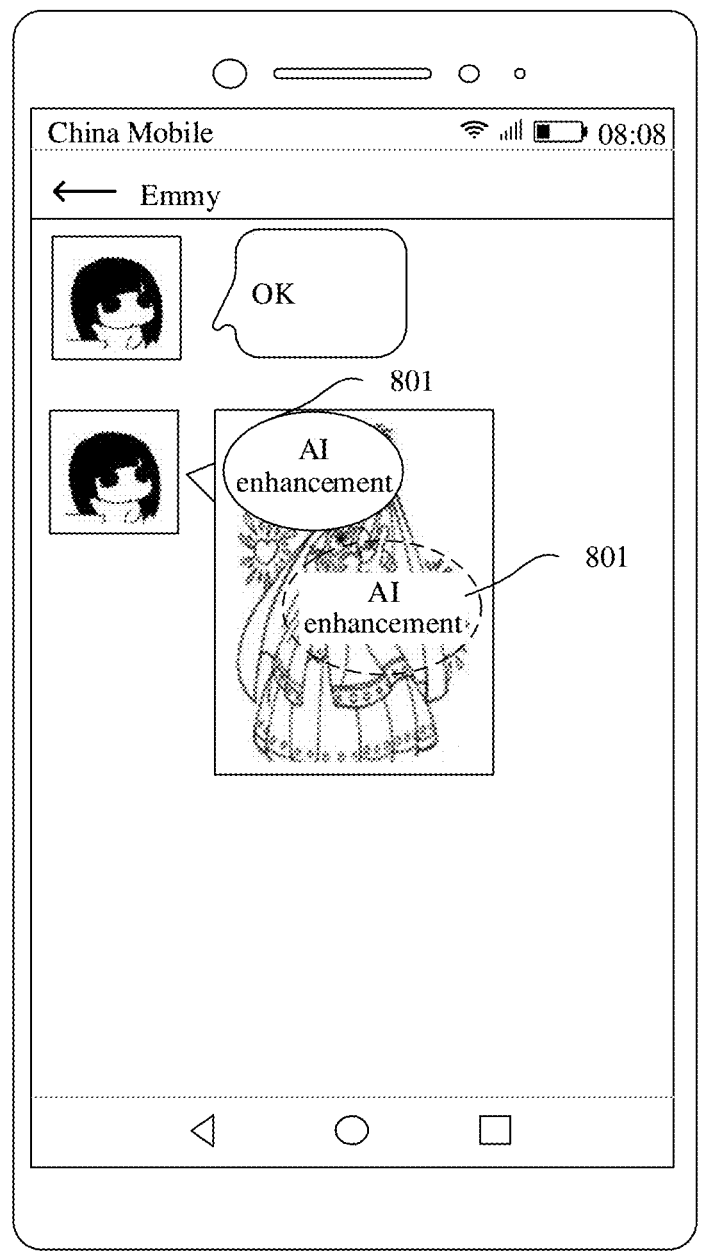
FIG. 8a, FIG. 8b, and FIG. 8c are schematic diagrams of another group of screens according to an embodiment of this application.
Figure 8B:
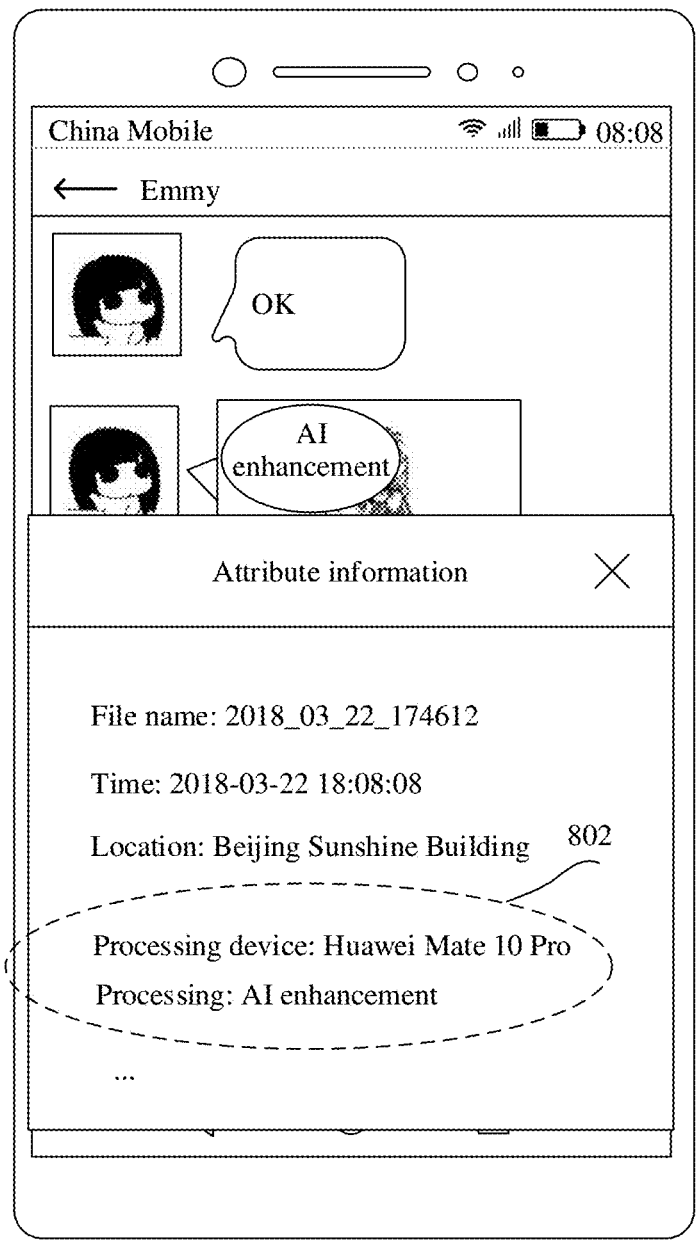
Figure 8C:
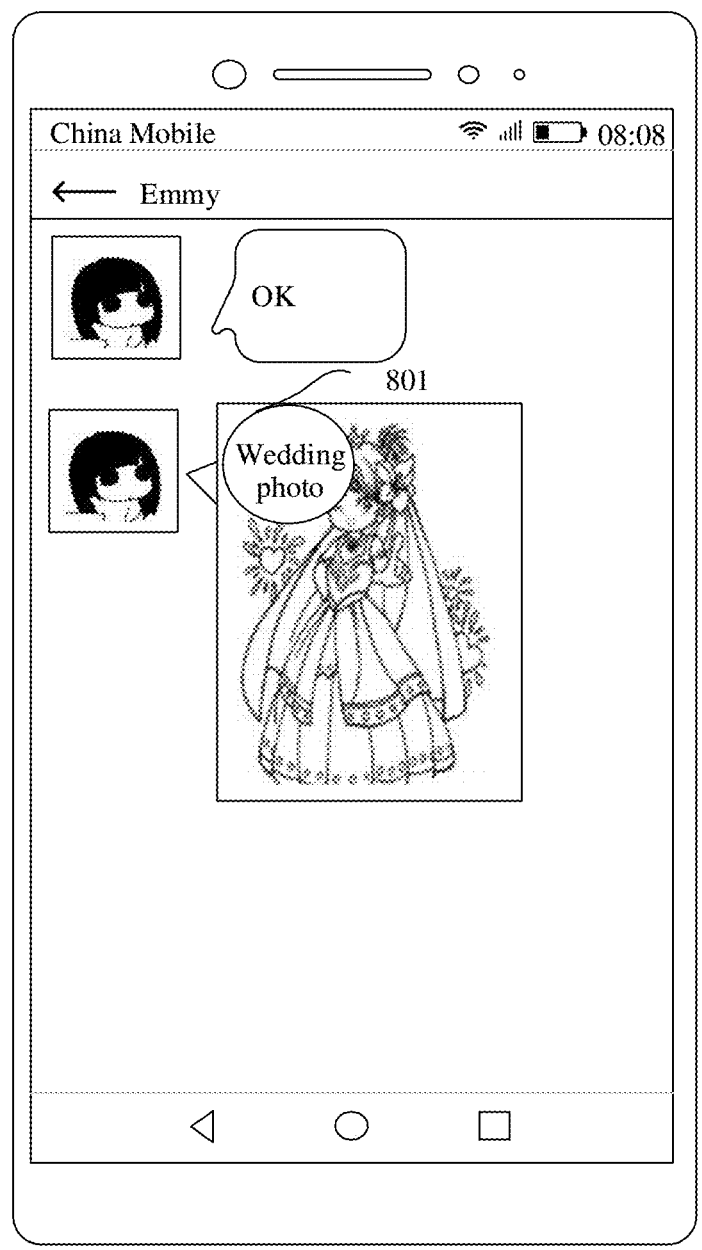

In some embodiments of this application, a first mark may be displayed on the second picture 701 obtained after AI enhancement, or first attribute information may be displayed in attribute information of the second picture 701. The first mark and the first attribute information are used to notify the user that the picture is a picture obtained after AI enhancement. For example, referring to FIG. 9a, the first mark 801 may be an "AI enhancement" character displayed at the upper left corner of the second picture 701. For another example, the first mark may include a model of a device that has processed the picture. For example, the first mark may be "AI enhancement by Mate 10 Pro". For another example, the first mark may alternatively be displayed in a watermarking manner. When the second picture 701 is tapped, the first mark 801 may disappear, and when the second picture 701 is tapped again, the first mark 801 may appear again. For example, referring to FIG. 8b, a first attribute 802 may be "processing device: Huawei Mate 10 Pro; Processing: AI enhancement" in the attribute information. It can be understood that the first mark and the first attribute information displayed on the second picture may vary with task processing that is performed to obtain the second picture. For example, the first mark displayed on the second picture 701 obtained after image classification task processing may be an image classification result. As shown in FIG. 8c, the first mark 801 is a "Wedding dress photo".

In some other embodiments of this application, the user 1 may alternatively send the first picture 401 to a friend by using an add button in an APP chat screen (for example, a control 702 displayed in FIG. 7c), to display a screen shown in FIG. 5c. Further, the first picture 401 may be processed based on the processes shown in FIG. 6a to FIG. 8c.

Figures 9C, 9D:
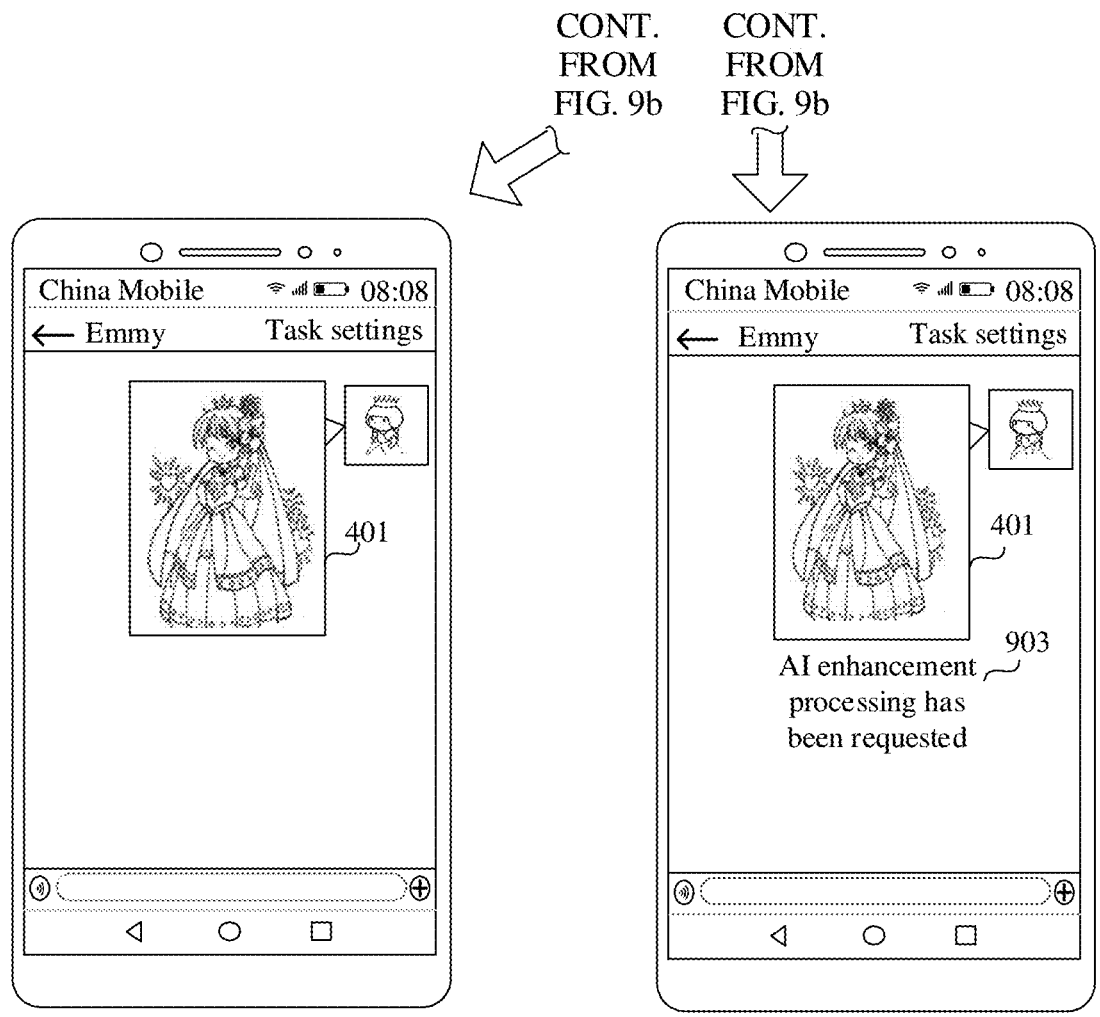

In some other embodiments of this application, referring to FIG. 9a and FIG. 9b, the electronic device 1 may display a task setting option 901. When the user 1 taps the task setting option 901, the electronic device 1 displays a task list 902. It is assumed that the user 1 selects one task (for example, AI enhancement) from the task list 902. In one case, the electronic device 1 sends the to-be-processed task to another electronic device, and displays task information in chat information. For example, the task information 903 may be specifically "AI enhancement requested" shown in FIG. 9c. In another case, referring to FIG. 9d, the electronic device 1 sends the processing task to another electronic device, but does not display task information.

Figure 10A:
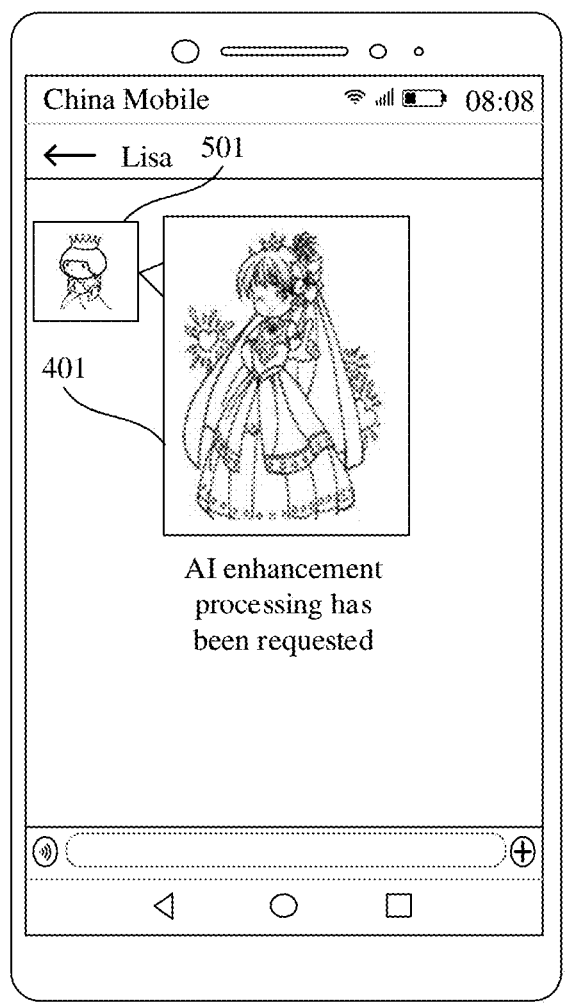
FIG. 10a and FIG. 10b are schematic diagrams of another group of screens according to an embodiment of this application.

Referring to FIG. 10a, after receiving the first picture 401 and the to-be-processed task that are sent by the electronic device 1, the electronic device 2 may automatically process the first picture 401 based on the to-be-processed task, and the electronic device 2 may further prompt the user 2 with specific content of the to-be-processed task.

Figure 10B:
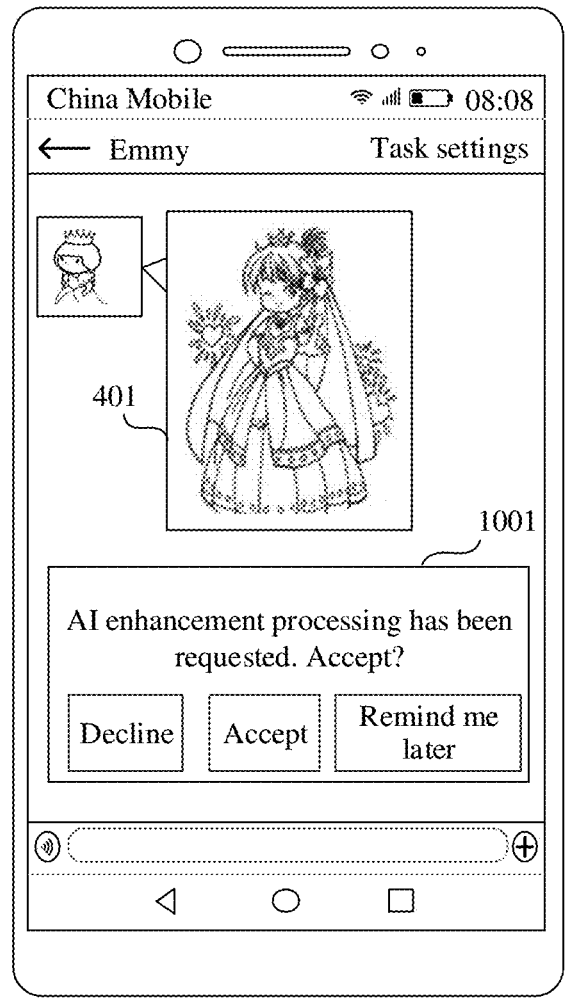

Alternatively, referring to FIG. 10b, after receiving the first picture 401 and the to-be-processed task that are sent by the electronic device 1, the electronic device 2 may display prompt information 1001, to prompt the user 2 whether to accept the to-be-processed task. After the user 2 selects "Accept", the electronic device 2 processes the first picture 401. After the user selects "Decline", the electronic device 2 does not process the first picture 401, and the user 2 may further send a reject request message to the user 1. If the user 2 is relatively busy currently or the electronic device 2 has a relatively large quantity of tasks currently, the user 2 may select "Remind later". After the user 2 selects "Remind later", the electronic device 2 may remind, after a period of time, the user again whether to accept the processing task.

After processing the first picture 401 based on the to-be-processed task, the electronic device 2 may automatically send the second picture 701 obtained after processing to the electronic device 1, or may send the second picture 701 to the electronic device 1 after receiving an instruction of the user 2.

After receiving the second picture 701, the electronic device 1 may perform displaying based on the second picture 701. For example, the electronic device 1 may replace the first picture 401 with the second picture 701. In other words, the electronic device 1 displays only the second picture 701 instead of the first picture 401. Alternatively, the electronic device 1 may display both the first picture 401 and the second picture 701.

Figures 2D, 11:
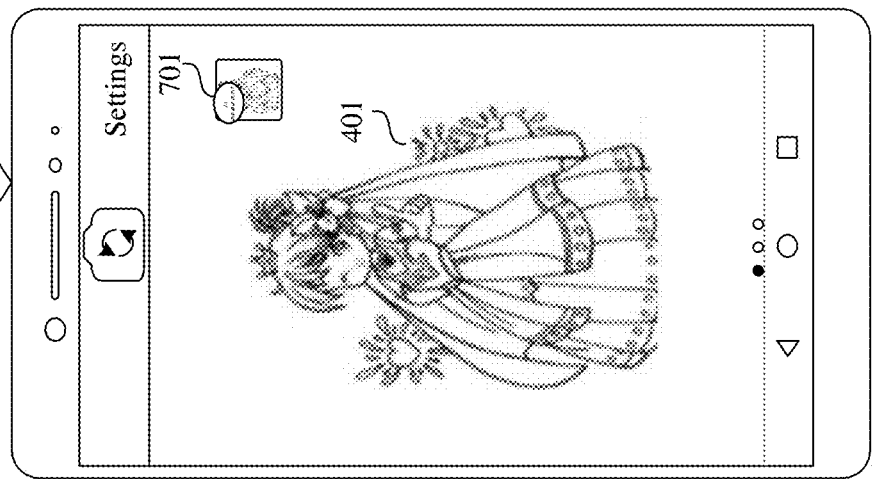
Figures 2E, 11:
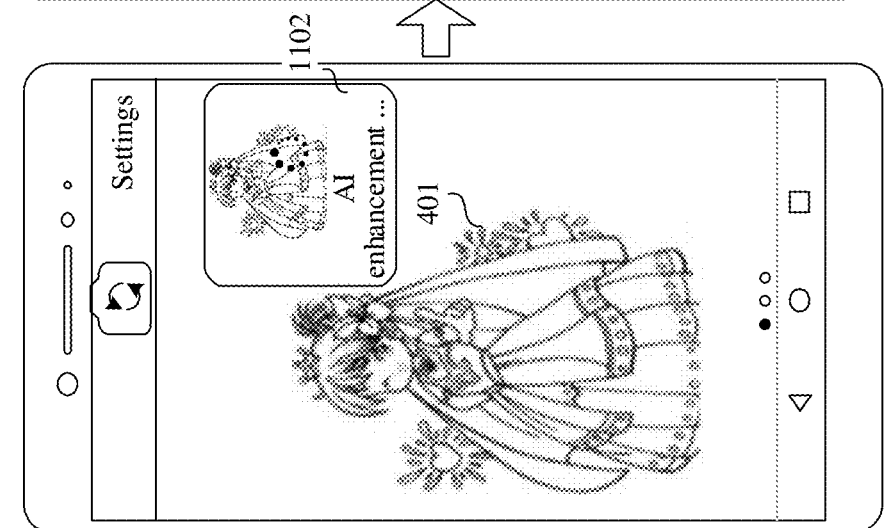

For example, as shown in FIG. 11-1a or FIG. 11-1c, after obtaining the second picture 701, the electronic device 1 may automatically update the first picture 401 obtained through photographing to the second picture 701. For example, as shown in FIG. 11-1b, the album may include prompt information 1102, and the prompt information is used to prompt the user that AI enhancement is being performed. In this case, the user may learn that the electronic device 1 freezes without a fault or the like. After AI enhancement is completed, as shown in FIG. 11-1c, the second picture 701 obtained after processing is displayed in the album. For example, as shown in FIG. 11-1d, the first picture 401 and the prompt information 1102 may be displayed in the album.

For example, after the electronic device 1 obtains the first picture through photographing, when the user taps a thumbnail 1101 at the lower left corner in FIG. 11-2a, as shown in FIG. 11-2b, FIG. 11-2e, or FIG. 11-2f, the electronic device 1 displays the first picture 401 and the prompt information 1102, and the prompt information is used to prompt the user that AI enhancement is being performed. After AI enhancement is completed, as shown in FIG. 11-2c, the electronic device 1 may display the second picture 701 obtained after AI enhancement. When the user 1 taps the first picture 401 in FIG. 11-2c, as shown in FIG. 11-2d, the electronic device 1 may switch display locations of the first picture 401 and the second picture 402, to display the first picture 401 in a scaling up manner and display the second picture 701 in a scaling down manner.

In some other embodiments of this application, the electronic device 1 may alternatively send the first picture 401 to a plurality of other electronic devices by using an APP. For example, when the user selects a family group in FIG. 5b, referring to FIG. 12a, the user 1 may send, in the family group, the first picture 401 to a plurality of electronic devices used by users in the family group. For example, the family group includes Lisa, her brother, her mother, and her father. Referring to FIG. 12b, after receiving the first picture 401, electronic devices of her brother, father, and mother each may display prompt information 1001, to prompt each of the users whether to accept the processing task.

Figure 12D:
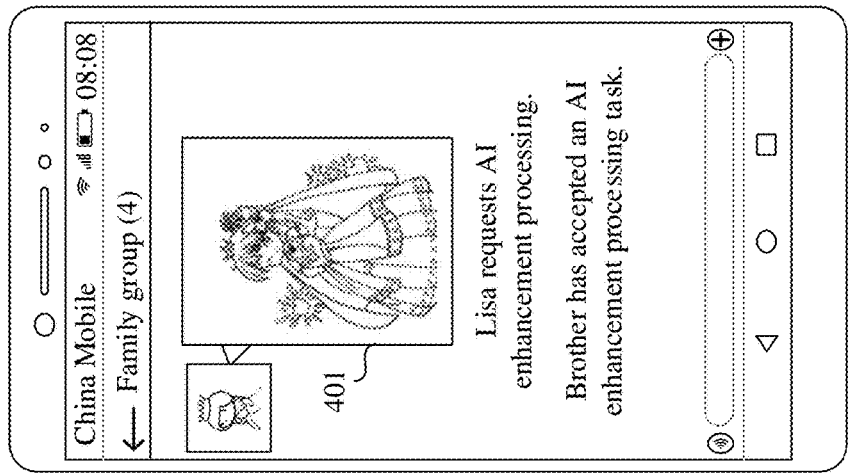
Figure 12E:
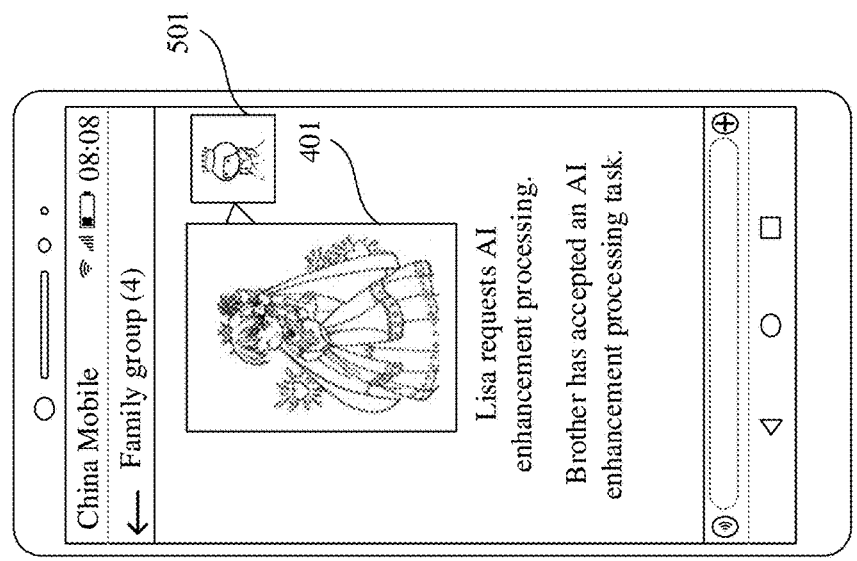

In one case, an electronic device that first selects "Accept" performs task processing, and other electronic devices do not perform service processing. For example, referring to FIG. 12c, her brother first accepts an AI enhancement task from Lisa. Referring to FIG. 12d, electronic devices of her father and mother do not display a prompt indicating whether to accept the request. After completing AI enhancement, her brother replies to Lisa with the second picture 701 obtained after processing. Referring to FIG. 12d and FIG. 12e, prompt information is displayed in the group: Brother has accepted the AI enhancement task. For another example, in electronic devices that are capable of processing the task in the group, an electronic device that is currently idlest or that currently has a largest amount of power automatically accepts the processing task for the first picture 401, and other electronic devices do not accept the processing task.

In another case, each electronic device that receives the first picture 401 accepts the processing task for the first picture 401. For example, after her brother in the family group accepts the AI enhancement task, the electronic devices of her father and the mother either may continue to display the prompt information 1001, to prompt either of the users whether to accept the processing task. For another example, each electronic device that is capable of processing the task in the group automatically accepts the processing task for the first picture 401 after receiving the first picture 401.

Figure 13A:
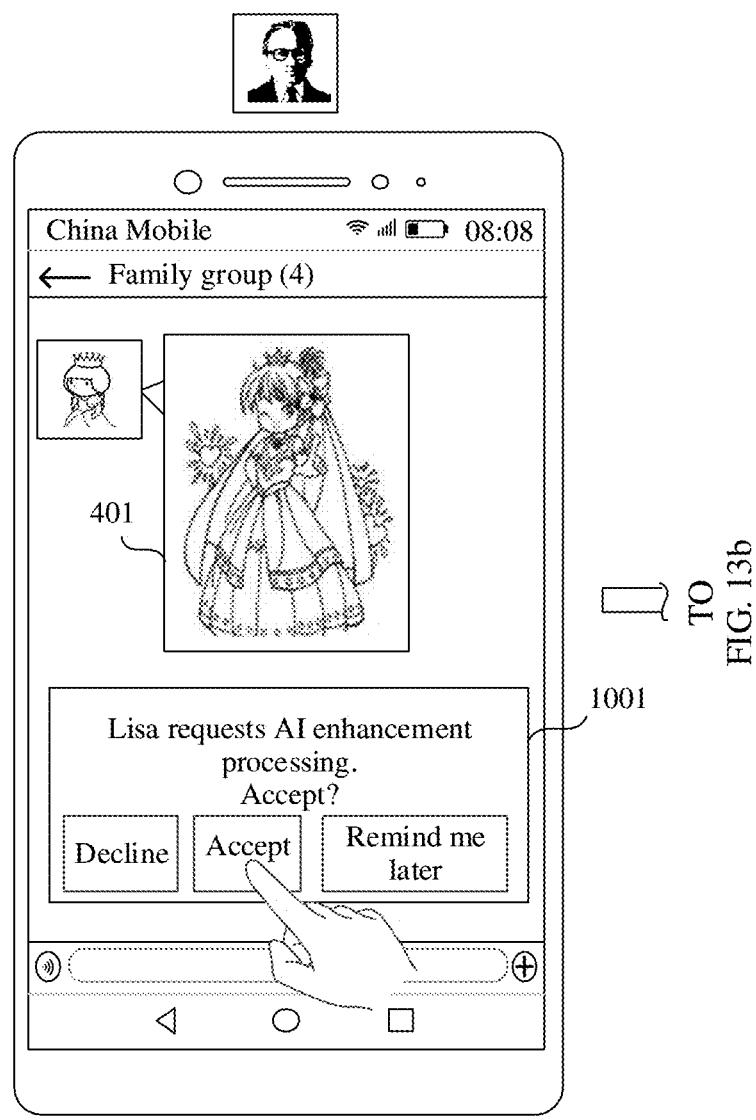
FIG. 13a, FIG. 13b, and FIG. 13c are schematic diagrams of another group of screens according to an embodiment of this application.
Figure 13B:
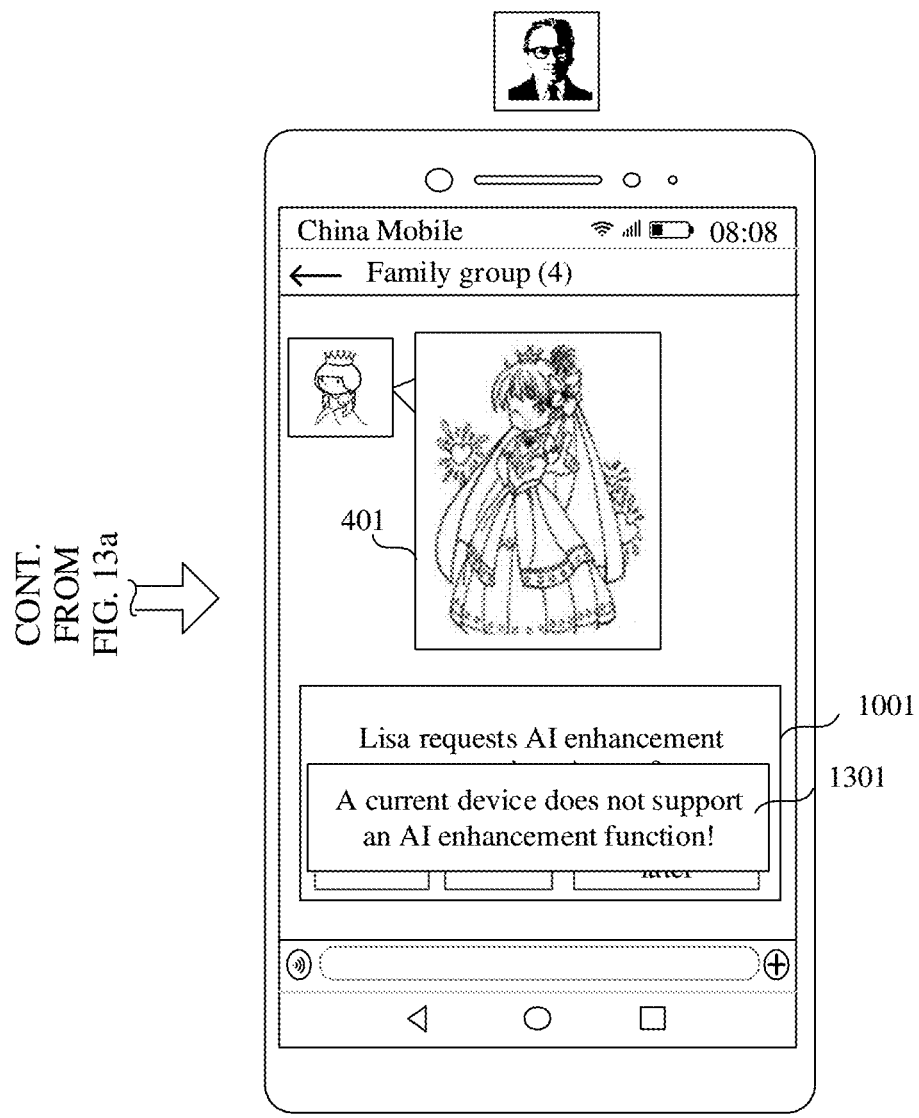

In some embodiments of this application, in one case, if a specific electronic device in the group does not support an AI enhancement function, the electronic device may display the prompt information low, and when a user taps "Accept", the user is prompted that the current device does not support the task. For example, after Lisa requests the AI enhancement task, if an electronic device of her father does not support the AI enhancement function, referring to FIG. 13a and FIG. 13b, when her father taps "Accept", the electronic device displays the prompt information 1301 to prompt the user that the task cannot be accepted.

Figure 13C:
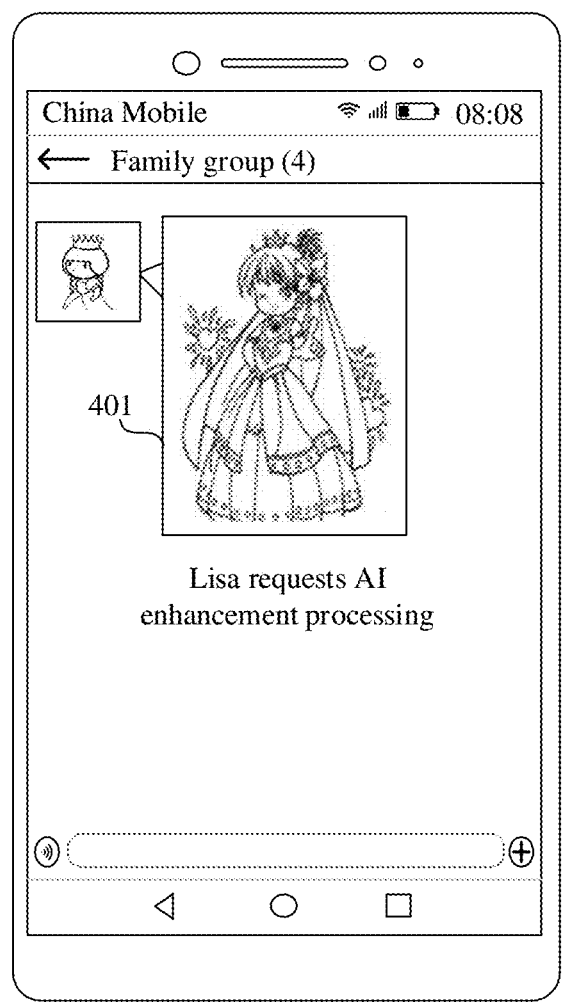

In another case, if a specific electronic device in the group does not support an AI enhancement function, the electronic device may display only task request information, but does not display information used to prompt the user whether to accept the task request. For example, after Lisa requests AI enhancement, if the electronic device of her father does not support the AI enhancement function, referring to FIG. 13c, the electronic device of her father does not display prompt information indicating whether to accept task processing.

After completing the task, the electronic device that accepts task processing may return the obtained second picture 701 to the electronic device 1. The electronic device that accepts task processing may store the second picture 701, or may delete the second picture 701 after sending the second picture 701 to another electronic device. In one case, only the electronic device 1 can receive the second picture 701. In another case, the electronic devices of all the users in the group can receive the second picture 701. For example, when the electronic device that accepts task processing is the electronic device 2 used by her brother, electronic devices used by Lisa, her mother, and her father in the group may all receive the second picture 701 obtained after processing. After receiving the second picture 701, the electronic devices of the users in the group each may replace the first picture 401 with the second picture 701, or may store both the first picture 401 and the second picture 701.

It is assumed that there are a plurality of electronic devices that accept task processing. In one case, the electronic device 1 receives only a second picture that is processed and returned first, and then does not receive a second picture that is processed and returned by another electronic device. In another case, the electronic device 1 receives second pictures processed and returned by the plurality of electronic devices. After receiving the second pictures returned by a plurality of other electronic devices, the electronic device 1 may store all the second pictures, or may select, according to an instruction of the user 1, a second picture with a best effect for storage.

In some other embodiments of this application, the electronic device may further collect statistics about a task requested by another electronic device. The user may select to delete or disable a sharing relationship between the electronic device and another electronic device. Therefore, the electronic device does not help the another electronic device to perform task processing. For example, in the family group shown in FIG. 12*a* to FIG. 12*e*, when the electronic device 2 finds that the electronic device 1 requests a relatively large quantity of tasks, the electronic device 1 consumes a relatively large quantity of resources and a relatively large amount of power of the electronic device 2, and the user may select to delete, in the family group by using the electronic device 2, a shared picture from the user Lisa using the electronic device 1. In this way, the electronic device 2 does not help the electronic device 1 to perform task processing.

Figures 14A, 14B, 14C:
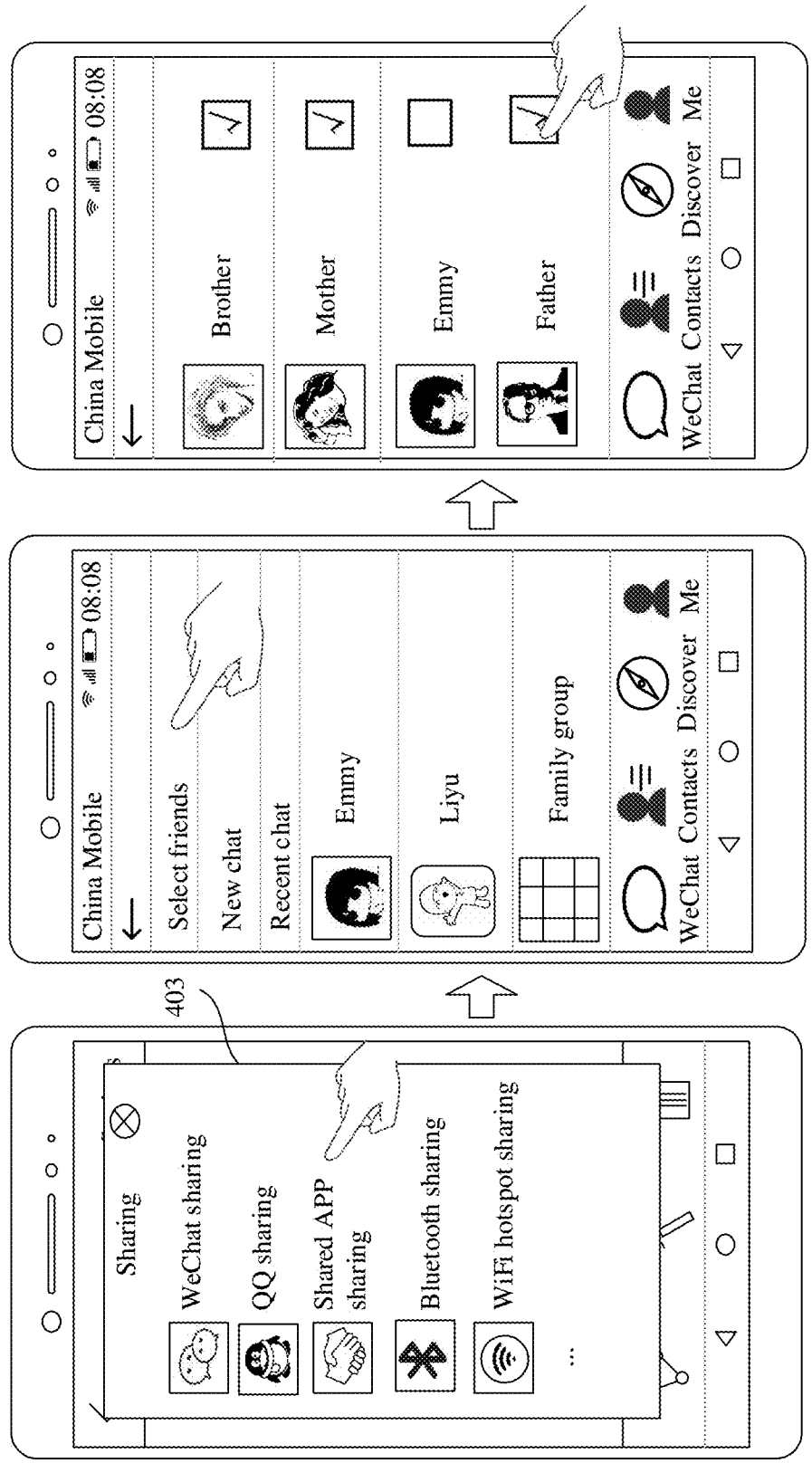
FIG. 14a, FIG. 14b, and FIG. 14c are schematic diagrams of another group of screens according to an embodiment of this application.

An example in which the electronic device 1 sends the first picture 401 to a plurality of electronic devices in a group manner and requests task processing is used below for description. As an alternative solution of the foregoing group, as shown in FIG. 14*a* to FIG. 14*c*, the electronic device 1 may alternatively send, in response to a selection operation performed by the user 1 for a plurality of friends, the first picture to electronic devices used by the plurality of friends. Details are not described herein again.

In some embodiments of this application, the user 1 may want to obtain, as soon as possible, the second picture obtained after processing. For example, the electronic device 1 of the user 1 Lisa has a relatively poor AI enhancement effect. Lisa is wearing a wedding dress, and Lisa wants to take a satisfactory photo and show the photo to her friend. Because a time for wearing the wedding dress is limited, Lisa needs to obtain, as soon as possible, a photo with a better effect obtained after AI enhancement.

In this case, the user 1 may notify another electronic device of a mission critical requirement. For example, the user 1 may prompt another user in a chat that the task is "mission critical". Alternatively, task settings 901 may include a "mission critical" option. When the user 1 selects the "mission critical" option, an electronic device of another user may display the following: The task is "mission critical". Alternatively, to remind a user in real time, after receiving a task request, another electronic device may remind, in a relatively obvious manner such as a sound or light manner, the user whether to immediately process the task request from a friend. For example, an electronic device may prompt a user of "Receive a mission critical request from a friend" by using a voice, or an electronic device prompts a user of "Receive a mission critical request from a friend" on a desktop notification bar.

An example in which a to-be-processed task for a picture is AI enhancement is used below for description. A picture processing task may also be image classification, image clustering, OCR recognition, or the like. For example, when Lisa and her family members travel abroad and Lisa takes a family group photo, if the electronic device of Lisa does not have a face clustering processing capability, Lisa may request her family members in a family group to perform face clustering task processing, and then her brother performs face clustering processing on the family group photo, so that Lisa and other family members each can obtain a face clustering result. Therefore, the family members can sort and view the taken photo based on the clustering result. For example, the face clustering result is that the picture includes a face of Lisa, a face of her father, a face of her mother, and a face of her brother. In this way, the photo is separately aggregated in a father photo set, a mother photo set, a brother photo set, and a Lisa photo set in the electronic device 1. For another example, it is assumed that Lisa and her family members travel abroad, and the electronic device of Lisa does not have an OCR recognition capability and a local translation capability. In this case, when seeing an unknown street name or menu name, Lisa may take a photo of the street name or the menu name and request her family members in a family group to perform OCR recognition, and then her brother performs OCR recognition processing on the picture, so that Lisa and other family members each can obtain an OCR recognition result, and thereof learn of the street name or the menu name.

Figure 15C:
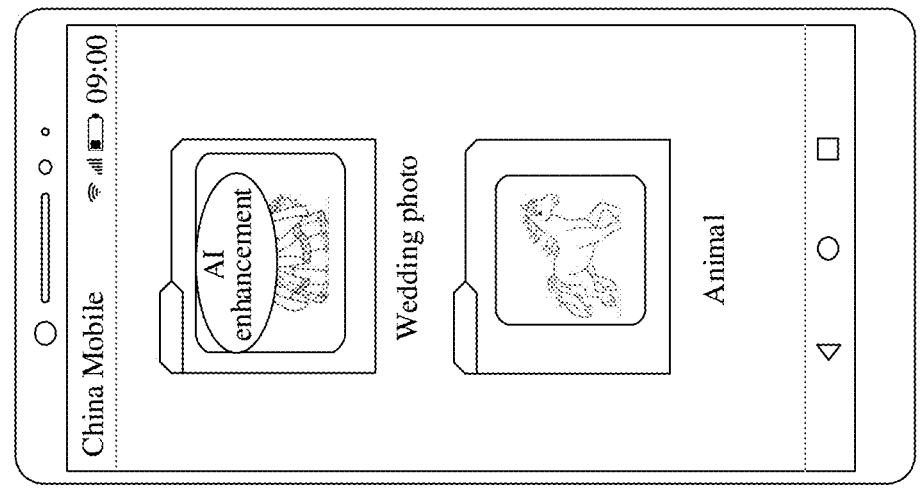
FIG. 15a, FIG. 15b, and FIG. 15c are schematic diagrams of another group of screens according to an embodiment of this application.
Figure 15B:
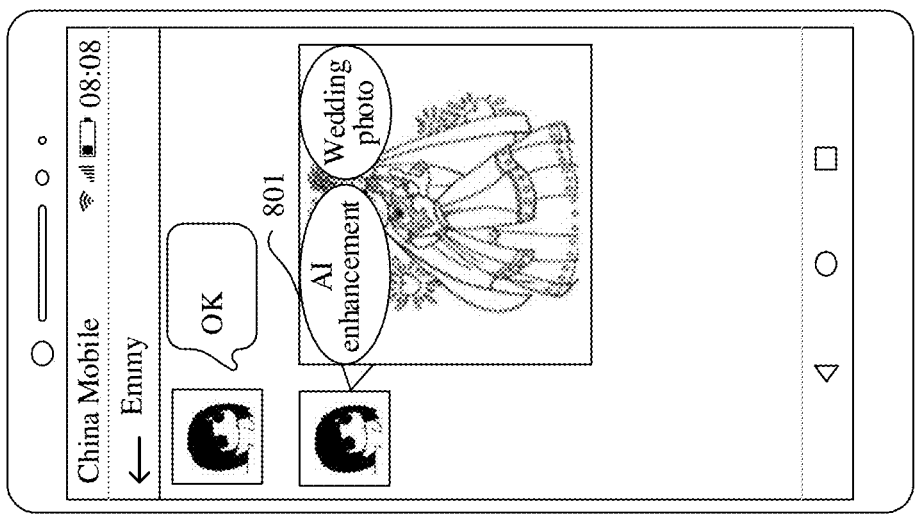

In addition, there may be a plurality of picture processing tasks, and the electronic device 1 performs displaying based on processing results of the plurality of processing tasks. For example, as an alternative solution of FIG. 10*b*, the task processing list 902 may be shown in FIG. 14*a*. When both an AI enhancement option and an image classification option in the task list 902 are selected, the user 1 requests to perform AI enhancement and image classification processing on the first picture 401. After performing AI enhancement and image classification processing on the first picture 401, an electronic device of another user that accepts the task notifies the electronic device 1 used by the user 1 of the second picture 701 obtained after processing and a picture classification result "Wedding photos". In this case, as an alternative solution of FIG. 9*a*, as shown in FIG. 15*b*, an AI enhancement mark and a wedding photo mark may be displayed on the second picture 701 received by the electronic device 1. Referring to FIG. 15*c*, the electronic device 1 may classify, in the album, the second picture 701 obtained after AI enhancement into a wedding photo category.

Figure 15A:
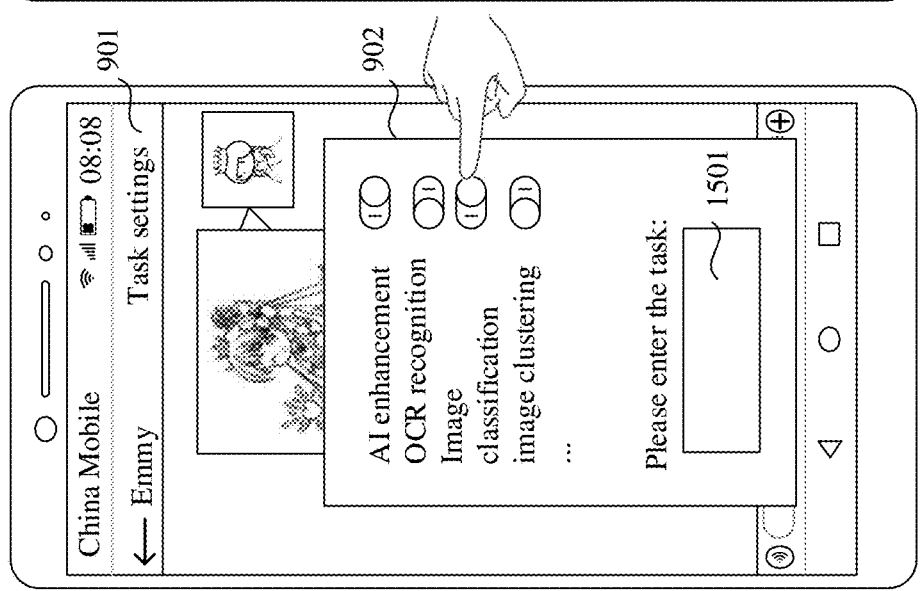

Further, referring to FIG. 15*a*, the task list 902 may further include a task input box 1501, configured to receive a processing task entered by the user. For example, the user may enter a processing task "image facial expression recognition".

In some other embodiments of this application, the electronic device 1 may also have a capability of processing a to-be-requested task. The electronic device 1 may send a processing result to another electronic device after performing task processing on the first picture, so that the another electronic device, especially an electronic device that does not have the task processing capability, shares the processing capability of the electronic device 1, to obtain the processing result. For example, it is assumed that Lisa and her family members travel abroad, the electronic device of Lisa has an OCR recognition capability and a local translation capability, and the electronic device of her father does not have an OCR recognition capability or a local translation capability. In this case, when Lisa and her family members see many unknown dish names during ordering, Lisa takes a photo of a menu, obtains a Chinese translation of the menu name in the picture through OCR recognition, and sends a processing result to her father and other family members, so that her father and the other family members can order dishes based on the Chinese information.

In some other embodiments of this application, after the electronic device 1 sends the task request, both the electronic device 1 and another electronic device having a task processing capability in the group can perform task processing.

In some embodiments of this application, when a plurality of electronic devices accept the task request, the plurality of electronic devices may further combine results. In one case, referring to FIG. 19-1, electronic devices that receive a task request sent by another electronic device include the electronic device 1, the electronic device 2, and an electronic device 3. The electronic device 1 has a task processing capability, and the electronic device 2 and the electronic device 3 do not have a task processing capability. The combination process includes the following steps: 1901. After completing processing, the electronic device 1 sends combination request information to the electronic device 2 and the electronic device 3. 1902. The electronic device 2 requests a synchronization processing result from the electronic device 1. 1903. The electronic device 3 requests the synchronization processing result from the electronic device 1. 1904. The electronic device 1 sends the processing result to the electronic device 2 and the electronic device 3.

In some embodiments of this application, because models of task processing algorithms may be different, task processing results obtained after different electronic devices process a same processing object may be inconsistent. There are a plurality of methods in which different electronic devices determine whether processing objects are a same object. For example, electronic devices may determine, based on whether hash values corresponding to pictures or texts are the same, whether processing objects are a same object. The hash value is a value obtained through calculation based on a hash algorithm. For example, the hash algorithm may include MD5, SHA-1, and SHA-2 (including SHA-224, SHA-256, SHA-384, and SHA-512). In one case, when processing results are inconsistent, different electronic devices separately share the processing results to a group, and each user in the group selects a specific processing result for retaining or using. In another case, when processing results are inconsistent, different electronic devices each combine the processing results and obtain one processing result through negotiation, and each electronic device is notified of the one processing result.

An example in which a to-be-processed task is picture classification and an example in which electronic devices (including the electronic device 1) that correspond to all users in a group and that have a task processing capability all can perform task processing are used below for description.

For example, it is assumed that the group includes Lisa, her mother, and her father, the electronic device 1 used by Lisa and the electronic device 2 used by her mother either have an image classification task processing function, and the electronic device 3 used by her father does not have an image classification function. In this case, Lisa may request, by using the foregoing method for requesting another electronic device to perform an AI enhancement task, another electronic device to perform an image classification task on the first picture 401. Both the electronic device 1 and the electronic device 2 can perform the image classification task, but the electronic device 3 cannot perform the image classification task. A classification label 1 obtained by the electronic device 1 through processing is "wedding dress", and a classification label 2 obtained by the electronic device 2 through processing is "performance". In one case, referring to FIG. 16a, all the electronic devices display, in the group, various classification labels obtained through processing. When a user selects one of the classification labels, an electronic device of the user displays the first picture 401 based on the classification label. For example, referring to FIG. 16b, when Lisa selects the classification label "wedding dress", the electronic device 1 classifies the first picture into a wedding photo folder.

In another case, the electronic device 1 and the electronic device 2 perform combination processing, so as to enable classification label results to be consistent through negotiation. In addition, the group may further display a unified processing result obtained through combination. When the processing result obtained after combination is "wedding dress", referring to FIG. 17a and FIG. 17b, each electronic device may classify the first picture into a wedding photo category.

Figure 18:
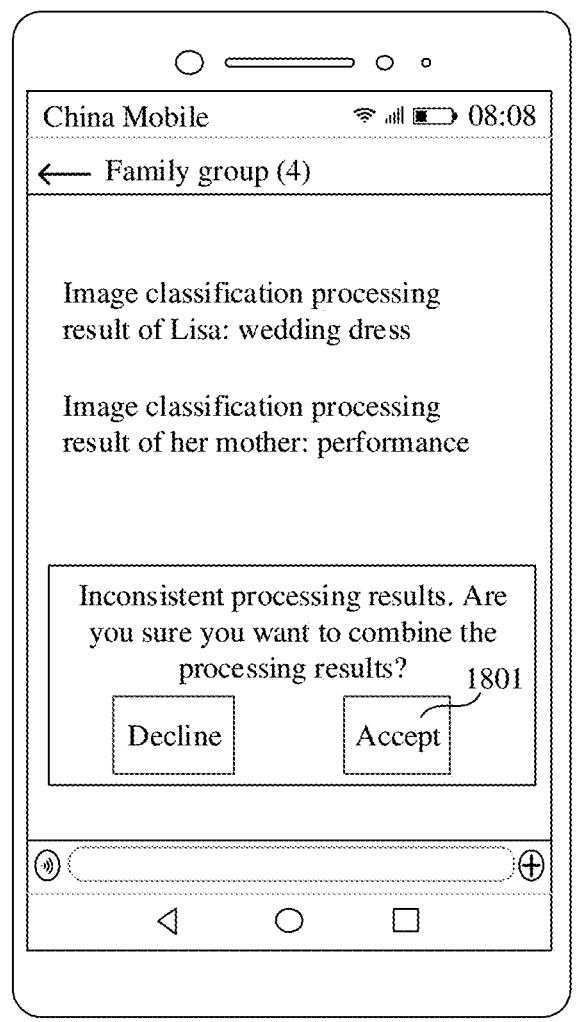
FIG. 18 is a schematic diagram of a screen according to an embodiment of this application.

Specifically, when finding that the processing results obtained by the electronic devices of the users are inconsistent (for example, when seeing the screen displayed in FIG. 16a, the user may instruct the electronic device to combine the results, so as to actively trigger a combination process. For example, referring to FIG. 18, when the electronic device 1 prompts the user 1 whether to combine the processing results, if the user 1 taps a "yes" option 1801, a processing result combination process is actively triggered.

Alternatively, after obtaining the processing result, each electronic device may notify another electronic device of the processing result. When an electronic device that first completes task processing finds that a processing result of the electronic device is inconsistent with a processing result of another electronic device, the electronic device automatically initiates a combination process.

Alternatively, the first electronic device that first obtains the processing result sends combination request information to another electronic device. After receiving the combination request information, if the another electronic device determines that a local processing result is inconsistent with the received processing result, the another electronic device accepts the combination request, and therefore a combination process is automatically triggered.

Alternatively, after obtaining a processing result, one electronic device may notify another electronic device of the processing result. When a specific electronic device determines that a received processing result is inconsistent with a processing result obtained by the electronic device, a combination process is automatically triggered, and therefore a combination result is directly displayed.

There may be a plurality of combination processing solutions. The following provides descriptions by using examples.

Solution 1: A classification result obtained by an electronic device that first completes an image classification task is a combination result.

The electronic device that first completes the image classification task has a short processing time and a fast processing speed, and an image processing capability of the electronic device may be stronger. Therefore, a combination result may be subject to a processing result of the electronic device.

Solution 2: An electronic device that first completes an image classification task performs image classification processing again, and an obtained classification result is a combination result.

Currently, due to a limitation of a processing algorithm model, results obtained after one electronic device performs one task for different times may be different. For example, for image recognition classification, recognition results obtained after one electronic device recognizes one picture for different times may be inconsistent currently. For example, recognition results for one picture may be "cat" and "dog", or face clustering results for one person are different. In the embodiments of this application, because the electronic device that first completes the image classification task has a short processing time and a fast processing speed, an image processing capability of the electronic device may be stronger, and a result obtained after the electronic device having a stronger processing capability performs classification processing again may be more accurate. A combination result may be subject to a result obtained after the electronic device performs classification processing again. The result obtained after the electronic device performs classification processing again may be the same as or may be different from a previously obtained result.

In the solution 1 and the solution 2, after processing the image classification task, each electronic device may notify (for example, through broadcasting) another electronic device, so that each electronic device can learn of a moment at which the electronic device completes task processing. In the solution 2, an electronic device that first completes task processing may automatically perform image classification processing again, and an obtained result is a combination processing result.

Figures 1, 19:
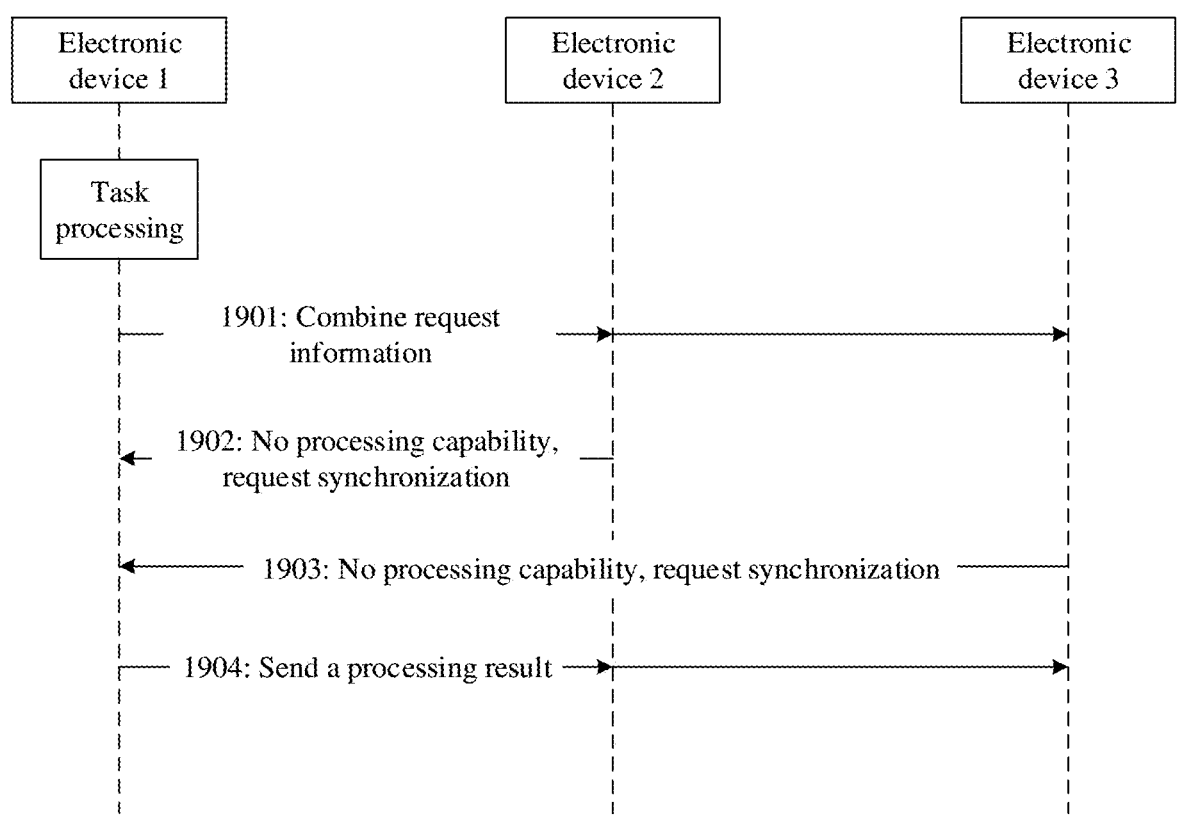
Figures 2, 19:
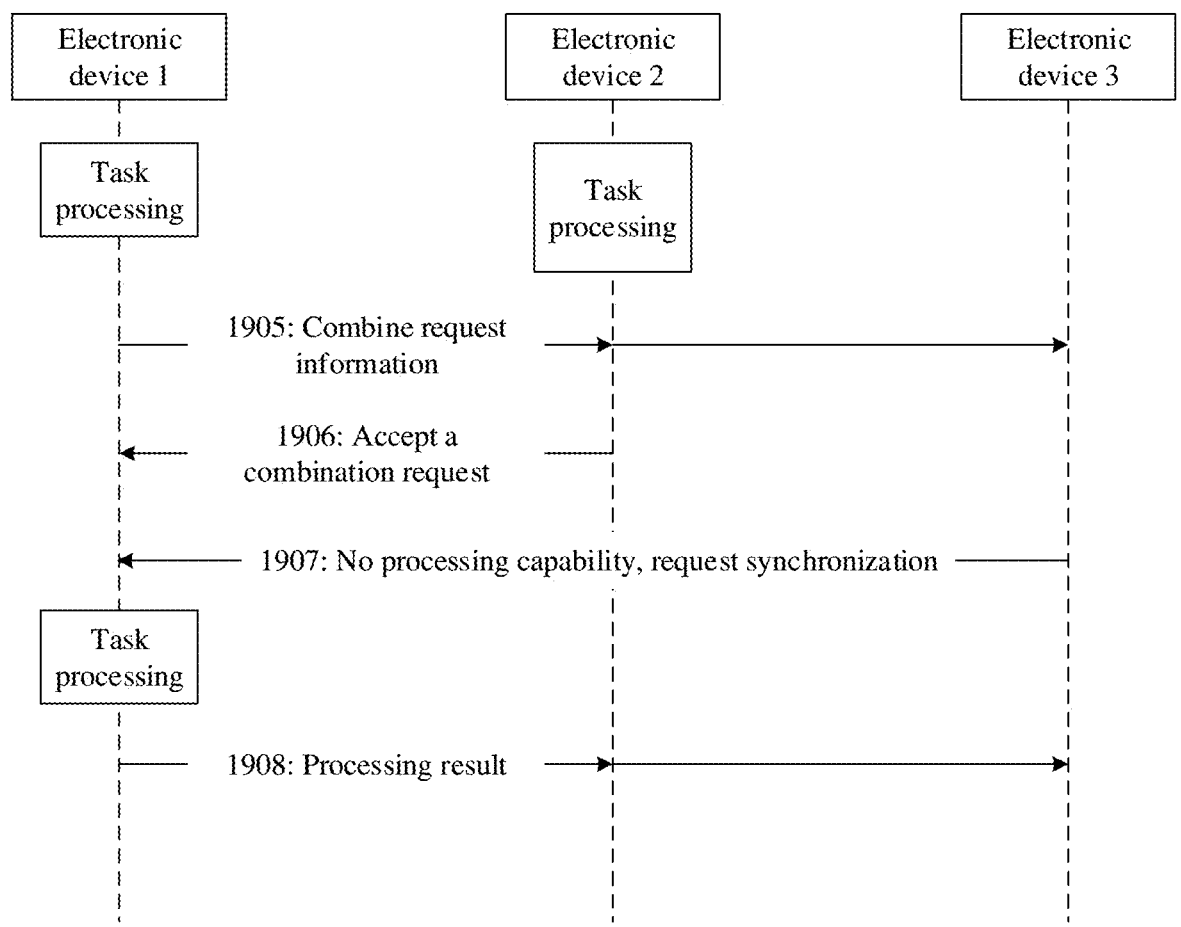

For example, when the foregoing solution 2 is used to perform combination processing, for a flowchart of a combination process, refer to FIG. 19-2. The electronic device 1 and the electronic device 2 have a task processing capability, the electronic device 3 does not have a task processing capability, and processing results of the electronic device 1 and the electronic device 2 are different. The combination process includes the following steps: 1905: The electronic device 1 first completes task processing, and the electronic device 1 sends (for example, through broadcasting) combination request information to another electronic device. 1906: The electronic device 2 accepts the combination request of the electronic device 1. 1907: The electronic device 3 requests a synchronization processing result from the electronic device 1. 1908: The electronic device 1 performs task processing again, and notifies the electronic device 2 and the electronic device 3 of a processing result.

Solution 3: A classification result obtained through processing by an electronic device with the latest AI model version is a combination result.

An AI model is a device-side AI model of deep learning. For example, AI model versions with relatively good performance include MobileNet, SqueezeNet, RestNet, and the like, and AI model versions with relatively poor performance include AlexNet, LeNet5, and the like. The electronic device with the latest AI model version has a stronger image classification processing capability and a better image classification effect. Therefore, the combination result may be subject to the processing result of the electronic device.

Solution 4: An electronic device with the latest AI model version performs image classification processing again, and an obtained classification result is a combination result.

Because the electronic device with the latest AI model version has a stronger image classification processing capability and a better image classification effect, a result obtained after the electronic device performs classification processing again is more accurate. Therefore, the combination result may be subject to a result obtained after the electronic device performs processing again.

In the solution 3 and the solution 4, each electronic device may notify another electronic device of an AI model version of the electronic device, so that each electronic device can learn of a specific electronic device with the latest AI model version. In the solution 4, the electronic device with the latest AI model version may automatically perform image classification processing again, and an obtained processing result is the combination result.

Solution 5: A classification result obtained by an electronic device having a related user label is a combination result.

The related user label is a user label related to task processing. For example, when a to-be-processed task is related to a picture, a user who loves photographing takes many photos, a quantity of times of processing a plurality of pictures may increase, and an image processing capability may be stronger. Therefore, the related user label may be a user who loves photographing. In addition, if a to-be-processed task is related to translation, the related user label may also be a user who loves translation.

Solution 6: An electronic device having a related user label performs image classification processing again, and an obtained classification result is a combination result.

A result obtained after the electronic device having the user label related to a to-be-processed task performs processing again is more accurate.

In the solution 5 and the solution 6, each electronic device may notify another electronic device of a related user label of the electronic device, so that each electronic device can learn of a specific electronic device having the related user label. In the solution 6, the electronic device having the related user label may automatically perform image classification processing again, and an obtained processing result is the combination result.

Solution 7: A classification result obtained after an electronic device having a strongest processing capability performs processing is a combination result, or a classification result obtained after an electronic device having a strongest processing capability performs processing again is a combination result.

In several conditions such as a short processing time, a high AI model version, and a related user label, if an electronic device meets more conditions, the electronic device has a stronger processing capability and a more accurate processing result. For example, if both the electronic device 1 and the electronic device 2 have a favorite photographing label, but the electronic device 1 spends a shorter time in processing a task, the electronic device 1 has a stronger processing capability.

Solution 8: Every two of inconsistent results of electronic devices are combined.

For example, the electronic device 1, the electronic device 2, and the electronic device 3 sequentially complete image classification processing, and processing results are different. Processing results of the electronic device 1 and the electronic device 2 that first complete task processing are combined, and a first result obtained after the combination is the processing result of the electronic device 1 or the processing result of the electronic device 2. The first result obtained after the combination and the processing result of the electronic device 3 are combined again to obtain a final combination result. The first combination process and a next combination process may be specifically performed based on the solution 1 to the solution 7.

Figures 3, 19:
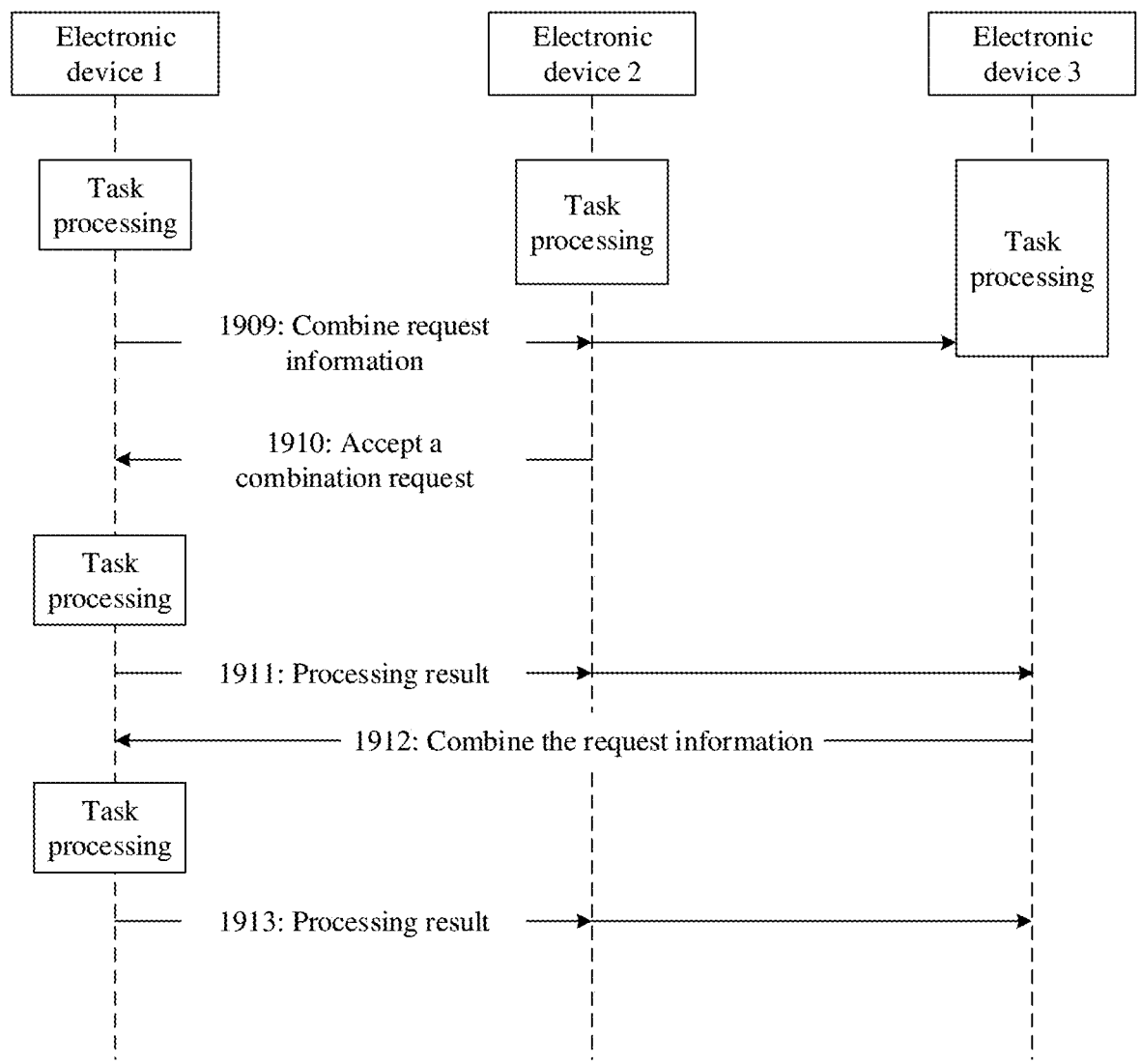

For example, when the foregoing solution 8 is used to perform combination processing, for a flowchart of a combination process, refer to FIG. 19-3. The electronic device 1, the electronic device 2, and the electronic device 3 each have a task processing capability, and processing results of the electronic device 1, the electronic device 2, and the electronic device 3 are different. The electronic device 1 first completes task processing, and the electronic device 2 second completes task processing. The combination process may include the following steps: 1909: The electronic device 1 sends (for example, through broadcasting) combination request information to another electronic device. 1910: The electronic device 2 that second completes task processing accepts the combination request of the electronic device 1 and performs combination with the electronic device 1. 1911: The electronic device 1 that first completes task processing performs task processing again to obtain the first combination processing result, and sends the first combination processing result to the electronic device 2 and the electronic device 3. 1912: The electronic device 3 finds that the first combination result is different from a local processing result, and the electronic device 3 requests to perform combination with the combination result of the electronic device 1 again. 1913: The electronic device 1 that first completes task processing performs task processing again, and an obtained processing result is a final combination processing result. The electronic device 1 sends the final combination processing result to the electronic device 2 and the electronic device 3.

Figures 4, 19:
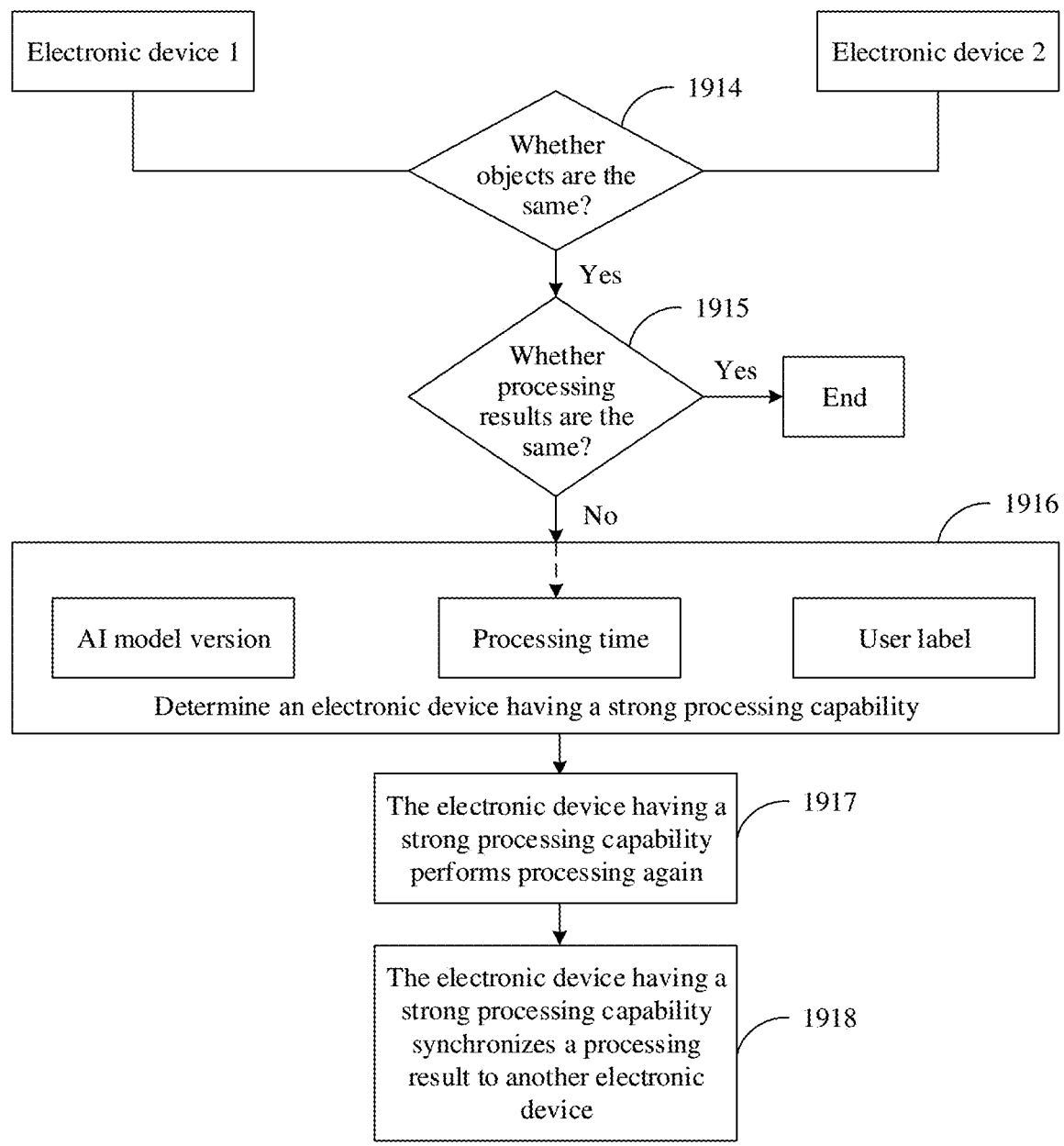

For example, FIG. 19-4 provides another combination processing method. The method includes the following steps: 1914: An electronic device 1 and an electronic device 2 may determine whether to-be-processed objects are a same object. 1915: If the to-be-processed objects are the same object, the electronic device 1 and the electronic device 2 determine whether task processing results are consistent. 1916: If the task processing results are inconsistent, the electronic device 1 and the electronic device 2 determine an electronic device having a strong processing capability based on at least one of a processing time, an AI model version, and a related user label. 1917: The electronic device having a strong processing capability performs task processing again, to obtain a combination processing result. 1918: The electronic device having a strong processing capability sends the combination processing result to another electronic device.

In some other embodiments of this application, when the electronic device 1 sends a task request to a plurality of other electronic devices, the plurality of other electronic devices may separately process some tasks in the task request, and combine task processing results into a complete task request result and feed back the complete task request result to the electronic device 1.

In some other embodiments of this application, when the electronic device 1 sends a plurality of task requests for a same to-be-processed object to a plurality of other electronic devices, different other electronic devices may process different tasks. In one case, a plurality of task processing results obtained by the plurality of other electronic devices are fed back to the electronic device 1, and the electronic device 1 combines and complements the plurality of task processing results for the same to-be-processed object. For example, when the electronic device 1 used by Lisa, the electronic device 2 used by her brother, and an electronic device 3 used by her mother are connected, after the electronic device 1 used by Lisa sends an AI enhancement task and an image classification task to the electronic device 2 used by her brother and the electronic device 3 used by her mother, the electronic device 2 processes the AI enhancement task and feeds back the second picture 701 obtained after processing to the electronic device 1, and the electronic device 3 processes the image classification task and feeds back a processing result "performance" to the electronic device 1. The electronic device 1 combines the second picture 701 obtained by performing AI enhancement on the first picture 401 with the processing result "performance" obtained by performing image classification on the first picture 401. The electronic device 1 performs displaying based on a combination result. For example, the electronic device 1 may display the second picture 701 in a "performance" folder, or the electronic device 1 may label the second picture 701 as "performance".

In another case, a plurality of task processing results obtained by the plurality of other electronic devices are fed back to each connected electronic device, and each electronic device combines and complements the plurality of received task processing results sent by the plurality of other electronic devices. For example, when the electronic device 1 used by Lisa, the electronic device 2 used by her brother, and an electronic device 3 used by her mother are connected, after the electronic device 1 used by Lisa sends an AI enhancement task and an image classification task to the electronic device 2 used by her brother and the electronic device 3 used by her mother, the electronic device 2 processes the AI enhancement task and feeds back the second picture 701 obtained after processing to the electronic device 1 used by Lisa and the electronic device 3 used by her mother, and the electronic device 3 processes the image classification task and feeds back a processing result "performance" to the electronic device 1 used by Lisa and the electronic device 2 used by her brother. The electronic device 1, the electronic device 2, and the electronic device 3 each combine the second picture 701 obtained by performing AI enhancement on the first picture 401 with the processing result "performance" obtained by performing image classification on the first picture 401, and perform displaying based on a combination result.

It should be noted that the foregoing APP may support Bluetooth, a WiFi hotspot, a WiFi direct network (for example, Huawei Share or SHAREit), a mobile data network (for example, 3G, 4G, or 5G), the Internet, or the like. When a plurality of electronic devices are connected by using these communications networks, the connected electronic devices may implement the task sharing method shown in FIG. 4a to FIG. 19-4 by using an APP.

In some embodiments of this application, when creating a local area network such as Bluetooth, a WiFi hotspot, WiFi direct, or NFC, a user may enable a task sharing function to establish a task sharing network, so that electronic devices in the task sharing network can share a task and a task processing capability. For example, referring to FIG. 20, a user sets a WiFi hotspot 1 and enables a task sharing button 2001. After the user 1 enables an APP, a service screen of the APP includes the WiFi hotspot 1.

Figures 21A, 21B, 21C, 21D:
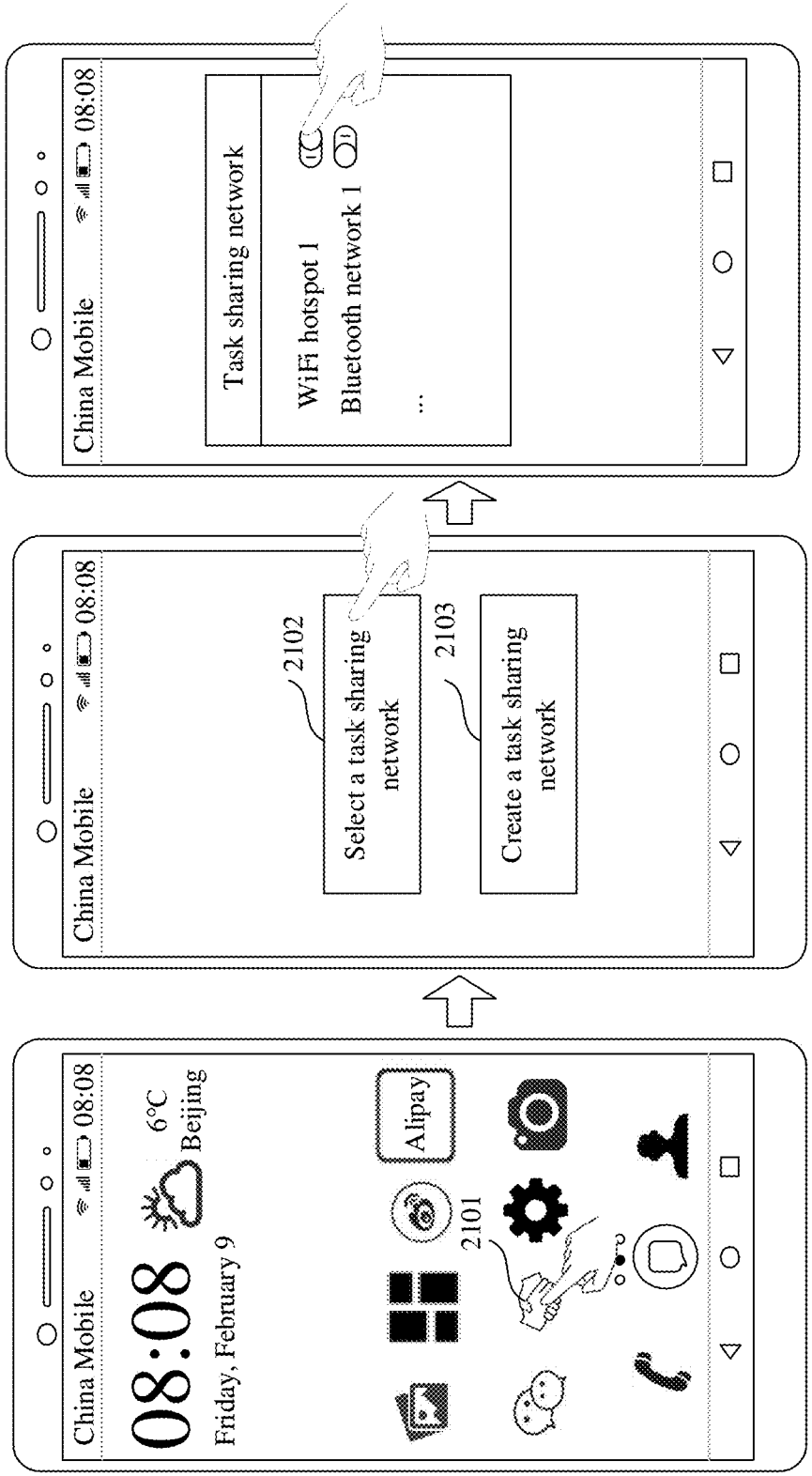
FIG. 21a, FIG. 21b, FIG. 21c, FIG. 21d, and FIG. 21e are schematic diagrams of another group of screens according to an embodiment of this application.
Figures 21D, 21E:
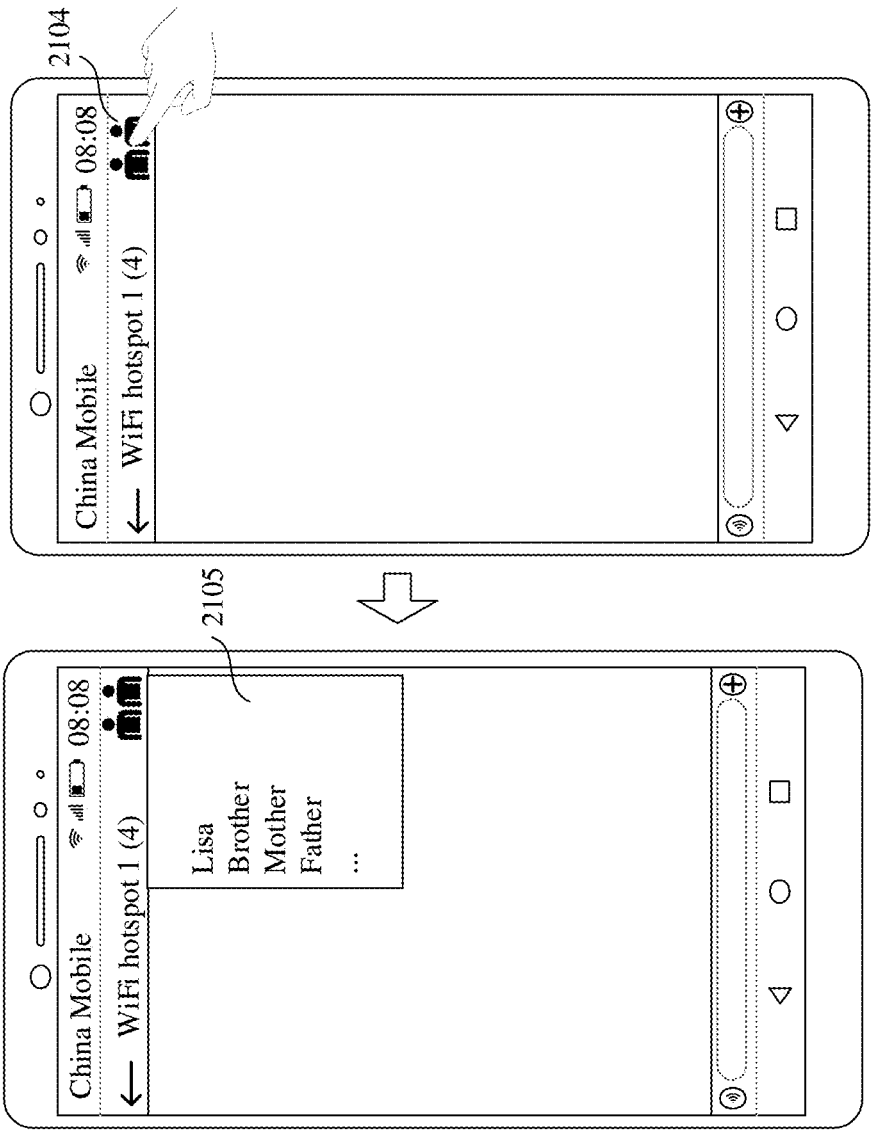

In some other embodiments of this application, referring to FIG. 21a and FIG. 21b, after the user 1 enables an APP 2101, the electronic device 1 displays a "select a task sharing network" control 2102 or a "create a task sharing network" control 2103. Referring to FIG. 21C, when the user 1 taps the "select a task sharing network" control 2102, the electronic device 1 displays at least one created task sharing network or one recently created task sharing network. When the user 1 selects one task sharing network, electronic devices in the task sharing network may share a task. For example, referring to FIG. 21d and FIG. 21e, a group named "WiFi hotspot 1" and a member control 2103 are displayed on an application screen of the APP 2101. When the user taps the member control 2103, the electronic device 1 displays a list 2104 of identifiers of devices accessing the WiFi hotspot 1. For example, the device identifier may be a device serial number, or a name labeled by the user in FIG. 21e. When an electronic device accessing the WiFi hotspot 1 changes in real time, a device in the device identifier list 2104 also changes in real time. The electronic device accessing the WiFi hotspot 1 may share a task by using the method shown in FIG. 4a to FIG. 19-4.

When the user 1 taps the "create a task sharing network" control 2103, the electronic device 1 displays a network creation screen, the user 1 may create a task sharing network, and electronic devices in the task sharing network may share a task. For example, referring to FIG. 22a to FIG. 22c, when the user 1 taps the "create a task sharing network" control 2103 and selects a WiFi hotspot type, a WiFi hotspot network creation screen is displayed, and the user creates a WiFi hotspot task sharing network and enables a task sharing function. After the task sharing network is created, the electronic device 1 may display a screen shown in FIG. 21d. The electronic device accessing the WiFi hotspot 1 may share a task by using the method shown in FIG. 4a to FIG. 19-4.

Figure 23A:
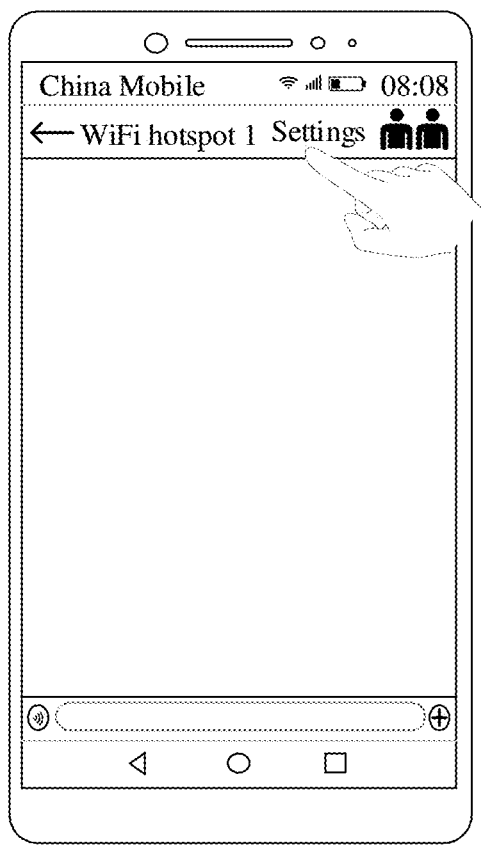
FIG. 23a and FIG. 23b are schematic diagrams of another group of screens according to an embodiment of this application.

In some other embodiments of this application, after a task sharing network is established, the user 1 may further set one or more tasks on an APP screen, and electronic devices in the task sharing network may share a capability of performing one or more tasks. For example, if a task sharing network accessed by the electronic device 1 is the WiFi hotspot 1, referring to FIG. 23a and FIG. 23b, when the user taps a setting button, a task list 2301 may be displayed. When the user selects an "AI enhancement after photographing" option in the task list 2301, after the user takes a photo, electronic devices accessing the WiFi hotspot 1 automatically share an AI enhancement task. That electronic devices accessing the WiFi hotspot 1 automatically share an AI enhancement task includes: The electronic devices accessing the WiFi hotspot 1 each perform AI enhancement task processing and automatically combine processing results. In addition, a combination result may be notified to the electronic device 1 and another electronic device accessing the WiFi hotspot 1. For a combination process, refer to the descriptions of the foregoing related parts. Details are not described herein again.

An example in which a to-be-processed task is an AI enhancement task is still used below to describe a network sharing manner.

Figure 24C:
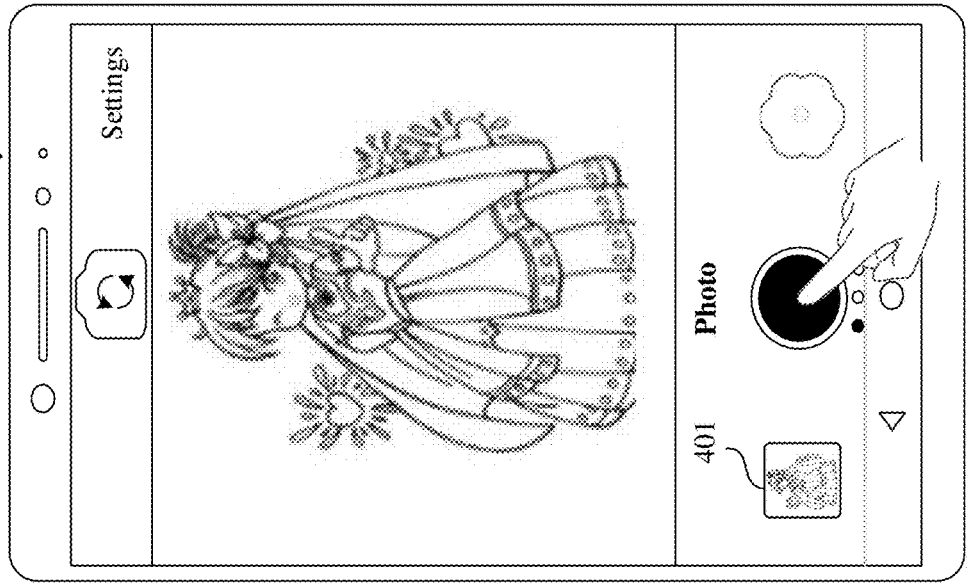
Figure 24D:
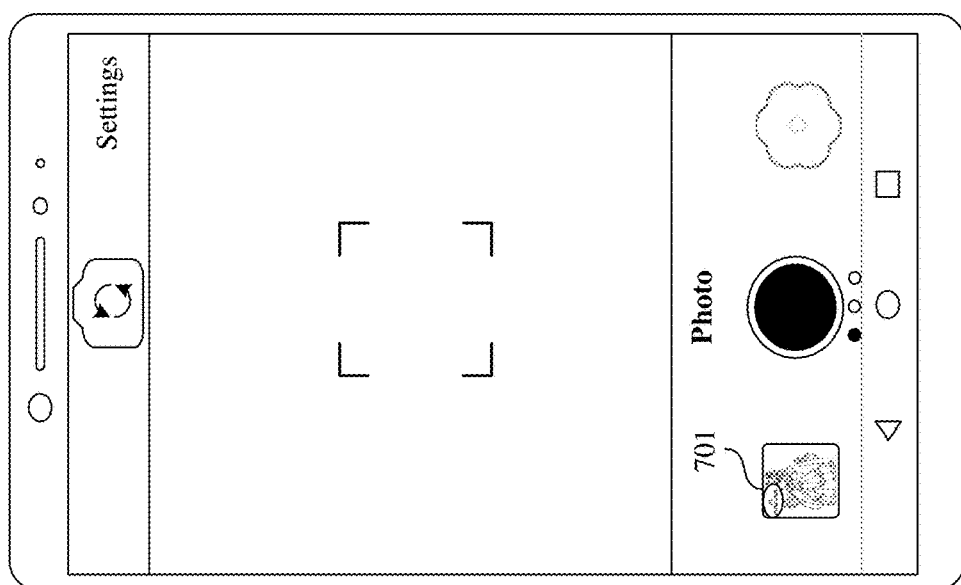
Figures 25A, 25B:
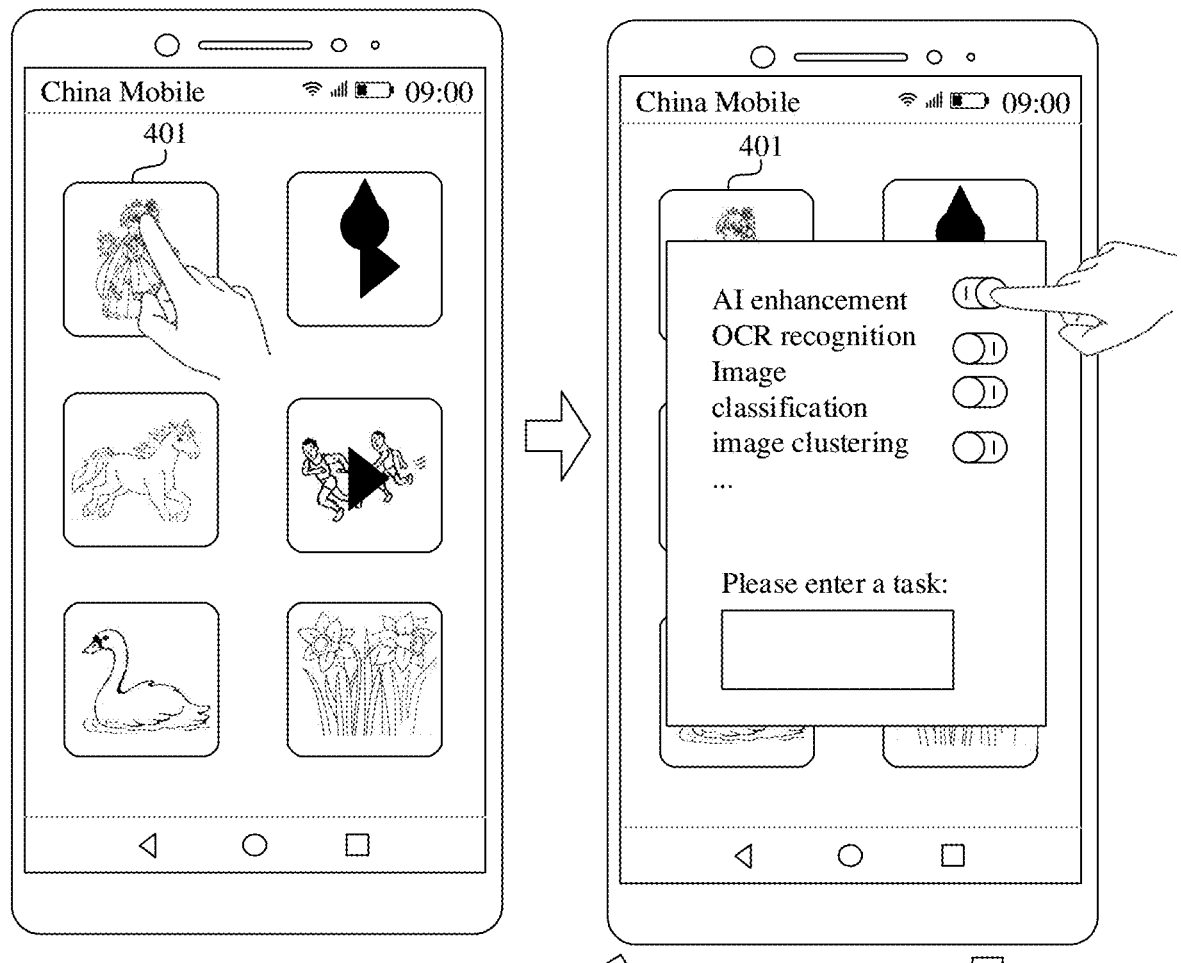
FIG. 25a, FIG. 25b, FIG. 25c, and FIG. 25d are schematic diagrams of another group of screens according to an embodiment of this application.
Figure 25D:
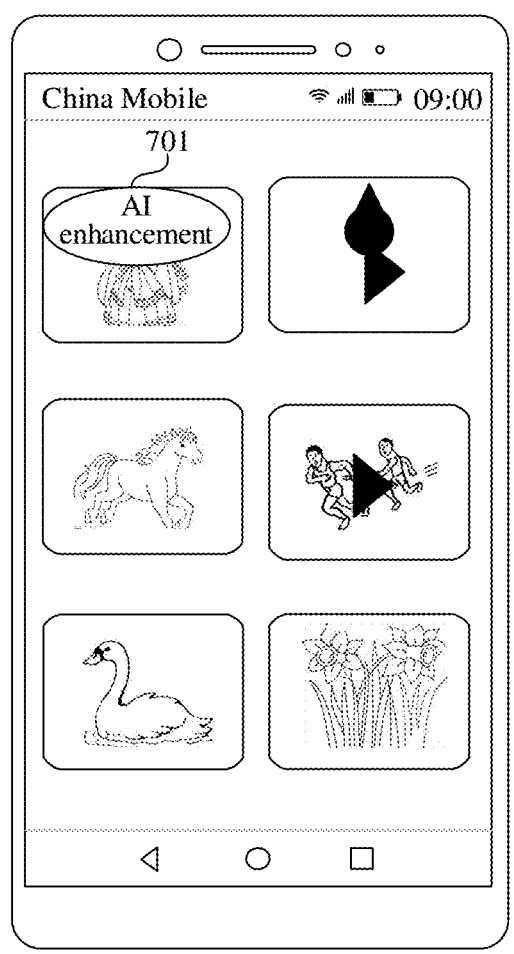
Figure 25C:
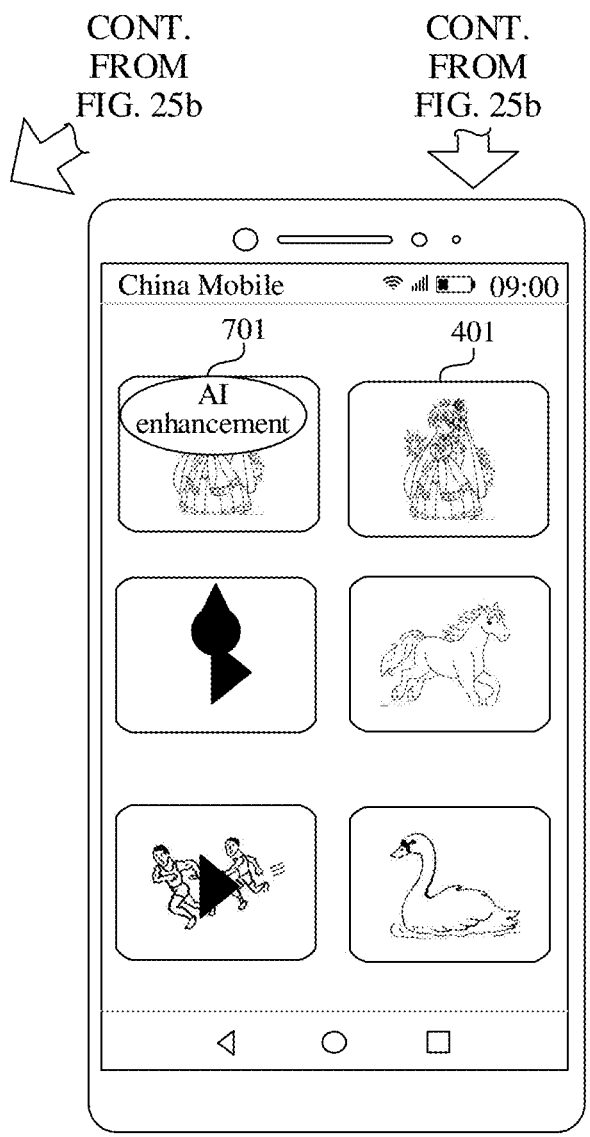

In some other embodiments of this application, when establishing a task sharing network, the electronic device may set one or more specific sharing tasks. For example, as shown in FIG. 24a, when the user 1 establishes the WiFi hotspot 1 and taps a task sharing button 2401, the electronic device 1 may display a task sharing list 2402 to the user. When the user 1 selects or enters one or more tasks in the sharing list 2402, electronic devices accessing the task sharing network may share the one or more tasks and task processing capabilities.

For example, when the user 1 selects an "AI enhancement after photographing" task in the sharing list 2402, referring to FIG. 24b, after the user 1 obtains the first picture 401 through photographing, if the electronic device 1 has accessed a task sharing network, electronic devices accessing the network automatically share an AI enhancement task, and the electronic device 1 obtains the second picture 402 after AI enhancement. Alternatively, a task sharing button may be displayed on a photographing screen. When the user selects the task sharing button, after the user obtains the first picture 401 through photographing, if the electronic device 1 has accessed a task sharing network, electronic devices accessing the task sharing network automatically shares an AI enhancement task, and the electronic device 1 obtains the second picture 402 after AI enhancement. If the electronic device 1 does not access the task sharing network, the electronic device 1 may prompt the user to create or access a task sharing network. In a specific implementation, the electronic device 1 may first access the task sharing network before taking a photo, to share an AI enhancement task with an electronic device in the task sharing network after the electronic device 1 takes a photo.

That electronic devices accessing the task sharing network automatically share an AI enhancement task includes: The electronic devices accessing the task sharing network each process the AI enhancement task and automatically combine processing results. In addition, a combination result may be notified to the electronic device 1 and another electronic device in the task sharing network. For a combination process, refer to the descriptions of the foregoing related parts. Details are not described herein again.

In some other embodiments of this application, after selecting a picture on the photographing screen or from the album, the user 1 may alternatively select at least one task for processing. If the electronic device 1 has accessed the task sharing network, an electronic device in the task sharing network automatically shares a task, and obtains a processing result. For example, referring to FIG. 25a to FIG. 25d, after the user 1 touches and holds the first picture 401 in the album and selects an AI enhancement task, if the electronic device 1 has accessed the task sharing network, the electronic device 1 automatically obtains the second picture 701 that is obtained after AI enhancement. If the electronic device 1 does not access the task sharing network, the electronic device 1 may prompt the user to create or access a task sharing network.

Some other embodiments of this application further provide a task sharing method. In the method, n (a positive integer) electronic devices establish a short-distance connection, each connected electronic device may display a global picture, and the global picture includes all pictures on the n electronic devices.

In one case, in the n electronic devices, the user may select one picture (or one group of pictures) from a specific electronic device, and request another electronic device to process, by sharing a task, the picture selected by the user, and obtain a processing result. The task is a preset or default task. For example, the task may be AI enhancement.

Figure 26A:
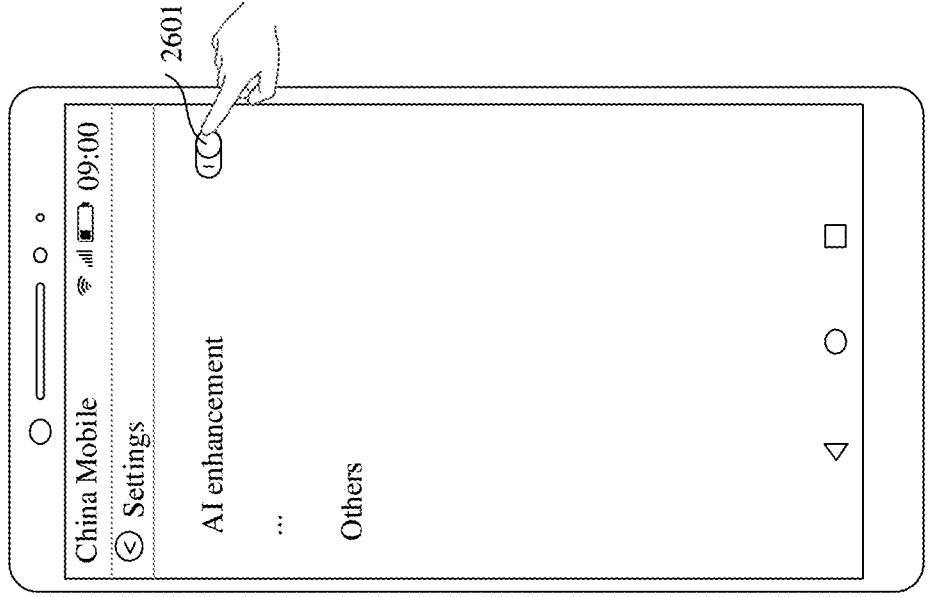
FIG. 26a, FIG. 26b, FIG. 26c, and FIG. 26d are schematic diagrams of another group of screens according to an embodiment of this application.
Figure 26B:
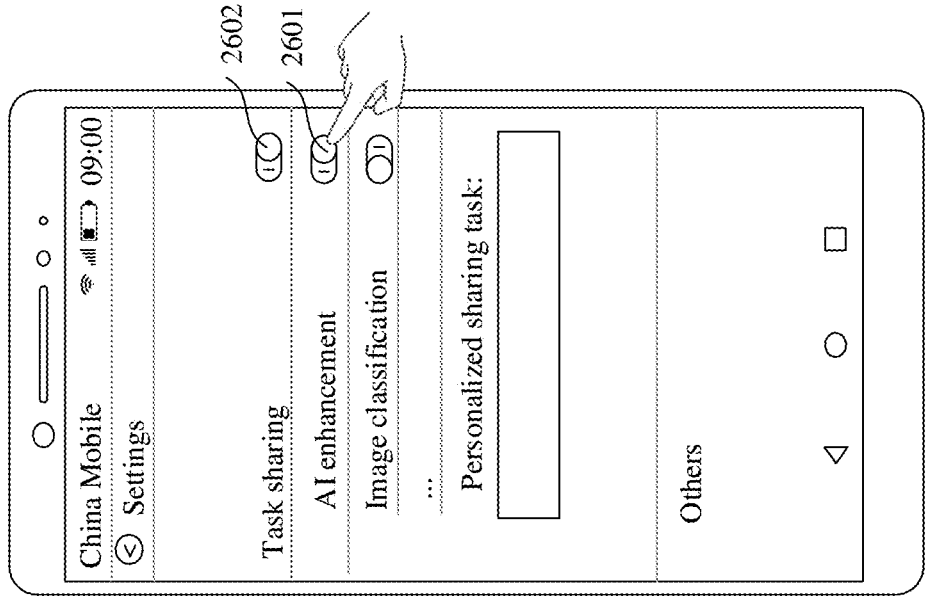
Figure 26C:
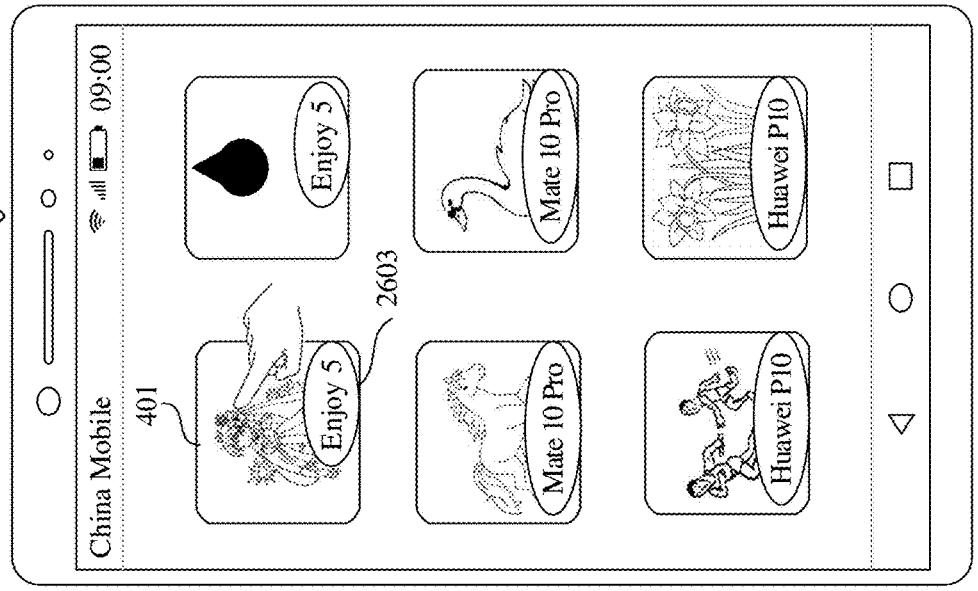

For example, referring to FIG. 26a, Lisa enables an AI enhancement switch 2601 displayed on a settings screen of the electronic device 1, or referring to FIG. 26b, Lisa enables a task sharing switch 2602 and an AI enhancement switch 2601 that are displayed on a setting interface of the electronic device 1. In response to an operation of enabling the AI enhancement switch 2601, the electronic device 1 initiates a short-distance network connection (for example, a WiFi hotspot network, a WiFi direct network, a Bluetooth network, or a ZigBee network), the electronic device 2 used by her mother and the electronic device 3 used by her father access the WiFi direct network. In this case, a global picture is displayed on each of the electronic device 1, the electronic device 2, and the electronic device 3, and the global picture includes all original pictures that are in the three electronic devices before the three electronic devices access the network. In some embodiments, a source label is displayed on the global picture, and is used to identify a specific electronic device from which the picture is. For example, the source label is an electronic device model. For example, as shown in FIG. 26c, in the global picture, a source label 2603 displayed on a picture from the electronic device 1 may be Huawei Enjoy 5, a source label displayed on a picture from the electronic device 2 may be Huawei Mate 10 pro, and a source label displayed on a picture from the electronic device 3 may be Huawei P10.

For example, in some embodiments of this application, when Lisa selects one picture such as the picture 401 from the global picture, the electronic device 1 may perform, by using the task sharing method in the foregoing embodiments, AI enhancement on the picture 401 by lending a capability of another electronic device, and obtain a processing result. For example, the electronic device 1 sends a picture identifier of the picture 401 to the electronic device 2 and the electronic device 3, and the electronic device 2 performs AI enhancement on the picture 401 and sends a processing result to the electronic device 1 and the electronic device 3.

In some other embodiments of this application, a thumbnail of a picture is displayed in the global picture. When Lisa selects the picture 401 from the global picture, the electronic device 1 sends specific data information of the picture 401 to the electronic device 2 and the electronic device 3. The electronic device 2 and the electronic device 3 each perform AI enhancement on the picture 401, combine task processing results, and then send the task processing results to the electronic device 1.

Figure 26D:
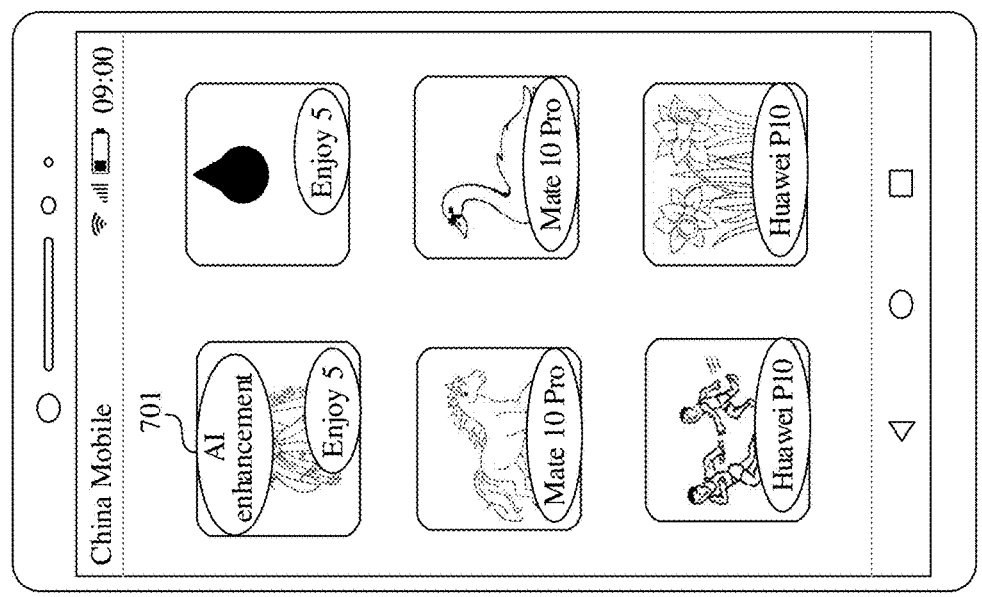

After receiving the task processing results, the electronic device 1 may display, in a manner shown in FIG. 11-1a to FIG. 11-1d or FIG. 11-2a to FIG. 11-2f, a picture obtained after AI enhancement. For example, as shown in FIG. 26d, in the global picture displayed by the electronic device 1, a first mark (AI enhancement) is displayed on the picture 701 obtained after AI enhancement, to indicate that the current picture is a picture obtained after AI enhancement.

In another case, a specific electronic device in the n electronic devices may perform task processing on the picture selected by the user, and send a processing result to at least one another electronic device.

For example, in some embodiments of this application, when her mother selects the picture 401 from the global picture, the electronic device 2 performs AI enhancement on the picture 401, and sends a processing result to the electronic device 2 and the electronic device 3.

In some other embodiments of this application, a picture in the global picture is a thumbnail. When her mother selects the picture 401 from the global picture displayed on the electronic device 2, the electronic device 2 obtains specific data information of the picture 401 from the electronic device 1. After obtaining the specific data information of the picture 401, the electronic device 2 performs AI enhancement on the picture 401, and sends a picture obtained after AI enhancement to the electronic device 1 and the electronic device 3. The electronic device 1 may display, in a manner shown in FIG. 11-1a to FIG. 11-1d or FIG. 11-2a to FIG. 11-2f, the picture obtained after AI enhancement.

When the short-distance network connection is disconnected, or when the user disables the AI enhancement switch 2601 in FIG. 26a, or when the user disables the task sharing switch 2602 in FIG. 26b, the global picture is not displayed in each electronic device, only a picture (including a picture obtained after AI task sharing processing) in the current electronic device is displayed.

An example in which a to-be-processed object is an obtained picture is used above for description. The to-be-processed object may also be a group of obtained pictures, a text, a video, a folder, or the like. The folder may include a picture, a text, or a video. When the to-be-processed object is a folder, the to-be-processed object is actually a picture, a text, and a video in the folder. When the to-be-processed object is a video, a processing task may be image stabilization processing, smoothness processing, clarity processing, or the like. When the to-be-processed object is a text, a processing task may include text translation, text intent recognition, entity extraction, or the like. Similar to the method for sharing a task when a to-be-processed object is an obtained picture, when the to-be-processed object is a task of processing a group of obtained pictures, a text video, or a folder, task sharing may be performed in the foregoing APP sharing manner or network sharing manner.

For example, when the to-be-processed object is a shot video, a processing task may be image stabilization processing. For example, if the video is shot by the user while the user is walking or in a vehicle, the electronic device shakes during shooting, and consequently a to-be-photographed video image is blurred and shaken. In this case, the electronic device 1 may request another electronic device to share a video stabilization processing task, to perform image stabilization processing on the video through the another electronic device, and then obtain an image obtained after processing. This alleviates video image flickering, and makes a taken picture clearer and sharper.

When the to-be-processed object (for example, the to-be-processed object is a video) has a relatively large amount of data, or when a task is relatively urgent and needs to be processed in time, a faster and more efficient communication manner such as WiFi direct or a WiFi hotspot may be used between a plurality of electronic devices. When the to-be-processed object has a relatively small amount of data, or when a to-be-processed task is not urgent, a relatively slow communication manner such as Bluetooth, NFC, or a mobile network may be used between a plurality of electronic devices. When the to-be-processed object is privacy information, a trusted local area network may be established between a plurality of electronic devices by using Bluetooth, a WiFi hotspot, WiFi direct, NFC, or the like, to perform task sharing. In this way, the to-be-processed object does not pass through an intermediate device such as a cloud server or a repeater. Therefore, confidentiality and security are relatively high.

It should be noted that, when the to-be-processed object is a group of obtained pictures, an obtained text, an obtained video, or an obtained folder, and when a plurality of electronic devices share a task, if processing results are different, the plurality of electronic devices may further combine the processing results. Herein, details about a combination processing process are not described again.

In some other embodiments of this application, the electronic device may perform task processing on the to-be-processed object, and share a task processing result with another electronic device. For example, Lisa and Emmy participate in a seminar together, and related information of the seminar is a foreign-language text. The electronic device 1 used by Lisa and the electronic device 2 used by Emmy are connected based on a communications network. Lisa translates, by using a local processing capability of the electronic device 1 or a cloud server, the foreign-language text into a Chinese-language text and sends a translation result to the electronic device 2 used by Emmy, and Emmy may directly read the translated Chinese content without further translation. This can further save traffic consumed by Emmy for translation by using the cloud server.

Application scenario 2: A to-be-processed task is a real-time and continuous task. For example, the application scenario 2 is a video stabilization scenario, a video chat optimization scenario, and a real-time preview optimization scenario.

During video shooting, because the user takes a photo in walking or in a vehicle, the electronic device shakes, and consequently a taken video image shakes. The video stabilization means that, in a photographing process, processing is performed by a current electronic device or another electronic device to reduce video stabilization in the photographing process, so that a taken picture is clearer and sharper.

The video chat optimization means that, during video chatting, processing is performed by a current electronic device or another electronic device to improve chat picture smoothness and optimize an image display effect. For example, the electronic device may perform voice segmentation on a video image, and separately perform optimization processing (for example, perform AI enhancement on a person) on different entities such as a recognized person, plant, or blue sky.

The real-time preview optimization means that, in a camera preview screen, the electronic device 1 sends a previewed picture to another electronic device in real time, and the another electronic device performs image optimization processing (for example, AI enhancement or filter processing), and then sends a picture obtained after processing to the electronic device 1 in real time. The electronic device 1 displays, in the preview screen, an image obtained after optimization processing. When the user 1 sees a satisfactory picture effect on the electronic device 1, the user 1 may tap to take a photo, to store a satisfactory photo for the user 1.

In some embodiments of this application, when a user sets a local area network by using Bluetooth, a WiFi hotspot, a WiFi direct network, or the like, the user may enable a task sharing button to establish a task sharing network, so that electronic devices in the task sharing network can share a task and a task processing capability. The task processing capability includes a real-time preview processing capability, a video chat optimization capability, and a video stabilization processing capability. In the application scenario 2, an electronic device that requests task processing may not process a corresponding task (a requested task).

Figure 23B:
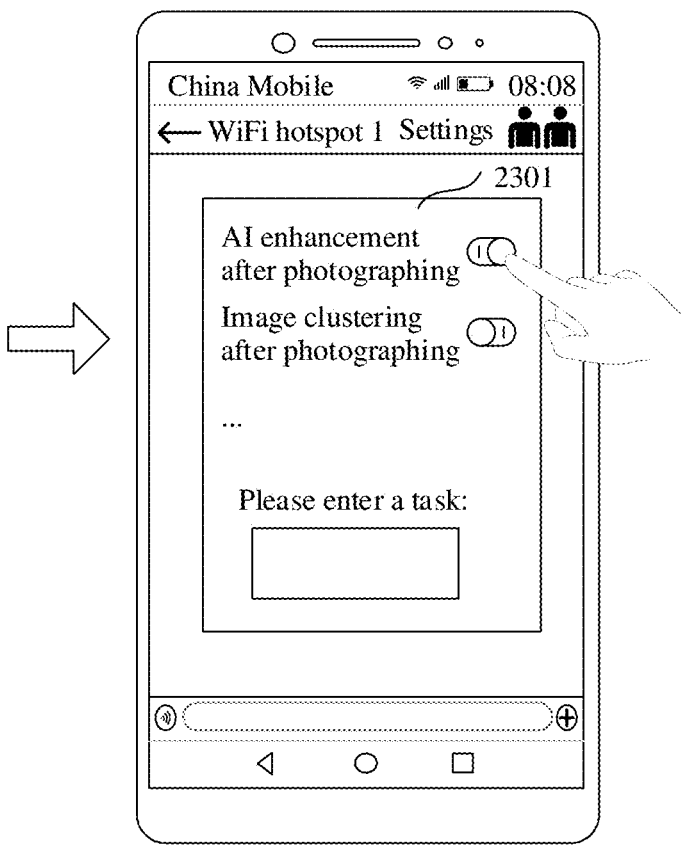

For example, in FIG. 23b, the task list 2301 may further include a "video stabilization" option, a "video chat optimization" option, a "real-time preview optimization" option, and the like. When the user 1 selects the "video stabilization" option in the task list 2301, and when the user 1 shoots a video, the electronic device 1 automatically sends each collected picture to another electronic device accessing the WiFi hotspot 1, and the another electronic device returns each picture obtained after image stabilization processing to the electronic device 1. The electronic device 1 generates a video based on a plurality of images obtained after image stabilization processing. In a photographing process, the electronic device 1 displays an image obtained after image stabilization processing. For example, if the electronic device of Lisa has a relatively poor image processing capability and the electronic device of her brother has a relatively strong video processing capability, when shooting a video on a train, Lisa may perform video stabilization processing by using the electronic device of her brother. In this way, Lisa can shoot a relatively stable video on the train.

For another example, when the user 1 selects the "video chat optimization" option in the task list 2301, when the user performs video chatting, the electronic device 1 automatically sends each collected picture to another electronic device accessing the WiFi hotspot 1, the another electronic device returns an optimized picture to the electronic device 1, and the electronic device 1 displays the optimized picture in real time when the user 1 performs video chatting. In this way, the user can see a picture with a better effect during video chatting. This improves video chat user experience. For example, if the electronic device of Lisa has a relatively poor video processing capability and the electronic device of her brother has a relatively strong video processing capability, when Lisa performs video chatting, Lisa may perform optimization processing by using the electronic device of her brother. In this way, Lisa can see a smoother and clearer picture during video chatting.

For another example, when the user 1 selects the "real-time preview" option in the task list 2301, on a preview screen of Camera, the electronic device 1 automatically sends each collected picture to another electronic device accessing the WiFi hotspot 1, and the another electronic device returns an optimized picture to the electronic device 1. A picture displayed when the electronic device 1 performs preview is an optimized picture.

In some other embodiments of this application, the user 1 may set at least one task for processing on a video shooting screen, a chat screen, or a camera preview interface. If the electronic device 1 has accessed the task sharing network, the electronic device in the task sharing network automatically performs task processing such as video stabilization, video chat optimization, or real-time preview optimization, and the electronic device 1 and another electronic device in the task sharing network may obtain a processing result. For example, on a screen displayed after the user 1 answers a video chat, or referring to FIG. 27a to FIG. 27c, on a screen displayed before the user 1 answers a video chat, after the user taps a setting button 2701 and selects a "video chat optimization" option, if the electronic device 1 has accessed the task sharing network, the electronic device 1 displays an optimized picture 2702. In addition, the electronic device 1 may further display prompt information, to prompt the user 1 that a current picture is a result obtained after processing by another electronic device. For example, referring to FIG. 27c, the prompt information 2703 may be specifically "an image has been processed by using another device". If the electronic device 1 does not access the task sharing network, the electronic device 1 may prompt the user to create or access a task sharing network. In a specific implementation, the electronic device 1 may first access the task sharing network before performing video chatting. Therefore, during video chatting, the electronic device 1 can optimize a video image by using an electronic device in the task sharing network.

Figure 20:
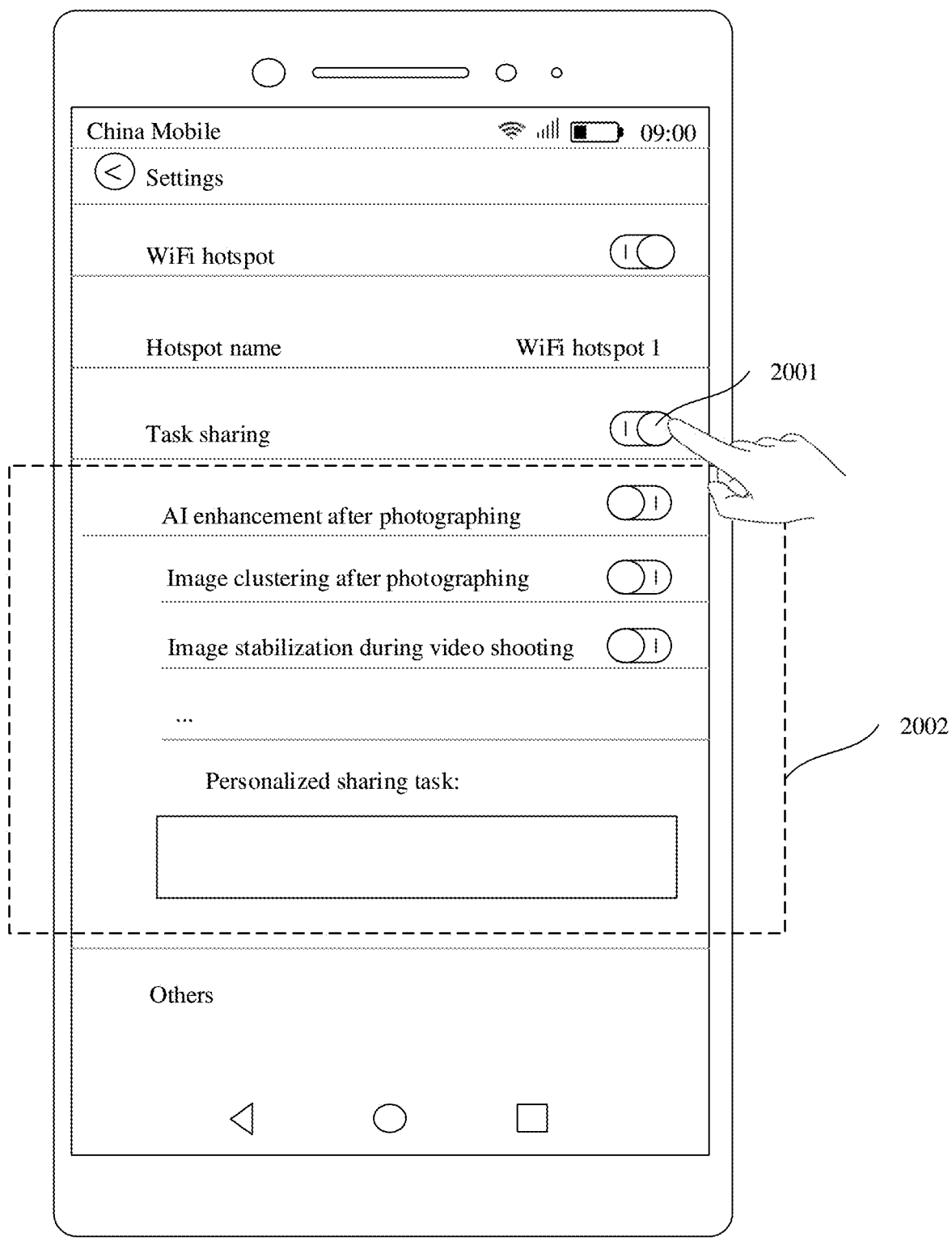
FIG. 20 is a schematic diagram of a settings screen according to an embodiment of this application.

In some other embodiments of this application, a sharing list 2002 in FIG. 20 may further include a "video stabilization" option, a "video chat optimization" option, and a "real-time preview optimization" option. When the user 1 selects or enters one or more tasks in the sharing list 2002, an electronic device accessing the task sharing network may share the one or more tasks. For example, when the user 1 selects the "video stabilization" option, when the user 1 shoots a video, if the electronic device 1 has accessed the task sharing network, an electronic device accessing the task sharing network automatically performs video stabilization processing, and the electronic device 1 obtains a video obtained after image stabilization processing. Alternatively, a task sharing button may be displayed on a photographing screen. When the user selects the task sharing button, and when the user 1 shoots a video, if the electronic device 1 has accessed the task sharing network, an electronic device accessing the task sharing network automatically performs video stabilization processing, and the electronic device 1 obtains a video obtained after stabilization processing.

In one case, when a plurality of electronic devices process a task request in the scenario 2, if processing results are different, the plurality of electronic devices may further automatically combine the processing results. For a combination processing process, refer to the descriptions of the foregoing related parts. Details are not described herein again.

In another case, in the application scenario 2, there is one electronic device that accepts the task request. In this way, a plurality of processing results do not need to be combined. This can save a processing time, and ensure that an electronic device that requests a task can display a picture in real time.

It should be further noted that a relatively strong data transmission capability and a relatively fast transmission speed are required in a case shown in the application scenario 2. Therefore, an efficient transmission manner such as a WiFi hotspot or WiFi direct may be used.

Figure 28:
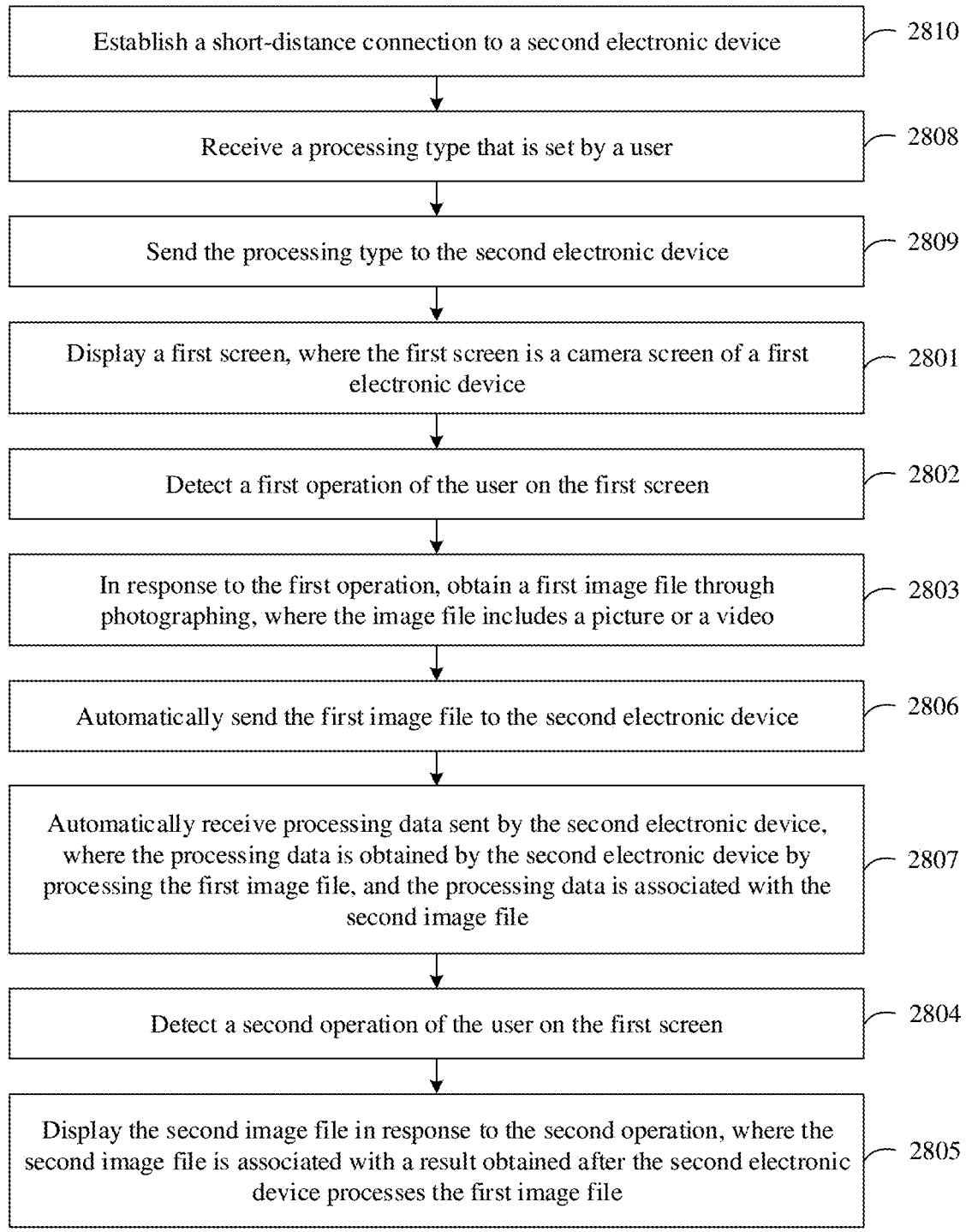
FIG. 28 is a flowchart of an image processing method according to an embodiment of this application.

Some other embodiments of this application provide an image processing method. As shown in FIG. 28, the method may include the following steps: 2801: A first electronic device displays a first screen, where the first screen is a camera screen of the first electronic device. For example, the first screen may be the screen shown in FIG. 3b. 2802: The first electronic device detects a first operation of a user on the first screen. In the embodiments of this application, an operation (for example, the first operation, a second operation, a fourth operation, or a third operation) includes a voice operation or a gesture operation. The gesture operation may include a touch gesture or a floating gesture. The touch gesture may include but is not limited to a tap gesture, a double-tap gesture, a touch-and-hold gesture, a press gesture, a drag gesture, or the like. 2803: The first electronic device obtains a first image file through photographing in response to the first operation, where the image file includes a picture or a video. For example, as shown in FIG. 4a, the first electronic device obtains the first picture 401 (that is, the first image file) through photographing when detecting that the user taps a photographing button. 2804: The first electronic device detects the second operation of the user on the first screen. 2805: The first electronic device displays a second image file in response to the second operation, where the second image file is associated with a result obtained after a second electronic device processes the first image file. For example, the second operation may be an operation of tapping the thumbnail 1101 shown in FIG. 11-2a, and the second image file may be the second picture 701 in FIG. 11-2a to FIG. 11-2f.

In the embodiments of this application, the first electronic device having a relatively weak local processing capability may process the first image file by lending a capability of the second electronic device, so that the first electronic device locally displays a processing result, thereby improving user experience of the first electronic device having a relatively weak local processing capability.

Figures 2F, 11:
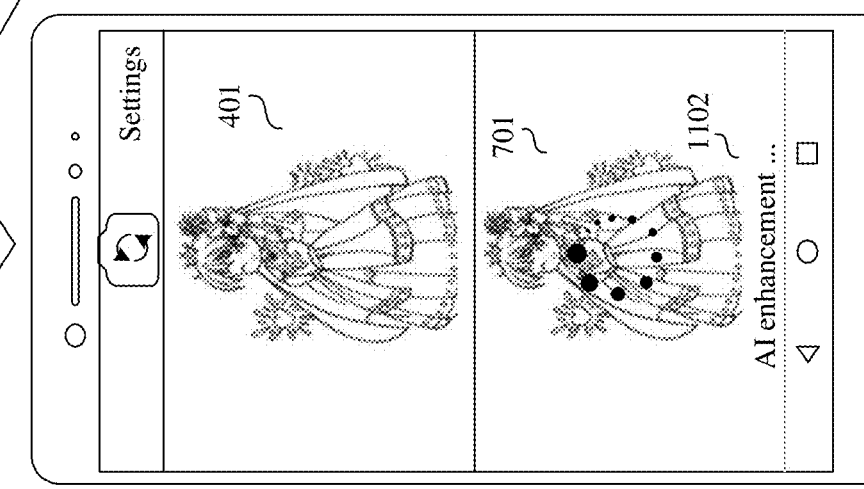

In some other embodiments of this application, after the first electronic device obtains the first image file through photographing, the method further includes the following steps: 2806: The first electronic device automatically sends the first image file to the second electronic device. 2807: The first electronic device automatically receives processing data sent by the second electronic device, where the processing data is obtained by the second electronic device by processing the first image file, and the processing data is associated with the second image file. For example, after the user obtains the first picture 401 (that is, the first image file) through photographing, the first electronic device automatically receives, without needing an operation of the user, AI enhancement processing data sent by the second electronic device. In addition, as shown in FIG. 11-2a to FIG. 11-2f, the first electronic device displays the second picture 701 based on the AI enhancement processing data.

In some other embodiments of this application, before the first electronic device obtains the first image file through photographing, the method further includes the following steps: 2808: The first electronic device receives a processing type that is set by the user. 2809: The first electronic device sends the processing type to the second electronic device. In this case, the second electronic device learns of an operation requested by the first electronic device, to process the first image file based on the requested operation. For example, as shown in FIG. 26a or FIG. 26b, the user may preset the processing type "AI enhancement after picture photographing", and the first electronic device sends the processing type to the second electronic device over a communications network. For another example, as shown in FIG. 23b or FIG. 24a, the user may preset the processing type "AI enhancement after picture photographing", and the first electronic device sends the processing type to the second electronic device over an APP or a communications network. In this case, after obtaining the first picture 401 through photographing, the second electronic device automatically performs AI enhancement on the first picture 401 through the second electronic device.

In the embodiments of this application, the processing type requested by the first electronic device includes at least one of image beautification, image classification, image facial recognition, image clustering, image facial expression recognition, image age analysis, image optical character recognition OCR, image semantic segmentation, or the like.

In the embodiments of this application, the processing data includes at least one of the second image file or associated data. For example, when the processing type is "AI enhancement" and the first image file is the first picture 401, the processing data is the second image file, and the second image file is the second picture 701. For example, when the processing type is "image classification" and the first image file is the first picture 401, the processing data is the associated data, and the associated data is a classification result: a label "wedding photo". For example, when the processing type is "image facial recognition" and the first image file is a family group photo taken by Lisa, the processing data is the associated data, and the associated data is facial recognition results: "father, mother, Lisa, and brother" (For example, the second electronic device may arrange the facial recognition results in a preset format, for example, in a sequence of faces included in the picture from left to right). For example, when the processing type is "AI enhancement" and "image classification", the processing data may be the second image file and the associated data, the second image file is the second picture 701 obtained after processing, and the associated data is a classification result "wedding photo".

When the associated data includes a label, the label may correspond to one folder, and the second image file is in the folder corresponding to the label. For example, as shown in FIG. 15*c*, when the image classification result is "wedding photo", the associated data includes a label "wedding photo", and the second picture 701 is in a folder corresponding to the label "wedding photo".

Figures 22A, 22B, 22C:
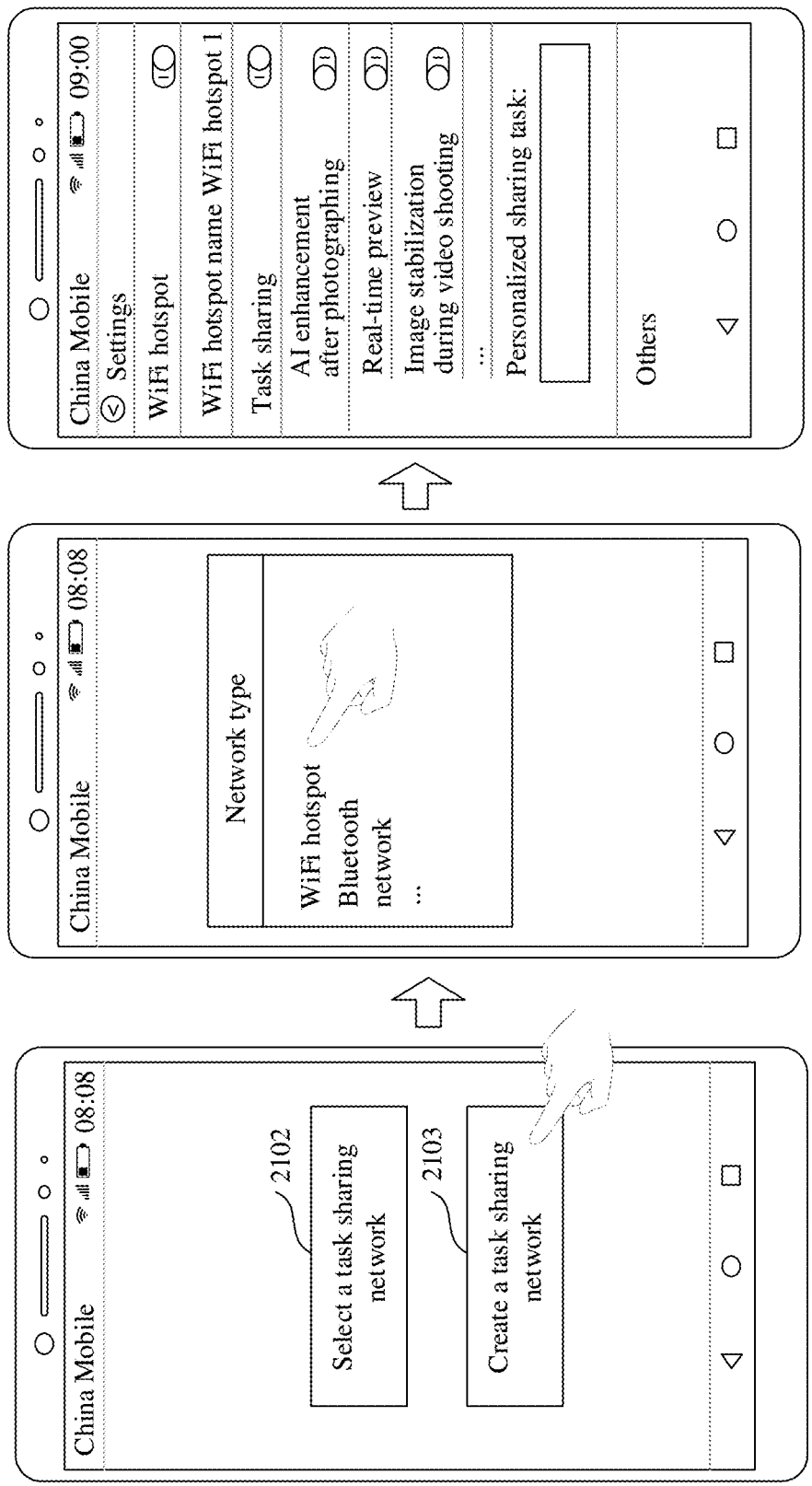
FIG. 22a, FIG. 22b, and FIG. 22c are schematic diagrams of another group of screens according to an embodiment of this application.

In some other embodiments of this application, before step 2801, the method may further include the following step: 2810: The first electronic device establishes a short-distance connection to the second electronic device. For example, the first electronic device may establish the short-distance connection to the second electronic device over a WiFi hotspot, WiFi direct, Bluetooth, ZigBee, or NFC. For example, as shown in FIG. 20, FIG. 22*c*, or FIG. 24*a*, the first electronic device may establish a WiFi hotspot, and the second electronic device may access the WiFi hotspot, so that the short-distance connection is established between the first electronic device and the second electronic device.

In some other embodiments of this application, there are a plurality of second electronic devices. For example, as shown in FIG. 12*a* and FIG. 12*b* or as shown in FIG. 14*c*, the first electronic device may send the first picture 401 to a plurality of electronic devices used by family members or friends for processing. When there are a plurality of second electronic devices, the processing data is data obtained by combining a plurality of pieces of processing data of the plurality of second electronic devices. For example, for an example in which a plurality of second electronic devices combine a plurality of pieces of processing data, refer to FIG. 17*a*, FIG. 18, or FIG. 19-1 to FIG. 19-4.

In some other embodiments of this application, there may be a plurality of processing types that the first electronic device requests the second electronic device to process. For example, as shown in FIG. 15*a*, the processing type requested by the first electronic device for processing includes AI enhancement and image classification. In this case, processing data obtained by each second electronic device corresponds to at least one of the plurality of processing types. For example, the second electronic devices include an electronic device 2 and an electronic device 3, the electronic device 2 may perform AI enhancement processing, and the electronic device 3 may perform image classification processing.

Figure 29:
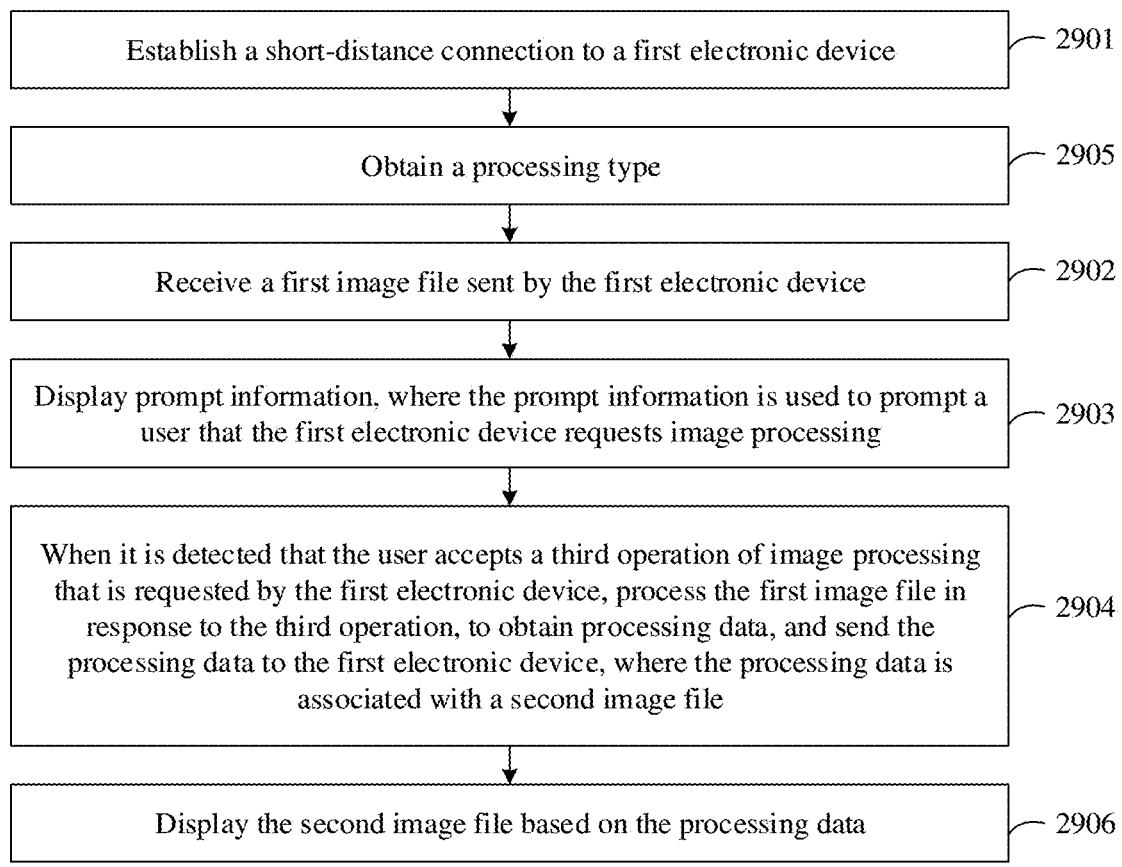
FIG. 29 is a flowchart of another image processing method according to an embodiment of this application.

Some other embodiments of this application provide another image processing method. As shown in FIG. 29, the method includes the following steps: 2901: A second electronic device establishes a short-distance connection to a first electronic device. For example, the first electronic device may establish the short-distance connection to the second electronic device over a communications network such as a WiFi hotspot, WiFi direct, Bluetooth, ZigBee, or NFC. For example, as shown in FIG. 20, FIG. 22*c*, or FIG. 24*a*, the first electronic device may establish a WiFi hotspot, and the second electronic device may access the WiFi hotspot, so that the short-distance connection is established between the first electronic device and the second electronic device. 2902: The second electronic device receives a first image file sent by the first electronic device. 2903: The second electronic device displays prompt information, where the prompt information is used to prompt a user that the first electronic device requests image processing. For another example, the prompt information may be the prompt information 1001 shown in FIG. 10*b*, and is used to prompt the user whether to accept image processing. 2904: When detecting that the user accepts a third operation of image processing that is requested by the first electronic device, the second electronic device processes the first image file in response to the third operation, to obtain processing data, and sends the processing data to the first electronic device, where the processing data is associated with a second image file. For example, the third operation may be an operation that the user taps the "Accept" button in FIG. 10*b*. In response to the tap operation, the second electronic device may process the first picture 401 to obtain AI enhancement processing data, and send the AI enhancement processing data to the first electronic device.

In the embodiments of this application, the second electronic device having a relatively strong local processing capability may lend a capability of processing the first image file to the first electronic device, so that the first electronic device can locally display a processing result of the second electronic device, thereby improving user experience of the first electronic device having a relatively weak local processing capability.

Optionally, before the second electronic device receives the first image file sent by the first electronic device, the method further includes the following step: 2905: The second electronic device obtains a processing type. In this case, the second electronic device may process the first image file based on the obtained processing type. Specifically, the second electronic device may obtain the processing type from the first electronic device. For example, in FIG. 9*b*, after Lisa sets the processing type "AI enhancement", the first electronic device used by Lisa may send the processing type "AI enhancement" to the second electronic device, and the second electronic device processes the first picture 401 based on the processing type "AI enhancement" sent by the first electronic device. Alternatively, the second electronic device may obtain the processing type that is set by the user. For example, when the second electronic device is connected to the first electronic device in a manner shown in FIG. 20, FIG. 22*c*, or the like, and the processing type "AI enhancement" is set, the second electronic device may obtain the processing type that is set by the user.

Optionally, the third operation in step 2904 is an operation that the user sets the processing type for the first image file. For example, when the user taps the "AI enhancement" button shown in FIG. 6*c* or FIG. 6*d*, the second electronic device processes the first image file in response to the tap operation, to obtain the processing data, and sends the processing data to the first electronic device.

In some other embodiments of this application, the method further includes the following step: 2906: The second electronic device displays the second image file based on the processing data. For example, after the second electronic device used by Emmy sends the second picture 701 obtained after AI enhancement to the first electronic device used by Lisa, as shown in FIG. 11-1*b* or FIG. 11-1*c*, the second electronic device may also display the second picture 701 obtained after AI enhancement in the album.

In some other embodiments of this application, after the second electronic device obtains the processing data, the method further includes: The second electronic device negotiates with another electronic device about the processing data for the first image file. When there are a plurality of electronic devices that accept the processing request of the first electronic device, for example, as shown in FIG. 17*a*, FIG. 18, or FIG. 19-1 to FIG. 19-4, the second electronic device may further combine processing data with another electronic device, to obtain consistent processing data. Alternatively, when there are a plurality of processing types requested by the first electronic device for a same to-be-processed object request, different electronic devices that accept the processing request may process the to-be-processed object based on different processing types, and the second electronic device may send locally obtained processing data to another electronic device, or may receive processing data that corresponds to another processing type and that is sent by another electronic device, and integrate different pieces of processing data respectively corresponding to different processing types.

Figure 30:
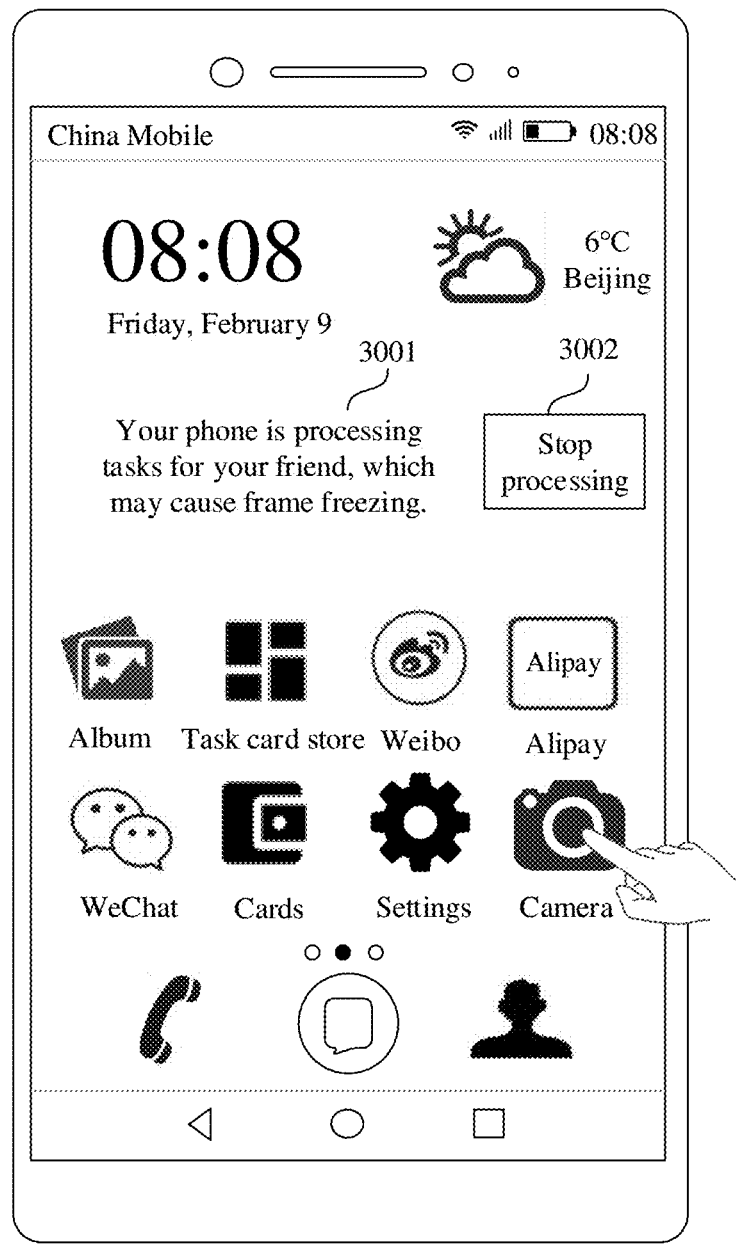
FIG. 30 is a schematic diagram of another screen according to an embodiment of this application.

Some other embodiments of this application provide another image processing method. The method includes: A second electronic device establishes a short-distance connection to a first electronic device. The second electronic device receives a first image file sent by the first electronic device. The second electronic device displays prompt information, processes the first image file to obtain processing data, and sends the processing data to the first electronic device, where the processing data is associated with a second image file. For example, the prompt information may be the prompt information 3001 shown in FIG. 30, and is used to prompt a user with "helping another electronic device to perform task processing", so that the user using the second electronic device learns that the second electronic device is not freezing because of a fault or the like. In addition, a display screen of the prompt information 3001 may further include a "stop processing" button 3002 that is used to enable the second electronic device to stop processing a task requested by another electronic device, according to an instruction of the user.

It can be understood that, to implement the foregoing functions, the electronic device includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device or the server may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. During actual implementation, another division manner may be used.

Figure 31:
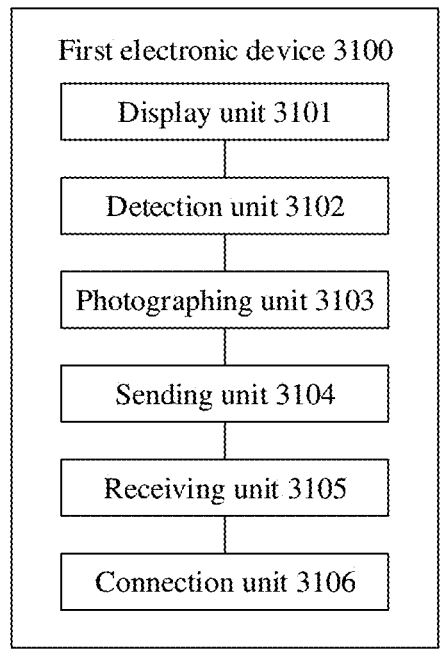
FIG. 31 is a schematic structural diagram of an electronic device according to an embodiment of this application.

When each function module is obtained through division based on each corresponding function, FIG. 31 is a possible schematic composition diagram of the first electronic device in the foregoing embodiments. As shown in FIG. 31, the first electronic device 3100 may include a display unit 3101, a detection unit 3102, a photographing unit 3103, a sending unit 3104, a receiving unit 3105, and a connection unit 3106.

The display unit 3101 may be configured to support the first electronic device 3100 in performing step 2801 and step 2805 in the image processing method shown in FIG. 28. The detection unit 3102 may be configured to support the first electronic device 3100 in performing step 2802 and step 2804 in the image processing method shown in FIG. 28. The photographing unit 3103 may be configured to support the first electronic device 3100 in performing step 2803 in the image processing method shown in FIG. 28. The sending unit 3104 may be configured to support the first electronic device 3100 in performing step 2806 in the image processing method shown in FIG. 28. The receiving unit 3105 may be configured to support the first electronic device 3100 in performing step 2807 and step 2808 in the image processing method shown in FIG. 28. The connection unit 3106 may be configured to support the first electronic device 3100 in performing step 2810 in the image processing method shown in FIG. 28.

It should be noted that all related content of the steps in the foregoing method embodiments may be cited in function descriptions of corresponding function modules. Details are not described herein again.

The first electronic device provided in this embodiment of this application is configured to perform the foregoing image processing method, and therefore can achieve a same effect as the image processing methods described in FIG. 4a to FIG. 30.

When an integrated unit is used, the detection unit 3102, the photographing unit 3103, and the connection unit 3106 may be integrated into a processing module, the display unit 3101 may be integrated into a display module, and the sending unit 3104 and the receiving unit 3103 may be integrated into a communications module.

The processing module is configured to control and manage an action of the first electronic device. For example, the processing module is configured to support the first electronic device in performing step 2810, step 2802, step 2803, and step 2804 in FIG. 28, and/or is configured to perform another process of the technology described in this specification. The display module may be configured to support the first electronic device in performing step 2801 and step 2805 in FIG. 28, and may further display a graphical user interface, image or parameter information, or the like to a user. The communications module may be configured to support the first electronic device in performing step 2806, step 2807, step 2808, and step 2809 in FIG. 28.

The processing module may be a processor or a controller, for example, a central processing unit (central processing unit, CPU), a graphics processing unit (graphics processing unit, GPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The display module may be a display, and may be a device configured to display information entered by the user, information provided for the user, and various menus of a terminal. Specifically, the display may be configured in a form of a liquid crystal display, an organic light-emitting diode, or the like. In addition, a touchpad may be further integrated into the display, and is configured to collect a touch event on or near the touchpad and send collected touch information to another component (for example, a processor).

The communications module may be configured to support the first electronic device in communicating with another network entity, for example, communicating with a server. The communications module may be specifically a device that interacts with another first electronic device, such as a radio frequency circuit, a Bluetooth chip, or a WiFi chip.

In addition, the first electronic device 3100 may further include a storage module, configured to store a processing type entered by the user, a photographed picture, program code of the first electronic device, and the like. The storage module may be a memory. The memory may include a high-speed RAM, or may include a nonvolatile memory, for example, a magnetic disk storage device, a flash memory, or another volatile solid-state storage device.

Figure 32:
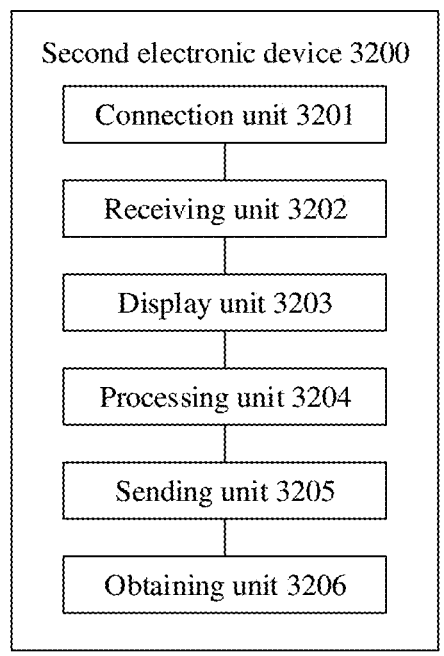
FIG. 32 is a schematic structural diagram of another electronic device according to an embodiment of this application.

When each function module is obtained through division based on each corresponding function, FIG. 32 is a possible schematic composition diagram of the second electronic device in the foregoing embodiments. As shown in FIG. 32, the second electronic device 3200 may include a connection unit 3201, a receiving unit 3202, a display unit 3203, a processing unit 3204, a sending unit 3205, and an obtaining unit 3206.

The connection unit 3201 may be configured to support the second electronic device 3200 in performing step 2901 in the image processing method shown in FIG. 29. The receiving unit 3202 may be configured to support the second electronic device 3200 in performing step 2902 in the image processing method shown in FIG. 29. The display unit 3203 may be configured to support the second electronic device 3200 in performing step 2903 and step 2904 in the image processing method shown in FIG. 29. The processing unit 3204 may be configured to support the second electronic device 3200 in performing step 2904 in the image processing method shown in FIG. 29. The sending unit 3205 may be configured to support the second electronic device 3200 in performing step 2906 in the image processing method shown in FIG. 29. The obtaining unit 3206 may be configured to support the second electronic device 3200 in performing step 2905 in the image processing method shown in FIG. 29.

It should be noted that all related content of the steps in the foregoing method embodiments may be cited in function descriptions of corresponding function modules. Details are not described herein again.

The second electronic device provided in this embodiment of this application is configured to perform the foregoing image processing method, and therefore can achieve a same effect as the image processing methods described in FIG. 4a to FIG. 30.

When an integrated unit is used, the connection unit 3201, the processing unit 3204, and the obtaining unit 3206 may be integrated into a processing module, the display unit 3203 may be integrated into a display module, and the sending unit 3205 and the receiving unit 3202 may be integrated into a communications module.

The processing module is configured to control and manage an action of the second electronic device. For example, the processing module is configured to support the second electronic device in performing step 2901, step 2905, and step 2904 in FIG. 29, and/or is configured to perform another process of the technology described in this specification. The display module may be configured to support the second electronic device in performing step 2903 and step 2906 in FIG. 29, and may further display a graphical user interface, image or parameter information, or the like to a user. The communications module may be configured to support the second electronic device in performing step 2902 and step 2904 in FIG. 29.

The processing module may be a processor or a controller, for example, a central processing unit (central processing unit, CPU), a graphics processing unit (graphics processing unit, GPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The display module may be a display, and may be a device configured to display information entered by the user, information provided for the user, and various menus of a terminal. Specifically, the display may be configured in a form of a liquid crystal display, an organic light-emitting diode, or the like. In addition, a touchpad may be further integrated into the display, and is configured to collect a touch event on or near the touchpad and send collected touch information to another component (for example, a processor).

The communications module may be configured to support the second electronic device in communicating with another network entity, for example, communicating with a server. The communications module may be specifically a device that interacts with another second electronic device, such as a radio frequency circuit, a Bluetooth chip, or a WiFi chip.

In addition, the second electronic device 3200 may further include a storage module, configured to store a picture sent by another electronic device, data obtained through processing, program code of the second electronic device, and the like. The storage module may be a memory. The memory may include a high-speed RAM, or may include a nonvolatile memory, for example, a magnetic disk storage device, a flash memory, or another volatile solid-state storage device.

In a specific implementation, when the processing module is a processor, the display module is a display, and the storage module is a memory, the first electronic device and the second electronic device in the embodiments of this application may be specifically the mobile phone shown in FIG. 2.

An embodiment of this application further provides a computer storage medium. The computer storage medium stores a computer instruction, and when the computer instruction is run on an electronic device, the electronic device is enabled to perform the foregoing related method steps to implement the image processing methods in the foregoing embodiments.

An embodiment of this application further provides a computer program product. When the computer program product is run on a computer, the computer is enabled to perform the foregoing related steps to implement the image processing methods in the foregoing embodiments.

In addition, an embodiment of this application further provides an apparatus. The apparatus may be specifically a chip, a component, or a module. The apparatus may include a processor and a memory that are connected to each other. The memory is configured to store a computer-executable instruction. When the apparatus runs, the processor may execute the computer-executable instruction stored in the memory, so that the chip performs the image processing method in the foregoing method embodiments.

The electronic device, the computer storage medium, the computer program product, or the chip provided in the embodiments of this application each is configured to perform the corresponding method provided above. Therefore, for beneficial effects that can be achieved, refer to the beneficial effects of the corresponding method provided above. Details are not described herein again.

The foregoing descriptions of implementations allow a person skilled in the art to understand that, for the purpose of convenient and brief description, division of the foregoing function modules is taken as an example for illustration. During actual application, the foregoing functions can be allocated to different modules and implemented according to a requirement. In other words, an internal structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of this application may be integrated into one processing unit, or the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method, comprising:
   displaying, by a first electronic device, a first screen, wherein the first screen is a camera screen of the first electronic device;
   detecting a first operation of a user on the first screen;
   obtaining a first image file through photographing in response to the first operation, wherein the first image file comprises a picture or a video;
   automatically sending the first image file by the first electronic device to a second electronic device, wherein sending the first image file to the second electronic device is associated with a request for processing of the first image file by the second electronic device, wherein the request for processing of the first image file causes a display of prompt information on a second screen of the second electronic device, and wherein the prompt information indicates to a second user of the second electronic device that the first electronic device requests image processing;
   automatically receiving, by the first electronic device, processing data sent by the second electronic device, wherein the processing data is obtained by processing of the first image file by the second electronic device in response to the first electronic device sending the first image file to the second electronic device and according to the request for processing of the first image file, and wherein the processing data is associated with a second image file;
   detecting a second operation of the user on the first screen; and
   displaying the second image file at the first electronic device in response to the second operation.

2. The method according to claim 1, wherein the method further comprises performing, before the obtaining the first image file:
   receiving a processing type that is set by the user; and
   sending the processing type to the second electronic device.

3. The method according to claim 2, wherein the processing type comprises one or more of image beautification, image classification, image facial recognition, image clustering, image facial expression recognition, image age analysis, image optical character recognition (OCR), or image semantic segmentation.

4. The method according to claim 1, wherein the processing data comprises the second image file.

5. The method according to claim 1, wherein the processing data comprises a result obtained by performing facial recognition based on the first image file.

6. The method according to claim 1, wherein the method further comprises performing, before the obtaining the first image file:
   establishing a short-distance connection to the second electronic device.

7. The method according to claim 1, wherein there are a plurality of second electronic devices, and the processing data is data obtained by combining a plurality of pieces of processing data of the plurality of second electronic devices.

8. The method according to claim 7, wherein there are a plurality of processing types, and processing data obtained by each second electronic device corresponds to at least one of the plurality of processing types.

9. The method according to claim 1, wherein the processing data includes a label, wherein the label corresponds to a folder in the first electronic device, and wherein the second image file is an image in the folder.

10. An image processing method comprising:
establishing, by a second electronic device, a short-distance connection to a first electronic device;
receiving, by the second electronic device, a first image file sent by the first electronic device, wherein the first image file comprises a picture or a video, and wherein sending the first image file by the first electronic device is associated with a request for processing of the first image file by the second electronic device;
displaying prompt information on a screen of the second electronic device, wherein the prompt information indicates to a user of the second electronic device that the first electronic device requests image processing;
processing, by the second electronic device, the first image file in response to the first electronic device sending the first image file, and further in response to detecting that the user accepts a third operation requested by the first electronic device;
obtaining processing data according to the processing of the first image file; and
sending the processing data by the second electronic device to the first electronic device, wherein the processing data is associated with a second image file.

11. The method according to claim 10, further comprising performing, before the receiving the first image file:
obtaining a processing type.

12. The method according to claim 11, wherein the third operation is an operation by which the user sets the processing type for the first image file.

13. The method according to claim 10, wherein the processing data comprises the second image file.

14. The method according to claim 10, wherein the method further comprises displaying the second image file based on the processing data.

15. The method according to claim 10, further comprising performing, after the processing data is obtained:
negotiating with another electronic device about the processing data for the first image file.

16. An electronic device, comprising:
one or more processors; and
one or more memories coupled to the one or more processors, the one or more memories storing computer program code for execution by the one or more processors, the computer program code including instructions for:

displaying a first screen, wherein the first screen is a camera screen of the electronic device;
detecting a first operation of a user on the first screen;
obtaining a first image file through photographing in response to the first operation, wherein the first image file comprises a picture or a video;
automatically sending the first image file by the electronic device to a second electronic device, wherein sending the first image file to the second electronic device is associated with a request for processing of the first image file by the second electronic device, wherein the request for processing of the first image file causes a display of prompt information on a second screen of the second electronic device, and wherein the prompt information indicates to a second user of the second electronic device that the electronic device requests image processing;
automatically receiving processing data sent by the second electronic device, wherein the processing data is obtained by the second electronic device by processing of the first image file by the second electronic device in response to the electronic device sending the first image file to the second electronic device and according to the request for processing of the first image file, and wherein the processing data is associated with a second image file;
detecting a second operation of the user on the first screen; and
displaying the second image file in response to the second operation.

17. The electronic device according to claim 16, wherein the computer program code further includes instructions for performing, before the obtaining the first image file:
receiving a processing type that is set by the user; and
sending the processing type to the second electronic device.

18. The electronic device according to claim 17, wherein the processing type comprises one or more of image beautification, image classification, image facial recognition, image clustering, image facial expression recognition, image age analysis, image optical character recognition (OCR), or image semantic segmentation.

19. The electronic device according to claim 16, wherein the processing data comprises the second image file.

20. The electronic device according to claim 16, wherein the processing data comprises a result obtained by performing facial recognition based on the first image file.

21. The electronic device according to claim 16, wherein the computer program code further includes instructions for performing, before the obtaining the first image file, establishing a short-distance connection to the second electronic device.

* * * * *